United States Patent
Dutta

(10) Patent No.: US 12,113,706 B2
(45) Date of Patent: Oct. 8, 2024

(54) STATELESS MULTICAST IN MULTI-DOMAIN NETWORKS

(71) Applicant: Nokia Solutions and Networks Oy, Espoo (FI)

(72) Inventor: Pranjal Kumar Dutta, Sunnyvale, CA (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 17/000,898

(22) Filed: Aug. 24, 2020

(65) Prior Publication Data

US 2022/0060412 A1     Feb. 24, 2022

(51) Int. Cl.
| | |
|---|---|
| H04L 45/50 | (2022.01) |
| H04L 12/18 | (2006.01) |
| H04L 45/52 | (2022.01) |
| H04L 45/748 | (2022.01) |

(52) U.S. Cl.
CPC .............. *H04L 45/50* (2013.01); *H04L 12/18* (2013.01); *H04L 45/52* (2013.01); *H04L 45/748* (2013.01)

(58) Field of Classification Search
USPC ........................................................ 370/390
See application file for complete search history.

(56) References Cited

U.S. PATENT DOCUMENTS

| | | | | |
|---|---|---|---|---|
| 7,372,853 | B2 * | 5/2008 | Sharma .................. | H04L 45/50 370/395.5 |
| 8,169,924 | B2 * | 5/2012 | Sajassi .................... | H04L 45/00 370/408 |
| 8,310,957 | B1 * | 11/2012 | Rekhter .................. | H04L 45/48 370/256 |
| 10,404,482 | B2 * | 9/2019 | Wijnands ............ | H04L 12/1886 |

(Continued)

OTHER PUBLICATIONS

EP Search Report mailed on Dec. 13, 2021 in corresponding EP Application No. 21182097.2, 9 pages.

(Continued)

*Primary Examiner* — Gary Mu
*Assistant Examiner* — Hooman Houshmand
(74) *Attorney, Agent, or Firm* — Tong, Rea, Bentley & Kim, LLC

(57) ABSTRACT

Various example embodiments for supporting stateless multicast in communication networks are presented. Various example embodiments for supporting stateless multicast in communication networks may be configured to support stateless multicast in multi-domain packet distribution networks. Various example embodiments for supporting stateless multicast in communication networks may be configured to support stateless multicast in multi-domain packet distribution networks which may be based on Internet Protocol (IP). Various example embodiments for supporting stateless multicast in a multi-domain packet distribution network may be configured to support multicast of packets based on use of internal multicast packets for multicast (Continued)

communication of the multicast packets within sub-domains of the multi-domain packet distribution network and use of external multicast packets for unicast communication of the multicast packets across or between sub-domains of the multi-domain packet distribution network.

22 Claims, 47 Drawing Sheets

(56) References Cited

U.S. PATENT DOCUMENTS

| | | | | |
|---|---|---|---|---|
| 10,924,395 | B2* | 2/2021 | Wijnands | H04L 45/64 |
| 2003/0179742 | A1* | 9/2003 | Ogier | H04L 61/251 |
| | | | | 370/389 |
| 2010/0124225 | A1* | 5/2010 | Fedyk | H04L 12/1886 |
| | | | | 370/392 |
| 2015/0003463 | A1* | 1/2015 | Li | H04L 12/4641 |
| | | | | 370/395.53 |
| 2015/0078378 | A1* | 3/2015 | Wijnands | H04L 12/1886 |
| | | | | 370/390 |
| 2015/0085635 | A1* | 3/2015 | Wijnands | H04L 45/16 |
| | | | | 370/216 |
| 2018/0278521 | A1* | 9/2018 | Pfister | H04L 69/22 |
| 2019/0296922 | A1 | 9/2019 | Dutta | |
| 2019/0327168 | A1* | 10/2019 | Eckert | H04L 12/4633 |
| 2020/0119991 | A1 | 4/2020 | Dutta | |
| 2020/0120020 | A1* | 4/2020 | Dutta | H04L 45/04 |
| 2020/0304405 | A1* | 9/2020 | Wijnands | H04L 45/64 |

OTHER PUBLICATIONS

Fenner, B., et al., "Protocol Independent Multicast—Sparse Mode (PIM-SM): Protocol Specification (Revised)," Internet Engineering Task Force (IETF), RFC 7761, Mar. 2016, 137 pages.
Cain, B., et al., "Internet Group Management Protocol, Version 3," Network Working Group, RFC 3376, Oct. 2002, 53 pages.
Rosen, E., et al., "Multicast in MPLS/BGP IP VPNs," Internet Engineering Task Force (IETF), RFC 6513, Feb. 2012, 88 pages.
Aggarwal, R., et al., "BGP Encoding and Procedures for Multicast in MPLS/BGP IP VPNs," Internet Engineering Task Force (IETF), RFC 6514, Feb. 2012, 59 pages.
Aggarwal, R., et al., "Extensions to Resource Reservation Protocol-Traffic Engineering (RSVP-TE) for Point-to-Multipoint TE Label Switched Paths (LSPs)," Network Working Group, RFC 4875, May 2007, 53 pages.
Wijnands, I.J., et al., "Label Distribution Protocol Extensions for Point-to-Multipoint and Multipoint-to-Multipoint Label Switched Paths," Internet Engineering Task Force (IETF), RFC 6388, Nov. 2011, 30 pages.
Wijnands, I.J., et al., "Multicast Using Bit Index Explicit Replication (BIER)," Internet Engineering Task Force (IETF), RFC 8279, Nov. 2017, 43 pages.
Sajassi, A., et al., "BGP MPLS-Based Ethernet VPN," Internet Engineering Task Force (IETF), RFC 7432, Feb. 2015, 56 pages.
Aggarwal, R., et al., "Multicast in Virtual Private LAN Service (VPLS)," Internet Engineering Task Force (IETF), RFC 7117, Feb. 2014, 50 pages.
Andersson, L., et al., "LDP Specification," Network Working Group, RFC 5036, Oct. 2007, 136 pages.
Filsfils, C., et al., "Segment Routing Architecture," Internet Engineering Task Force (IETF), RFC 8402, Jul. 2018, 32 pages.
Rosen, E., "Using BGP to Bind MPLS Labels to Address Prefixes," Internet Engineering Task Force (IETF), RFC 8277, Oct. 2017, 23 pages.
Awduche, D., et al., "RSVP-TE: Extensions to RSVP for LSP Tunnels," Network Working Group, RFC 3209, Dec. 2001, 61 pages.
Filsfils, C., et al., "Segment Routing Policy Architecture," draft-ietf-spring-segment-routing-policy-06.txt, SPRING Working Group, Internet Draft, Dec. 14, 2019, 35 pages.
Rosen, E., et al., "Multiprotocol Label Switching Architecture," Network Working Group, RFC 3031, Jan. 2001, 61 pages.
Li, Z., et al., "Usecases of MPLS Global Label," draft-li-mpls-global-label-usecases-03, Network Working Group, Oct. 17, 2015, 11 pages.
Iana, "Special-Purpose MPLS Label Values," https://www.iana.org/assignments/mpls-label-values/mpls-label-values.xhtml, printed on Aug. 24, 2020, 2 pages.
Farinacci, E., et al., "Generic Routing Encapsulation (GRE)," Network Working Group, RFC 2784, Mar. 2000, 9 pages.
Iana, "Protocol Numbers," https://www.iana.org/assignments/protocol-numbers/protocol-numbers.xhtml, printed on Aug. 24, 2020, 11 pages.
Nokia Solutions and Networks Oy, U.S. Appl. No. 16/366,177, filed Mar. 27, 2019, 71 pages.
Communication pursuant to Article 94(3) EPC, Application No. 21 182097.2-1215, Mar. 6, 2024; pages (9).

* cited by examiner

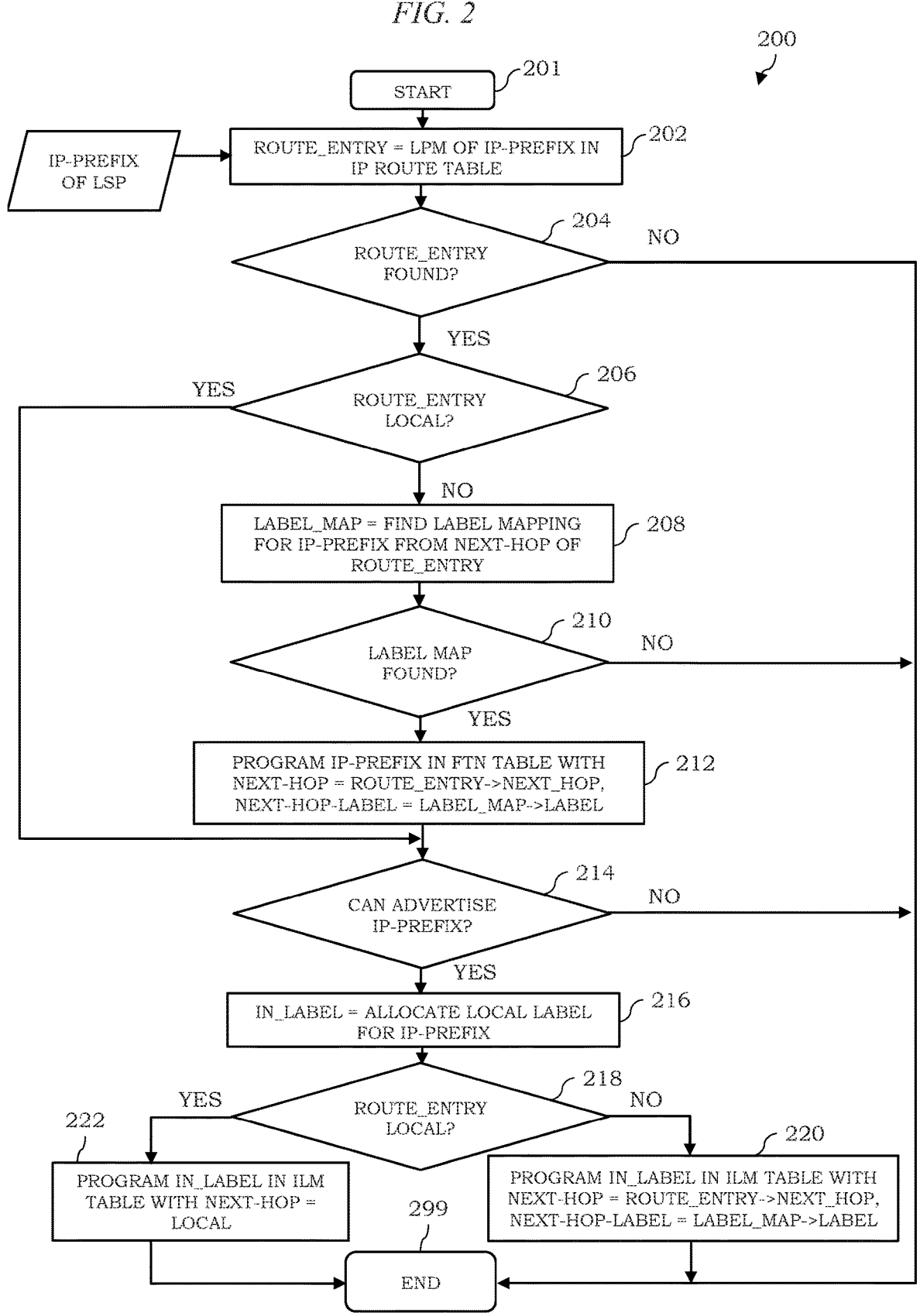

FIG. 3A

| IP ROUTE TABLE ||
|---|---|
| IP PREFIX | NEXT-HOP |
| IP-1/32 | LOCAL |
| IP-2/32 | R1->R5 |
| IP-3/32 | R1->R5 |
| IP-4/32 | R1->R5 |
| IP-5/32 | R1->R5 |
| IP-6/32 | R1->R6 |
| IP-7/32 | R1->R5 |
| IP-8/32 | R1->R6 |

FIG. 3B

| FTN TABLE | | | | |
|---|---|---|---|---|
| TYPE | IP PREFIX | TUNNEL ID | NEXT-HOP | NEXT-HOP LABEL |
| ... | IP-2/32 | 0 | R1->R5 | L2 |
| ... | IP-3/32 | 0 | R1->R5 | L3 |
| ... | IP-4/32 | 0 | R1->R5 | L4 |
| ... | IP-5/32 | 0 | R1->R5 | L5 |
| ... | IP-6/32 | 0 | R1->R6 | L6 |
| ... | IP-7/32 | 0 | R1->R5 | L7 |
| ... | IP-8/32 | 0 | R1->R6 | L8 |

FEC (IP PREFIX, TUNNEL ID) — NHLFE (NEXT-HOP, NEXT-HOP LABEL)

| ILM TABLE | | |
|---|---|---|
| INCOMING LABEL | NEXT-HOP | NEXT-HOP LABEL |
| L1 | LOCAL | NONE |
| L2 | R1->R5 | L2 |
| L3 | R1->R5 | L3 |
| L4 | R1->R5 | L4 |
| L5 | R1->R5 | L5 |
| L6 | R1->R6 | L6 |
| L7 | R1->R5 | L7 |
| L8 | R1->R6 | L8 |

NHLFE

FIG. 4A

| IP ROUTE TABLE ||
|---|---|
| IP PREFIX | NEXT-HOP |
| IP-1/32 | R5->R1 |
| IP-2/32 | R5->R2 |
| IP-3/32 | R5->R7 |
| IP-4/32 | R5->R7 |
| IP-5/32 | LOCAL |
| IP-6/32 | R5->R6 |
| IP-7/32 | R5->R7 |
| IP-8/32 | R5->R8 |

FIG. 4B

| FTN TABLE |||||
|---|---|---|---|---|
| TYPE | IP PREFIX | TUNNEL ID | NEXT-HOP | NEXT-HOP LABEL |
| ... | IP-1/32 | 0 | R5->R1 | L1 |
| ... | IP-2/32 | 0 | R5->R2 | L2 |
| ... | IP-3/32 | 0 | R5->R7 | L3 |
| ... | IP-4/32 | 0 | R5->R7 | L4 |
| ... | IP-6/32 | 0 | R5->R6 | L6 |
| ... | IP-7/32 | 0 | R5->R7 | L7 |
| ... | IP-8/32 | 0 | R5->R8 | L8 |

FEC      NHLFE

| ILM TABLE |||
|---|---|---|
| INCOMING LABEL | NEXT-HOP | NEXT-HOP LABEL |
| L1 | R5->R1 | L1 |
| L2 | R5->R2 | L2 |
| L3 | R5->R7 | L3 |
| L4 | R5->R7 | L4 |
| L5 | LOCAL | NONE |
| L6 | R5->R6 | L6 |
| L7 | R5->R7 | L7 |
| L8 | R5->R8 | L8 |

NHLFE

MULTI-DOMAIN
PACKET
DISTRIBUTION
NETWORK
800

*FIG. 9*

| OSPF ROUTE TABLE | | | |
|---|---|---|---|
| IP PREFIX | NEXT-HOP | TYPE | ADVERTISING ROUTER |
| IP-1/32 | Local | INT | IP-1 |
| IP-2/32 | R1->R2 | INT | IP-2 |
| IP-3/32 | R1->R3 | INT | IP-3 |
| IP-4/32 | R1->R2 | INT | IP-4 |
| IP-5/32 | R1->R2 | INT | IP-5 |
| IP-6/32 | R1->R2 | EXT | IP-13 |
| IP-7/32 | R1->R2 | EXT | IP-13 |
| IP-8/32 | R1->R2 | EXT | IP-13 |
| IP-9/32 | R1->R2 | EXT | IP-13 |
| IP-10/32 | R1->R2 | EXT | IP-13 |
| IP-11/32 | R1->R2 | EXT | IP-13 |
| IP-12/32 | R1->R2 | EXT | IP-13 |
| IP-13/32 | R1->R2 | INT | IP-13 |
| IP-14/32 | R1->R2 | EXT | IP-13 |
| IP-15/32 | R1->R2 | EXT | IP-13 |
| IP-16/32 | R1->R2 | EXT | IP-13 |
| IP-17/32 | R1->R2 | EXT | IP-13 |
| 12.1.0.0/22 | R1->R2 | EXT | IP-13 |

*FIG. 10A*

| IP ROUTE TABLE | |
|---|---|
| IP PREFIX | NEXT-HOP |
| IP-1/32 | LOCAL |
| IP-2/32 | R1->R2 |
| IP-3/32 | R1->R3 |
| IP-4/32 | R1->R2 |
| IP-5/32 | R1->R2 |
| IP-6/32 | R1->R2 |
| IP-7/32 | R1->R2 |
| IP-8/32 | R1->R2 |
| IP-9/32 | R1->R2 |
| IP-10/32 | R1->R2 |
| IP-11/32 | R1->R2 |
| IP-12/32 | R1->R2 |
| IP-13/32 | R1->R2 |
| IP-14/32 | R1->R2 |
| IP-15/32 | R1->R2 |
| IP-16/32 | R1->R2 |
| IP-17/32 | R1->R2 |
| 12.1.0.0/22 | R1->R2 |

FIG. 10B

| FTN TABLE | | | | |
|---|---|---|---|---|
| TYPE | IP PREFIX | TUNNEL ID | NEXT-HOP | NEXT-HOP LABEL |
| ... | IP-2/32 | 0 | R1->R2 | L2 |
| ... | IP-3/32 | 0 | R1->R3 | L3 |
| ... | IP-4/32 | 0 | R1->R2 | L4 |
| ... | IP-5/32 | 0 | R1->R2 | L5 |
| ... | IP-6/32 | 0 | R1->R2 | L6 |
| ... | IP-7/32 | 0 | R1->R2 | L7 |
| ... | IP-8/32 | 0 | R1->R2 | L8 |
| ... | IP-9/32 | 0 | R1->R2 | L9 |
| ... | IP-10/32 | 0 | R1->R2 | L10 |
| ... | IP-11/32 | 0 | R1->R2 | L11 |
| ... | IP-12/32 | 0 | R1->R2 | L12 |
| ... | IP-13/32 | 0 | R1->R2 | L13 |
| ... | IP-14/32 | 0 | R1->R2 | L14 |
| ... | IP-15/32 | 0 | R1->R2 | L15 |
| ... | IP-16/32 | 0 | R1->R2 | L16 |
| ... | IP-17/32 | 0 | R1->R2 | L17 |

| ILM TABLE | | |
|---|---|---|
| INCOMING LABEL | NEXT-HOP | NEXT-HOP LABEL |
| L1 | Local | None |
| L2 | R1->R2 | L2 |
| L3 | R1->R3 | L3 |
| L4 | R1->R2 | L4 |
| L5 | R1->R2 | L5 |
| L6 | R1->R2 | L6 |
| L7 | R1->R2 | L7 |
| L8 | R1->R2 | L8 |
| L9 | R1->R2 | L9 |
| L10 | R1->R2 | L10 |
| L11 | R1->R2 | L11 |
| L12 | R1->R2 | L12 |
| L13 | R1->R2 | L13 |
| L14 | R1->R2 | L14 |
| L15 | R1->R2 | L15 |
| L16 | R1->R2 | L16 |
| L17 | R1->R2 | L17 |

*FIG. 11*

| OSPF ROUTE TABLE ||||
|---|---|---|---|
| IP PREFIX | NEXT-HOP | TYPE | ADVERTISING ROUTER |
| IP-1/32 | R13->R2 | INT | IP-1 |
| IP-2/32 | R13->R2 | INT | IP-2 |
| IP-3/32 | R13->R4 | INT | IP-3 |
| IP-4/32 | R13->R4 | INT | IP-4 |
| IP-5/32 | R13->R5 | INT | IP-5 |
| IP-6/32 | R13->R14 | INT | IP-6 |
| IP-7/32 | R13->R14 | INT | IP-7 |
| IP-8/32 | R13->R14 | EXT | IP-17 |
| IP-9/32 | R13->R14 | EXT | IP-17 |
| IP-10/32 | R13->R14 | EXT | IP-12 |
| IP-11/32 | R13->R14 | EXT | IP-12 |
| IP-12/32 | R13->R14 | INT | IP-12 |
| IP-13/32 | LOCAL | INT | IP-13 |
| IP-14/32 | R13->R14 | INT | IP-14 |
| IP-15/32 | R13->R14 | INT | IP-15 |
| IP-16/32 | R13->R14 | EXT | IP-17 |
| IP-17/32 | R13->R14 | EXT | IP-17 |
| 12.1.0.0/22 | R13->R14 | EXT | IP-17 |

FIG. 12A

| IP ROUTE TABLE ||
|---|---|
| IP PREFIX | NEXT-HOP |
| IP-1/32 | R13->R2 |
| IP-2/32 | R13->R2 |
| IP-3/32 | R13->R4 |
| IP-4/32 | R13->R4 |
| IP-5/32 | R13->R5 |
| IP-6/32 | R13->R14 |
| IP-7/32 | R13->R14 |
| IP-8/32 | R13->R14 |
| IP-9/32 | R13->R14 |
| IP-10/32 | R13->R14 |
| IP-11/32 | R13->R14 |
| IP-12/32 | R13->R14 |
| IP-13/32 | LOCAL |
| IP-14/32 | R13->R14 |
| IP-15/32 | R13->R14 |
| IP-16/32 | R13->R14 |
| IP-17/32 | R13->R14 |
| 12.1.0.0/22 | R13->R14 |

*FIG. 12B*

| FTN TABLE | | | | |
|---|---|---|---|---|
| TYPE | IP PREFIX | TUNNEL ID | NEXT-HOP | NEXT-HOP LABEL |
| ... | IP-1/32 | 0 | R13->R2 | L1 |
| ... | IP-2/32 | 0 | R13->R2 | L2 |
| ... | IP-3/32 | 0 | R13->R4 | L3 |
| ... | IP-4/32 | 0 | R13->R4 | L4 |
| ... | IP-5/32 | 0 | R13->R5 | L5 |
| ... | IP-6/32 | 0 | R13->R14 | L6 |
| ... | IP-7/32 | 0 | R13->R14 | L7 |
| ... | IP-8/32 | 0 | R13->R14 | L8 |
| ... | IP-9/32 | 0 | R13->R14 | L9 |
| ... | IP-10/32 | 0 | R13->R14 | L10 |
| ... | IP-11/32 | 0 | R13->R14 | L11 |
| ... | IP-12/32 | 0 | R13->R14 | L12 |
| ... | IP-14/32 | 0 | R13->R14 | L14 |
| ... | IP-15/32 | 0 | R13->R14 | L15 |
| ... | IP-16/32 | 0 | R13->R14 | L16 |
| ... | IP-17/32 | 0 | R13->R14 | L17 |

| ILM TABLE | | |
|---|---|---|
| INCOMING LABEL | NEXT-HOP | NEXT-HOP LABEL |
| L1 | R13->R2 | L1 |
| L2 | R13->R2 | L2 |
| L3 | R13->R4 | L3 |
| L4 | R13->R4 | L4 |
| L5 | R13->R5 | L5 |
| L6 | R13->R14 | L6 |
| L7 | R13->R14 | L7 |
| L8 | R13->R14 | L8 |
| L9 | R13->R14 | L9 |
| L10 | R13->R14 | L10 |
| L11 | R13->R14 | L11 |
| L12 | R13->R14 | L12 |
| L13 | LOCAL | NONE |
| L14 | R13->R14 | L14 |
| L15 | R13->R14 | L15 |
| L16 | R13->R14 | L16 |
| L17 | R13->R14 | L17 |

*FIG. 14A*

| IP ROUTE TABLE | | | |
|---|---|---|---|
| IP PREFIX | NEXT-HOP | SCOPE | BR |
| IP-1/32 | Local | INT | IP-1 |
| IP-2/32 | R1->R2 | INT | IP-2 |
| IP-3/32 | R1->R3 | INT | IP-3 |
| IP-4/32 | R1->R2 | INT | IP-4 |
| IP-5/32 | R1->R2 | INT | IP-5 |
| IP-6/32 | R1->R2 | EXT | IP-13 |
| IP-7/32 | R1->R2 | EXT | IP-13 |
| IP-8/32 | R1->R2 | EXT | IP-13 |
| IP-9/32 | R1->R2 | EXT | IP-13 |
| IP-10/32 | R1->R2 | EXT | IP-13 |
| IP-11/32 | R1->R2 | EXT | IP-13 |
| IP-12/32 | R1->R2 | EXT | IP-13 |
| IP-13/32 | R1->R2 | EXT | IP-13 |
| IP-14/32 | R1->R2 | EXT | IP-13 |
| IP-15/32 | R1->R2 | EXT | IP-13 |
| IP-16/32 | R1->R2 | EXT | IP-13 |
| IP-17/32 | R1->R2 | EXT | IP-13 |
| 12.1.0.0/22 | R1->R2 | EXT | IP-13 |

*FIG. 14B-1*

| FTN TABLE | | | | | | | |
|---|---|---|---|---|---|---|---|
| TYPE | IP PREFIX | TUNNEL ID | NEXT-HOP | NEXT-HOP LABEL | SCOPE | BR | BR LABEL |
| ... | IP-2/32 | 0 | R1->R2 | L2 | INT | IP-2 | N/A |
| ... | IP-3/32 | 0 | R1->R3 | L3 | INT | IP-3 | N/A |
| ... | IP-4/32 | 0 | R1->R2 | L4 | INT | IP-4 | N/A |
| ... | IP-5/32 | 0 | R1->R2 | L5 | INT | IP-5 | N/A |
| ... | IP-6/32 | 0 | R1->R2 | L6 | EXT | IP-13 | L6 |
| ... | IP-7/32 | 0 | R1->R2 | L7 | EXT | IP-13 | L7 |
| ... | IP-8/32 | 0 | R1->R2 | L8 | EXT | IP-13 | L8 |
| ... | IP-9/32 | 0 | R1->R2 | L9 | EXT | IP-13 | L9 |
| ... | IP-10/32 | 0 | R1->R2 | L10 | EXT | IP-13 | L10 |
| ... | IP-11/32 | 0 | R1->R2 | L11 | EXT | IP-13 | L11 |
| ... | IP-12/32 | 0 | R1->R2 | L12 | EXT | IP-13 | L12 |
| ... | IP-13/32 | 0 | R1->R2 | L13 | EXT | IP-13 | L13 |
| ... | IP-14/32 | 0 | R1->R2 | L14 | EXT | IP-13 | L14 |
| ... | IP-15/32 | 0 | R1->R2 | L15 | EXT | IP-13 | L15 |
| ... | IP-16/32 | 0 | R1->R2 | L16 | EXT | IP-13 | L16 |
| ... | IP-17/32 | 0 | R1->R2 | L17 | EXT | IP-13 | L17 |

| BR TUNNEL TABLE | | |
|---|---|---|
| IP ADDRESS | TUNNEL PREFERENCE | RESOLVED TUNNEL |
| ... | .... | ... |
| IP-13 | ... | ... |
| ... | .... | ... |

*FIG. 14B-2*

| ILM TABLE | | | | | |
|---|---|---|---|---|---|
| INCOMING LABEL | NEXT-HOP | NEXT-HOP LABEL | SCOPE | BR | BR LABEL |
| L1 | LOCAL | NONE | N/A | N/A | N/A |
| L2 | R1->R2 | L2 | INT | IP-2 | N/A |
| L3 | R1->R3 | L3 | INT | IP-3 | N/A |
| L4 | R1->R2 | L4 | INT | IP-4 | N/A |
| L5 | R1->R2 | L5 | INT | IP-5 | N/A |
| L6 | R1->R2 | L6 | EXT | IP-13 | L6 |
| L7 | R1->R2 | L7 | EXT | IP-13 | L7 |
| L8 | R1->R2 | L8 | EXT | IP-13 | L8 |
| L9 | R1->R2 | L9 | EXT | IP-13 | L9 |
| L10 | R1->R2 | L10 | EXT | IP-13 | L10 |
| L11 | R1->R2 | L11 | EXT | IP-13 | L11 |
| L12 | R1->R2 | L12 | EXT | IP-13 | L12 |
| L13 | R1->R2 | L13 | EXT | IP-13 | L13 |
| L14 | R1->R2 | L14 | EXT | IP-13 | L14 |
| L15 | R1->R2 | L15 | EXT | IP-13 | L15 |
| L16 | R1->R2 | L16 | EXT | IP-13 | L16 |
| L17 | R1->R2 | L17 | EXT | IP-13 | L17 |

*FIG. 15A*

| IP ROUTE TABLE | | | |
|---|---|---|---|
| IP PREFIX | NEXT-HOP | SCOPE | BR |
| IP-1/32 | R13->R2 | INT | IP-1 |
| IP-2/32 | R13->R2 | INT | IP-2 |
| IP-3/32 | R13->R4 | INT | IP-3 |
| IP-4/32 | R13->R4 | INT | IP-4 |
| IP-5/32 | R13->R5 | INT | IP-5 |
| IP-6/32 | R13->R14 | INT | IP-6 |
| IP-7/32 | R13->R14 | INT | IP-7 |
| IP-8/32 | R13->R14 | EXT | IP-17 |
| IP-9/32 | R13->R14 | EXT | IP-17 |
| IP-10/32 | R13->R14 | EXT | IP-12 |
| IP-11/32 | R13->R14 | EXT | IP-12 |
| IP-12/32 | R13->R14 | INT | IP-12 |
| IP-13/32 | LOCAL | INT | IP-13 |
| IP-14/32 | R13->R14 | INT | IP-14 |
| IP-15/32 | R13->R14 | INT | IP-15 |
| IP-16/32 | R13->R14 | EXT | IP-17 |
| IP-17/32 | R13->R14 | INT | IP-17 |
| 12.1.0.0/22 | R13->R14 | EXT | IP-17 |

*FIG. 15B-1*

| FTN TABLE | | | | | | | |
|---|---|---|---|---|---|---|---|
| TYPE | IP PREFIX | TUNNEL ID | NEXT-HOP | NEXT-HOP LABEL | SCOPE | BR | BR LABEL |
| ... | IP-1/32 | 0 | R13->R2 | L1 | INT | IP-1 | N/A |
| ... | IP-2/32 | 0 | R13->R2 | L2 | INT | IP-2 | N/A |
| ... | IP-3/32 | 0 | R13->R4 | L3 | INT | IP-3 | N/A |
| ... | IP-4/32 | 0 | R13->R4 | L4 | INT | IP-4 | N/A |
| ... | IP-5/32 | 0 | R13->R5 | L5 | INT | IP-5 | N/A |
| ... | IP-6/32 | 0 | R13->R14 | L6 | INT | IP-6 | N/A |
| ... | IP-7/32 | 0 | R13->R14 | L7 | INT | IP-7 | N/A |
| ... | IP-8/32 | 0 | R13->R14 | L8 | EXT | IP-17 | L8 |
| ... | IP-9/32 | 0 | R13->R14 | L9 | EXT | IP-17 | L9 |
| ... | IP-10/32 | 0 | R13->R14 | L10 | EXT | IP-12 | L10 |
| ... | IP-11/32 | 0 | R13->R14 | L11 | EXT | IP-12 | L11 |
| ... | IP-12/32 | 0 | R13->R14 | L12 | INT | IP-12 | N/A |
| ... | IP-14/32 | 0 | R13->R14 | L14 | INT | IP-14 | N/A |
| ... | IP-15/32 | 0 | R13->R14 | L15 | INT | IP-15 | N/A |
| ... | IP-16/32 | 0 | R13->R14 | L16 | EXT | IP-17 | L17 |
| ... | IP-17/32 | 0 | R13->R14 | L17 | INT | IP-17 | N/A |

*FIG. 15B-2*

| ILM TABLE | | | | | |
|---|---|---|---|---|---|
| INCOMING LABEL | NEXT-HOP | NEXT-HOP LABEL | SCOPE | BR | BR LABEL |
| L1 | R13->R2 | L1 | INT | IP-1 | N/A |
| L2 | R13->R2 | L2 | INT | IP-2 | N/A |
| L3 | R13->R4 | L3 | INT | IP-3 | N/A |
| L4 | R13->R4 | L4 | INT | IP-4 | N/A |
| L5 | R13->R5 | L5 | INT | IP-5 | N/A |
| L6 | R13->R14 | L6 | INT | IP-6 | N/A |
| L7 | R13->R14 | L7 | INT | IP-7 | N/A |
| L8 | R13->R14 | L8 | EXT | IP-17 | L8 |
| L9 | R13->R14 | L9 | EXT | IP-17 | L9 |
| L10 | R13->R14 | L10 | EXT | IP-12 | L10 |
| L11 | R13->R14 | L11 | EXT | IP-12 | L11 |
| L12 | R13->R14 | L12 | INT | IP-12 | L12 |
| L13 | LOCAL | NONE | INT | N/A | N/A |
| L14 | R13->R14 | L14 | INT | IP-14 | L14 |
| L15 | R13->R14 | L15 | INT | IP-15 | L15 |
| L16 | R13->R14 | L16 | EXT | IP-17 | L16 |
| L17 | R13->R14 | L17 | INT | IP-17 | L17 |

FIG. 16

EMLS PACKET 1600 

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|            EMLSI                      | Exp |S|      TTL      |
+-+-+-+-+-+-+-+-+-+-+-+-+-+-+-+-+-+-+-+-+-+-+-+-+-+-+-+-+-+-+-+-+
|         Num Labels(N)                 | Exp |S|      TTL      |
+-+-+-+-+-+-+-+-+-+-+-+-+-+-+-+-+-+-+-+-+-+-+-+-+-+-+-+-+-+-+-+-+
|            Label 1                    | Exp |S|      TTL      |
+-+-+-+-+-+-+-+-+-+-+-+-+-+-+-+-+-+-+-+-+-+-+-+-+-+-+-+-+-+-+-+-+
//                  //                                        //
//                  //                                        //
+-+-+-+-+-+-+-+-+-+-+-+-+-+-+-+-+-+-+-+-+-+-+-+-+-+-+-+-+-+-+-+-+
~            Label N                    | Exp |S|      TTL      ~
+-+-+-+-+-+-+-+-+-+-+-+-+-+-+-+-+-+-+-+-+-+-+-+-+-+-+-+-+-+-+-+-+
```

FIG. 17

EMLS DESCRIPTOR LABEL 1700 

```
+-+-+-+-+-+-+-+-+-+-+-+-+-+-+-+-+-+-+-+-+-+-+-+-+-+-+-+-+-+-+-+-+
|         Num Labels(N)                 | Exp |S|      TTL      |
+-+-+-+-+-+-+-+-+-+-+-+-+-+-+-+-+-+-+-+-+-+-+-+-+-+-+-+-+-+-+-+-+
```

*FIG. 19*

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                                                               |
~                        IPv4/IPv6 Header                       ~
|                                                               |
+-+-+-+-+-+-+-+-+-+-+-+-+-+-+-+-+-+-+-+-+-+-+-+-+-+-+-+-+-+-+-+-+
|C|      Reserved0      | Ver |          Protocol Type          |
+-+-+-+-+-+-+-+-+-+-+-+-+-+-+-+-+-+-+-+-+-+-+-+-+-+-+-+-+-+-+-+-+
|       Checksum (optional)     |       Reserved1 (Optional)    |
+-+-+-+-+-+-+-+-+-+-+-+-+-+-+-+-+-+-+-+-+-+-+-+-+-+-+-+-+-+-+-+-+
|                                                               |
~              Payload (Network Layer Protocol Packet)          ~
|                                                               |
+-+-+-+-+-+-+-+-+-+-+-+-+-+-+-+-+-+-+-+-+-+-+-+-+-+-+-+-+-+-+-+-+
```

*FIG. 20*

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                                                               |
~                        IPv4/IPv6 Header                       ~
|                                                               |
+-+-+-+-+-+-+-+-+-+-+-+-+-+-+-+-+-+-+-+-+-+-+-+-+-+-+-+-+-+-+-+-+
|C|      Reserved0      | Ver | Protocol Type = 0x8847 (MPLS)|
+-+-+-+-+-+-+-+-+-+-+-+-+-+-+-+-+-+-+-+-+-+-+-+-+-+-+-+-+-+-+-+-+
|       Checksum (optional)     |       Reserved1 (Optional)    |
+-+-+-+-+-+-+-+-+-+-+-+-+-+-+-+-+-+-+-+-+-+-+-+-+-+-+-+-+-+-+-+-+
|                                                               |
~                          EMLS-E Packet                        ~
|                                                               |
+-+-+-+-+-+-+-+-+-+-+-+-+-+-+-+-+-+-+-+-+-+-+-+-+-+-+-+-+-+-+-+-+
```

*FIG. 22*

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                                                               |
~                       IPv4/IPv6 Header                        ~
|                                                               |
+-+-+-+-+-+-+-+-+-+-+-+-+-+-+-+-+-+-+-+-+-+-+-+-+-+-+-+-+-+-+-+-+
|     Source Port = Entropy     |     Dest Port = MPLSoUDP      |
+-+-+-+-+-+-+-+-+-+-+-+-+-+-+-+-+-+-+-+-+-+-+-+-+-+-+-+-+-+-+-+-+
|          UDP Length           |         UDP Checksum          |
+-+-+-+-+-+-+-+-+-+-+-+-+-+-+-+-+-+-+-+-+-+-+-+-+-+-+-+-+-+-+-+-+
|                                                               |
~                          MPLS Packet                          ~
|                                                               |
+-+-+-+-+-+-+-+-+-+-+-+-+-+-+-+-+-+-+-+-+-+-+-+-+-+-+-+-+-+-+-+-+
```

*FIG. 23*

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                                                               |
~                       IPv4/IPv6 Header                        ~
|                                                               |
+-+-+-+-+-+-+-+-+-+-+-+-+-+-+-+-+-+-+-+-+-+-+-+-+-+-+-+-+-+-+-+-+
|     Source Port = Entropy     |     Dest Port = MPLSoUDP      |
+-+-+-+-+-+-+-+-+-+-+-+-+-+-+-+-+-+-+-+-+-+-+-+-+-+-+-+-+-+-+-+-+
|          UDP Length           |         UDP Checksum          |
+-+-+-+-+-+-+-+-+-+-+-+-+-+-+-+-+-+-+-+-+-+-+-+-+-+-+-+-+-+-+-+-+
|                                                               |
~                         EMLS-E Packet                         ~
|                                                               |
+-+-+-+-+-+-+-+-+-+-+-+-+-+-+-+-+-+-+-+-+-+-+-+-+-+-+-+-+-+-+-+-+
```

*FIG. 25*

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                Label 1                | Exp |0|     TTL       |
+-+-+-+-+-+-+-+-+-+-+-+-+-+-+-+-+-+-+-+-+-+-+-+-+-+-+-+-+-+-+-+-+
|                                                               |
~                     ////                                      ~
|                                                               |
+-+-+-+-+-+-+-+-+-+-+-+-+-+-+-+-+-+-+-+-+-+-+-+-+-+-+-+-+-+-+-+-+
|                Label N                | Exp |1|     TTL       |
+-+-+-+-+-+-+-+-+-+-+-+-+-+-+-+-+-+-+-+-+-+-+-+-+-+-+-+-+-+-+-+-+
|                                                               |
~                 EMLS-E Packet                                 ~
|                                                               |
+-+-+-+-+-+-+-+-+-+-+-+-+-+-+-+-+-+-+-+-+-+-+-+-+-+-+-+-+-+-+-+-+
```

*FIG. 26*

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                  LA                   | Exp |0|     TTL       |
+-+-+-+-+-+-+-+-+-+-+-+-+-+-+-+-+-+-+-+-+-+-+-+-+-+-+-+-+-+-+-+-+
|                 EMLSI                 | Exp |S|     TTL       |
+-+-+-+-+-+-+-+-+-+-+-+-+-+-+-+-+-+-+-+-+-+-+-+-+-+-+-+-+-+-+-+-+
|             Num Labels(2)             | Exp |S|     TTL       |
+-+-+-+-+-+-+-+-+-+-+-+-+-+-+-+-+-+-+-+-+-+-+-+-+-+-+-+-+-+-+-+-+
|                            L10                                |
+-+-+-+-+-+-+-+-+-+-+-+-+-+-+-+-+-+-+-+-+-+-+-+-+-+-+-+-+-+-+-+-+
|                            L11                                |
+-+-+-+-+-+-+-+-+-+-+-+-+-+-+-+-+-+-+-+-+-+-+-+-+-+-+-+-+-+-+-+-+
.                            .
.                         Payload.                              .
.                            .
+-+-+-+-+-+-+-+-+-+-+-+-+-+-+-+-+-+-+-+-+-+-+-+-+-+-+-+-+-+-+-+-+
```

EMLS-E(3) Packet

*FIG. 28A*

| IP ROUTE TABLE | | | |
|---|---|---|---|
| IP PREFIX | NEXT-HOP | SCOPE | BR |
| IP-1/32 | R13->R2 | INT | IP-1 |
| IP-2/32 | R13->R2 | INT | IP-2 |
| IP-3/32 | R13->R4 | INT | IP-3 |
| IP-4/32 | R13->R4 | INT | IP-4 |
| IP-5/32 | R13->R5 | INT | IP-5 |
| IP-6/32 | R13->R14 | INT | IP-6 |
| IP-7/32 | R13->R14 | INT | IP-7 |
| IP-8/32 | R13->R14 | EXT | IP-17 |
| IP-9/32 | R13->R14 | EXT | IP-17 |
| IP-10/32 | R13->R14 | EXT | IP-12 |
| IP-11/32 | R13->R14 | EXT | IP-12 |
| IP-12/32 | R13->R14 | INT | IP-12 |
| IP-13/32 | LOCAL | INT | IP-13 |
| IP-14/32 | R13->R14 | INT | IP-14 |
| IP-15/32 | R13->R14 | INT | IP-15 |
| IP-16/32 | R13->R14 | EXT | IP-17 |
| IP-17/32 | R13->R14 | INT | IP-17 |
| 12.1.0.0/22 | R13->R14 | EXT | IP-17 |

*FIG. 28B-1*

| FTN TABLE | | | | | | | |
|---|---|---|---|---|---|---|---|
| TYPE | IP PREFIX | TUNNEL ID | NEXT-HOP | NEXT-HOP LABEL | SCOPE | BR | BR LABEL |
| ... | IP-1/32 | | R13->R2 | L1 | INT | IP-1 | N/A |
| ... | IP-2/32 | | R13->R2 | L2 | INT | IP-2 | N/A |
| ... | IP-3/32 | | R13->R4 | L3 | INT | IP-3 | N/A |
| ... | IP-4/32 | | R13->R4 | L4 | INT | IP-4 | N/A |
| ... | IP-5/32 | | R13->R5 | L5 | INT | IP-5 | N/A |
| ... | IP-6/32 | | R13->R14 | L6 | INT | IP-6 | N/A |
| ... | IP-7/32 | | R13->R14 | L7 | INT | IP-7 | N/A |
| ... | IP-8/32 | | R13->R14 | L8 | EXT | IP-17 | L8 |
| ... | IP-9/32 | | R13->R14 | L9 | EXT | IP-17 | L9 |
| ... | IP-10/32 | | R13->R14 | L10 | EXT | IP-12 | L10 |
| ... | IP-11/32 | | R13->R14 | L11 | EXT | IP-12 | L11 |
| ... | IP-12/32 | | R13->R14 | L12 | INT | IP-12 | N/A |
| ... | IP-14/32 | | R13->R14 | L14 | INT | IP-14 | N/A |
| ... | IP-15/32 | | R13->R14 | L15 | INT | IP-15 | N/A |
| ... | IP-16/32 | | R13->R14 | L16 | EXT | IP-17 | L16 |
| ... | IP-17/32 | | R13->R14 | L17 | INT | IP-17 | N/A |

| BR TUNNEL TABLE | | |
|---|---|---|
| IP ADDRESS | TUNNEL PREFERENCE | RESOLVED TUNNEL |
| ... | .... | |
| IP-12 | GRE | GRE |
| IP-17 | MPLS-IN-UDP | MPLS-IN-UDP |
| ... | .... | |

*FIG. 28B-2*

| ILM TABLE | | | | | |
|---|---|---|---|---|---|
| INCOMING LABEL | NEXT-HOP | NEXT-HOP LABEL | TYPE | BR | BR LABEL |
| L1 | R13->R2 | L1 | INT | IP-1 | N/A |
| L2 | R13->R2 | L2 | INT | IP-2 | N/A |
| L3 | R13->R4 | L3 | INT | IP-3 | N/A |
| L4 | R13->R4 | L4 | INT | IP-4 | N/A |
| L5 | R13->R5 | L5 | INT | IP-5 | N/A |
| L6 | R13->R14 | L6 | INT | IP-6 | N/A |
| L7 | R13->R14 | L7 | INT | IP-7 | N/A |
| L8 | R13->R14 | L8 | EXT | IP-17 | L8 |
| L9 | R13->R14 | L9 | EXT | IP-17 | L9 |
| L10 | R13->R14 | L10 | EXT | IP-12 | L10 |
| L11 | R13->R14 | L11 | EXT | IP-12 | L11 |
| L12 | R13->R14 | L12 | INT | IP-12 | N/A |
| L13 | LOCAL | NONE | INT | N/A | N/A |
| L14 | R13->R14 | L14 | INT | IP-14 | N/A |
| L15 | R13->R14 | L15 | INT | IP-15 | N/A |
| L16 | R13->R14 | L16 | EXT | IP-17 | L16 |
| L17 | R13->R14 | L17 | INT | IP-17 | N/A |

FIG. 29A

| IP ROUTE TABLE | | | |
|---|---|---|---|
| IP PREFIX | NEXT-HOP | SCOPE | BR |
| IP-1/32 | R13->R2 | INT | IP-1 |
| IP-2/32 | R13->R2 | INT | IP-2 |
| IP-3/32 | R13->R4 | INT | IP-3 |
| IP-4/32 | R13->R4 | INT | IP-4 |
| IP-5/32 | R13->R5 | INT | IP-5 |
| IP-6/32 | R13->R14 | INT | IP-6 |
| IP-7/32 | R13->R14 | INT | IP-7 |
| IP-8/32 | R13->R14 | EXT | IP-17 |
| IP-9/32 | R13->R14 | EXT | IP-17 |
| IP-10/32 | R13->R14 | EXT | IP-12 |
| IP-11/32 | R13->R14 | EXT | IP-12 |
| IP-12/32 | R13->R14 | INT | IP-12 |
| IP-13/32 | LOCAL | INT | IP-13 |
| IP-14/32 | R13->R14 | INT | IP-14 |
| IP-15/32 | R13->R14 | INT | IP-15 |
| IP-16/32 | R13->R14 | EXT | IP-17 |
| IP-17/32 | RSVP-TE 101 | INT | IP-17 |
| 12.1.0.0/22 | R13->R14 | EXT | IP-17 |

*FIG. 29B-1*

| FTN TABLE | | | | | | | |
|---|---|---|---|---|---|---|---|
| TYPE | IP PREFIX | TUNNEL ID | NEXT-HOP | NEXT-HOP LABEL | SCOPE | BR | BR LABEL |
| ... | IP-1/32 | | R13->R2 | L1 | INT | IP-1 | N/A |
| ... | IP-2/32 | | R13->R2 | L2 | INT | IP-2 | N/A |
| ... | IP-3/32 | | R13->R4 | L3 | INT | IP-3 | N/A |
| ... | IP-4/32 | | R13->R4 | L4 | INT | IP-4 | N/A |
| ... | IP-5/32 | | R13->R5 | L5 | INT | IP-5 | N/A |
| ... | IP-6/32 | | R13->R14 | L6 | INT | IP-6 | N/A |
| ... | IP-7/32 | | R13->R14 | L7 | INT | IP-7 | N/A |
| ... | IP-8/32 | | R13->R14 | L8 | EXT | IP-17 | L8 |
| ... | IP-9/32 | | R13->R14 | L9 | EXT | IP-17 | L9 |
| ... | IP-10/32 | | R13->R14 | L10 | EXT | IP-12 | L10 |
| ... | IP-11/32 | | R13->R14 | L11 | EXT | IP-12 | L11 |
| LDP | IP-12/32 | | R13->R14 | L12A | INT | IP-12 | N/A |
| SR | IP-12/32 | | R13->R14 | L12B | INT | IP-12 | N/A |
| ... | IP-14/32 | | R13->R14 | L14 | INT | IP-14 | N/A |
| ... | IP-15/32 | | R13->R14 | L15 | INT | IP-15 | N/A |
| ... | IP-16/32 | | R13->R14 | L16 | EXT | IP-17 | L16 |
| BGP | IP-17/32 | | R13->R14 | L17 | INT | IP-17 | N/A |
| RSVP-TE | IP-17/32 | 101 | R13->R14 | L17A | INT | IP-17 | N/A |
| RSVP-TE | IP-17/32 | 102 | R13->R14 | L17B | INT | IP-17 | N/A |
| .... | ..... | .... | ...... | | | | |
| RSVP-TE | IP-17/32 | 110 | R13->R14 | L17J | INT | IP-17 | N/A |

| BR TUNNEL TABLE | | |
|---|---|---|
| IP ADDRESS | TUNNEL PREFERENCE | RESOLVED TUNNEL |
| ... | .... | |
| IP-12 | LDP, SR | LDP |
| IP-17 | BGP, LDP, RSVP-TE 102, IGP SHORTCUT | BGP |
| ... | .... | |
| .... | .... | |

*FIG. 29B-2*

| ILM TABLE | | | | | |
|---|---|---|---|---|---|
| INCOMING LABEL | NEXT-HOP | NEXT-HOP LABEL | TYPE | BR | BR LABEL |
| L1 | R13->R2 | L1 | INT | IP-1 | N/A |
| L2 | R13->R2 | L2 | INT | IP-2 | N/A |
| L3 | R13->R4 | L3 | INT | IP-3 | N/A |
| L4 | R13->R4 | L4 | INT | IP-4 | N/A |
| L5 | R13->R5 | L5 | INT | IP-5 | N/A |
| L6 | R13->R14 | L6 | INT | IP-6 | N/A |
| L7 | R13->R14 | L7 | INT | IP-7 | N/A |
| L8 | R13->R14 | L8 | EXT | IP-17 | L8 |
| L9 | R13->R14 | L9 | EXT | IP-17 | L9 |
| L10 | R13->R14 | L10 | EXT | IP-12 | L10 |
| L11 | R13->R14 | L11 | EXT | IP-12 | L11 |
| L12 | R13->R14 | L12 | INT | IP-12 | N/A |
| L13 | LOCAL | NONE | INT | N/A | N/A |
| L14 | R13->R14 | L14 | INT | IP-14 | N/A |
| L15 | R13->R14 | L15 | INT | IP-15 | N/A |
| L16 | R13->R14 | L16 | EXT | IP-17 | L16 |
| L17 | R13->R14 | L17 | INT | IP-17 | N/A |

STATELESS MULTICAST IN MULTI-DOMAIN NETWORKS

TECHNICAL FIELD

Various example embodiments relate generally to communication systems and, more particularly but not exclusively, to supporting stateless multicast in communication systems.

BACKGROUND

In many communication networks, various communications technologies may be used to support various communications which may be supported using various protocols.

SUMMARY

In at least some example embodiments, an apparatus includes at least one processor and at least one memory including a set of instructions, wherein the set of instructions is configured to, when executed by the at least one processor, cause the apparatus to determine, by a node associated with a sub-domain of a network domain, a set of egress nodes of a packet of a multicast flow for a multicast group, determine, by the node based on the set of egress nodes of the packet, a set of external egress nodes that are located outside of the sub-domain and that are served by a common border node of the sub-domain, generate, by the node based on the set of external egress nodes, a label switched packet including an encoding of an indication of the set of external egress nodes, and send, by the node toward the common border node based on unicast forwarding, the label switched packet. In at least some example embodiments, the node associated with the sub-domain is an ingress node for the multicast flow, wherein the set of egress nodes of the packet is the set of egress nodes of the multicast group. In at least some example embodiments, the packet is generated by the ingress node based on a packet of a multicast source. In at least some example embodiments, the node associated with the sub-domain is a second border node of the sub-domain, wherein the set of egress nodes of the packet is a subset of the egress nodes of the multicast group. In at least some example embodiments, the packet is received by the second border node of the sub-domain via a unicast tunnel. In at least some example embodiments, the set of external egress nodes is determined based on routing information maintained by the node. In at least some example embodiments, the routing information includes, for each network node in a set of network nodes of the network domain, an indication as to whether the respective network node is internal or external to the sub-domain of the node. In at least some example embodiments, the routing information includes, for each of the network nodes of the network domain that is external to the sub-domain of the node, an indication as to a border node with which the respective network node is associated and an address of the border node with which the respective network node is associated. In at least some example embodiments, the routing information includes Internet Protocol (IP) based routing information. In at least some example embodiments, the encoding of an indication of the set of external egress nodes includes a set of node identifiers identifying the respective external egress nodes. In at least some example embodiments, to send the packet, the set of instructions is configured to, when executed by the at least one processor, cause the apparatus to forward, by the node toward the common border node via a unicast tunnel from the node to the common border node, the packet. In at least some example embodiments, the set of instructions is configured to, when executed by the at least one processor, cause the apparatus to determine, by the node based on a list of preferred tunnel types associated with the common border node, a tunnel type of the unicast tunnel from the node to the common border node. In at least some example embodiments, the unicast tunnel includes a Generic Routing Encapsulation (GRE) tunnel, a Multiprotocol Label Switching (MPLS) in User Datagram Protocol (MPLS-in-UDP) tunnel, an MPLS Label Switched Path (LSP), or an Interior Gateway Protocol (IGP) shortcut. In at least some example embodiments, the set of instructions is configured to, when executed by the at least one processor, cause the apparatus to determine, by the node based on the set of egress nodes of the packet, a set of internal egress nodes that are located inside of the sub-domain, generate, by the node based on the set of internal egress nodes, a second label switched packet including an encoding of an indication of the set of internal egress nodes, and send, by the node within the sub-domain based on multicast forwarding, the second label switched packet. In at least some example embodiments, the encoding of an indication of the set of internal egress nodes includes a set of node identifiers identifying the respective internal egress nodes. In at least some example embodiments, the set of instructions is configured to, when executed by the at least one processor, cause the apparatus to maintain, by the node, a route table including a prefix field configured to indicate a route prefix, a next-hop field configured to indicate a next hop for the route prefix, a scope field configured to indicate whether a scope of the route prefix is internal to the sub-domain or external to the sub-domain, and a border node field configured to indicate a border node for the route prefix. In at least some example embodiments, the set of instructions is configured to, when executed by the at least one processor, cause the apparatus to maintain, by the node, a mapping table including a prefix field configured to indicate a route prefix, a next-hop field configured to indicate a next hop for the route prefix, a next-hop label field configured to indicate a label of the next hop for the route prefix, a scope field configured to indicate whether a scope of the route prefix is internal to the sub-domain or external to the sub-domain, a border node field configured to indicate a border node for the route prefix, and a border node label field configured to indicate a label of the border node for the route prefix. In at least some example embodiments, the set of instructions is configured to, when executed by the at least one processor, cause the apparatus to maintain, by the node, a border node tunnel table including an address field configured to indicate an address of a border node, a tunnel preference field configured to indicate a list of tunnel type preferences for tunneling from the node to the border node, and a resolved tunnel field configured to indicate a list of resolved unicast tunnels from the node to the border node. In at least some example embodiments, the set of instructions is configured to, when executed by the at least one processor, cause the apparatus to maintain, by the node, a mapping table including an incoming label field configured to indicate an incoming label received by the node, a next-hop field configured to indicate a next hop for the incoming label, a next-hop label field configured to indicate a label of the next hop for the incoming label, a scope field configured to indicate whether a scope of the incoming label is internal to the sub-domain or external to the sub-domain, a border node field configured to indicate a border node for the incoming label, and a border node label field configured to indicate a label of the border node for the incoming label.

In at least some example embodiments, the sub-domain includes a Shortest Path First (OSPF) area, an OSPF version 3 (OSPFv3) area, an Intermediate-System-to-Intermediate-System (IS-IS) level, or a Border Gateway Protocol (BGP) autonomous system (AS).

In at least some example embodiments, a non-transitory computer-readable medium stores a set of instructions configured to cause an apparatus to determine, by a node associated with a sub-domain of a network domain, a set of egress nodes of a packet of a multicast flow for a multicast group, determine, by the node based on the set of egress nodes of the packet, a set of external egress nodes that are located outside of the sub-domain and that are served by a common border node of the sub-domain, generate, by the node based on the set of external egress nodes, a label switched packet including an encoding of an indication of the set of external egress nodes, and send, by the node toward the common border node based on unicast forwarding, the label switched packet. In at least some example embodiments, the node associated with the sub-domain is an ingress node for the multicast flow, wherein the set of egress nodes of the packet is the set of egress nodes of the multicast group. In at least some example embodiments, the packet is generated by the ingress node based on a packet of a multicast source. In at least some example embodiments, the node associated with the sub-domain is a second border node of the sub-domain, wherein the set of egress nodes of the packet is a subset of the egress nodes of the multicast group. In at least some example embodiments, the packet is received by the second border node of the sub-domain via a unicast tunnel. In at least some example embodiments, the set of external egress nodes is determined based on routing information maintained by the node. In at least some example embodiments, the routing information includes, for each network node in a set of network nodes of the network domain, an indication as to whether the respective network node is internal or external to the sub-domain of the node. In at least some example embodiments, the routing information includes, for each of the network nodes of the network domain that is external to the sub-domain of the node, an indication as to a border node with which the respective network node is associated and an address of the border node with which the respective network node is associated. In at least some example embodiments, the routing information includes Internet Protocol (IP) based routing information. In at least some example embodiments, the encoding of an indication of the set of external egress nodes includes a set of node identifiers identifying the respective external egress nodes. In at least some example embodiments, to send the packet, the set of instructions is configured to cause the apparatus to forward, by the node toward the common border node via a unicast tunnel from the node to the common border node, the packet. In at least some example embodiments, the set of instructions is configured to cause the apparatus to determine, by the node based on a list of preferred tunnel types associated with the common border node, a tunnel type of the unicast tunnel from the node to the common border node. In at least some example embodiments, the unicast tunnel includes a Generic Routing Encapsulation (GRE) tunnel, a Multiprotocol Label Switching (MPLS) in User Datagram Protocol (MPLS-in-UDP) tunnel, an MPLS Label Switched Path (LSP), or an Interior Gateway Protocol (IGP) shortcut. In at least some example embodiments, the set of instructions is configured to cause the apparatus to determine, by the node based on the set of egress nodes of the packet, a set of internal egress nodes that are located inside of the sub-domain, generate, by the node based on the set of internal egress nodes, a second label switched packet including an encoding of an indication of the set of internal egress nodes, and send, by the node within the sub-domain based on multicast forwarding, the second label switched packet. In at least some example embodiments, the encoding of an indication of the set of internal egress nodes includes a set of node identifiers identifying the respective internal egress nodes. In at least some example embodiments, the set of instructions is configured to cause the apparatus to maintain, by the node, a route table including a prefix field configured to indicate a route prefix, a next-hop field configured to indicate a next hop for the route prefix, a scope field configured to indicate whether a scope of the route prefix is internal to the sub-domain or external to the sub-domain, and a border node field configured to indicate a border node for the route prefix. In at least some example embodiments, the set of instructions is configured to cause the apparatus to maintain, by the node, a mapping table including a prefix field configured to indicate a route prefix, a next-hop field configured to indicate a next hop for the route prefix, a next-hop label field configured to indicate a label of the next hop for the route prefix, a scope field configured to indicate whether a scope of the route prefix is internal to the sub-domain or external to the sub-domain, a border node field configured to indicate a border node for the route prefix, and a border node label field configured to indicate a label of the border node for the route prefix. In at least some example embodiments, the set of instructions is configured to cause the apparatus to maintain, by the node, a border node tunnel table including an address field configured to indicate an address of a border node, a tunnel preference field configured to indicate a list of tunnel type preferences for tunneling from the node to the border node, and a resolved tunnel field configured to indicate a list of resolved unicast tunnels from the node to the border node. In at least some example embodiments, the set of instructions is configured to cause the apparatus to maintain, by the node, a mapping table including an incoming label field configured to indicate an incoming label received by the node, a next-hop field configured to indicate a next hop for the incoming label, a next-hop label field configured to indicate a label of the next hop for the incoming label, a scope field configured to indicate whether a scope of the incoming label is internal to the sub-domain or external to the sub-domain, a border node field configured to indicate a border node for the incoming label, and a border node label field configured to indicate a label of the border node for the incoming label. In at least some example embodiments, the sub-domain includes a Shortest Path First (OSPF) area, an OSPF version 3 (OSPFv3) area, an Intermediate-System-to-Intermediate-System (IS-IS) level, or a Border Gateway Protocol (BGP) autonomous system (AS).

In at least some example embodiments, a method includes determining, by a node associated with a sub-domain of a network domain, a set of egress nodes of a packet of a multicast flow for a multicast group, determining, by the node based on the set of egress nodes of the packet, a set of external egress nodes that are located outside of the sub-domain and that are served by a common border node of the sub-domain, generating, by the node based on the set of external egress nodes, a label switched packet including an encoding of an indication of the set of external egress nodes, and sending, by the node toward the common border node based on unicast forwarding, the label switched packet. In at least some example embodiments, the node associated with the sub-domain is an ingress node for the multicast flow, wherein the set of egress nodes of the packet is the set of egress nodes of the multicast group. In at least some example embodiments, the packet is generated by the ingress node based on a packet of a multicast source. In at least some example embodiments, the node associated with the sub-domain is a second border node of the sub-domain, wherein the set of egress nodes of the packet is a subset of the egress nodes of the multicast group. In at least some example embodiments, the packet is received by the second border node of the sub-domain via a unicast tunnel. In at least some example embodiments, the set of external egress nodes is determined based on routing information maintained by the node. In at least some example embodiments, the routing information includes, for each network node in a set of network nodes of the network domain, an indication as to whether the respective network node is internal or external to the sub-domain of the node. In at least some example embodiments, the routing information includes, for each of the network nodes of the network domain that is external to the sub-domain of the node, an indication as to a border node with which the respective network node is associated and an address of the border node with which the respective network node is associated. In at least some example embodiments, the routing information includes Internet Protocol (IP) based routing information. In at least some example embodiments, the encoding of an indication of the set of external egress nodes includes a set of node identifiers identifying the respective external egress nodes. In at least some example embodiments, sending the packet includes forwarding, by the node toward the common border node via a unicast tunnel from the node to the common border node, the packet. In at least some example embodiments, the method includes determining, by the node based on a list of preferred tunnel types associated with the common border node, a tunnel type of the unicast tunnel from the node to the common border node. In at least some example embodiments, the unicast tunnel includes a Generic Routing Encapsulation (GRE) tunnel, a Multiprotocol Label Switching (MPLS) in User Datagram Protocol (MPLS-in-UDP) tunnel, an MPLS Label Switched Path (LSP), or an Interior Gateway Protocol (IGP) shortcut. In at least some example embodiments, the method includes determining, by the node based on the set of egress nodes of the packet, a set of internal egress nodes that are located inside of the sub-domain, generating, by the node based on the set of internal egress nodes, a second label switched packet including an encoding of an indication of the set of internal egress nodes, and sending, by the node within the sub-domain based on multicast forwarding, the second label switched packet. In at least some example embodiments, the encoding of an indication of the set of internal egress nodes includes a set of node identifiers identifying the respective internal egress nodes. In at least some example embodiments, the method includes maintaining, by the node, a route table including a prefix field configured to indicate a route prefix, a next-hop field configured to indicate a next hop for the route prefix, a scope field configured to indicate whether a scope of the route prefix is internal to the sub-domain or external to the sub-domain, and a border node field configured to indicate a border node for the route prefix. In at least some example embodiments, the method includes maintaining, by the node, a mapping table including a prefix field configured to indicate a route prefix, a next-hop field configured to indicate a next hop for the route prefix, a next-hop label field configured to indicate a label of the next hop for the route prefix, a scope field configured to indicate whether a scope of the route prefix is internal to the sub-domain or external to the sub-domain, a border node field configured to indicate a border node for the route prefix, and a border node label field configured to indicate a label of the border node for the route prefix. In at least some example embodiments, the method includes maintaining, by the node, a border node tunnel table including an address field configured to indicate an address of a border node, a tunnel preference field configured to indicate a list of tunnel type preferences for tunneling from the node to the border node, and a resolved tunnel field configured to indicate a list of resolved unicast tunnels from the node to the border node. In at least some example embodiments, the method includes maintaining, by the node, a mapping table including an incoming label field configured to indicate an incoming label received by the node, a next-hop field configured to indicate a next hop for the incoming label, a next-hop label field configured to indicate a label of the next hop for the incoming label, a scope field configured to indicate whether a scope of the incoming label is internal to the sub-domain or external to the sub-domain, a border node field configured to indicate a border node for the incoming label, and a border node label field configured to indicate a label of the border node for the incoming label. In at least some example embodiments, the sub-domain includes a Shortest Path First (OSPF) area, an OSPF version 3 (OSPFv3) area, an Intermediate-System-to-Intermediate-System (IS-IS) level, or a Border Gateway Protocol (BGP) autonomous system (AS).

In at least some example embodiments, an apparatus includes means for determining, by a node associated with a sub-domain of a network domain, a set of egress nodes of a packet of a multicast flow for a multicast group, means for determining, by the node based on the set of egress nodes of the packet, a set of external egress nodes that are located outside of the sub-domain and that are served by a common border node of the sub-domain, means for generating, by the node based on the set of external egress nodes, a label switched packet including an encoding of an indication of the set of external egress nodes, and means for sending, by the node toward the common border node based on unicast forwarding, the label switched packet. In at least some example embodiments, the node associated with the sub-domain is an ingress node for the multicast flow, wherein the set of egress nodes of the packet is the set of egress nodes of the multicast group. In at least some example embodiments, the packet is generated by the ingress node based on a packet of a multicast source. In at least some example embodiments, the node associated with the sub-domain is a second border node of the sub-domain, wherein the set of egress nodes of the packet is a subset of the egress nodes of the multicast group. In at least some example embodiments, the packet is received by the second border node of the sub-domain via a unicast tunnel. In at least some example embodiments, the set of external egress nodes is determined based on routing information maintained by the node. In at least some example embodiments, the routing information includes, for each network node in a set of network nodes of the network domain, an indication as to whether the respective network node is internal or external to the sub-domain of the node. In at least some example embodiments, the routing information includes, for each of the network nodes of the network domain that is external to the sub-domain of the node, an indication as to a border node with which the respective network node is associated and an address of the border node with which the respective network node is associated. In at least some example embodiments, the routing information includes Internet Protocol (IP) based routing information. In at least some example embodiments, the encoding of an indication of the set of external egress nodes includes a set of node identifiers identifying the respective external egress nodes. In at least some example embodiments, the means for sending the packet includes means for forwarding, by the node toward the common border node via a unicast tunnel from the node to the common border node, the packet. In at least some example embodiments, the apparatus includes means for determining, by the node based on a list of preferred tunnel types associated with the common border node, a tunnel type of the unicast tunnel from the node to the common border node. In at least some example embodiments, the unicast tunnel includes a Generic Routing Encapsulation (GRE) tunnel, a Multiprotocol Label Switching (MPLS) in User Datagram Protocol (MPLS-in-UDP) tunnel, an MPLS Label Switched Path (LSP), or an Interior Gateway Protocol (IGP) shortcut. In at least some example embodiments, the apparatus includes means for determining, by the node based on the set of egress nodes of the packet, a set of internal egress nodes that are located inside of the sub-domain, means for generating, by the node based on the set of internal egress nodes, a second label switched packet including an encoding of an indication of the set of internal egress nodes, and means for sending, by the node within the sub-domain based on multicast forwarding, the second label switched packet. In at least some example embodiments, the encoding of an indication of the set of internal egress nodes includes a set of node identifiers identifying the respective internal egress nodes. In at least some example embodiments, the apparatus includes means for maintaining, by the node, a route table including a prefix field configured to indicate a route prefix, a next-hop field configured to indicate a next hop for the route prefix, a scope field configured to indicate whether a scope of the route prefix is internal to the sub-domain or external to the sub-domain, and a border node field configured to indicate a border node for the route prefix. In at least some example embodiments, the apparatus includes means for maintaining, by the node, a mapping table including a prefix field configured to indicate a route prefix, a next-hop field configured to indicate a next hop for the route prefix, a next-hop label field configured to indicate a label of the next hop for the route prefix, a scope field configured to indicate whether a scope of the route prefix is internal to the sub-domain or external to the sub-domain, a border node field configured to indicate a border node for the route prefix, and a border node label field configured to indicate a label of the border node for the route prefix. In at least some example embodiments, the apparatus includes means for maintaining, by the node, a border node tunnel table including an address field configured to indicate an address of a border node, a tunnel preference field configured to indicate a list of tunnel type preferences for tunneling from the node to the border node, and a resolved tunnel field configured to indicate a list of resolved unicast tunnels from the node to the border node. In at least some example embodiments, the apparatus includes means for maintaining, by the node, a mapping table including an incoming label field configured to indicate an incoming label received by the node, a next-hop field configured to indicate a next hop for the incoming label, a next-hop label field configured to indicate a label of the next hop for the incoming label, a scope field configured to indicate whether a scope of the incoming label is internal to the sub-domain or external to the sub-domain, a border node field configured to indicate a border node for the incoming label, and a border node label field configured to indicate a label of the border node for the incoming label. In at least some example embodiments, the sub-domain includes a Shortest Path First (OSPF) area, an OSPF version 3 (OSPFv3) area, an Intermediate-System-to-Intermediate-System (IS-IS) level, or a Border Gateway Protocol (BGP) autonomous system (AS).

In at least some example embodiments, an apparatus includes at least one processor and at least one memory including a set of instructions, wherein the set of instructions is configured to, when executed by the at least one processor, cause the apparatus to support, by a communication device associated with a sub-domain of a network domain, communication of a label switched packet of a multicast flow for a multicast group including a set of egress nodes, wherein the label switched packet includes an encoding of an indication of a subset of egress nodes, from the set of egress nodes, that are located outside of the sub-domain and that are served by a common border node of the sub-domain. In at least some example embodiments, a non-transitory computer-readable medium stores a set of instructions configured to cause an apparatus to support, by a communication device associated with a sub-domain of a network domain, communication of a label switched packet of a multicast flow for a multicast group including a set of egress nodes, wherein the label switched packet includes an encoding of an indication of a subset of egress nodes, from the set of egress nodes, that are located outside of the sub-domain and that are served by a common border node of the sub-domain. In at least some example embodiments, a method includes supporting, by a communication device associated with a sub-domain of a network domain, communication of a label switched packet of a multicast flow for a multicast group including a set of egress nodes, wherein the label switched packet includes an encoding of an indication of a subset of egress nodes, from the set of egress nodes, that are located outside of the sub-domain and that are served by a common border node of the sub-domain. In at least some example embodiments, an apparatus includes means for supporting, by a communication device associated with a sub-domain of a network domain, communication of a label switched packet of a multicast flow for a multicast group including a set of egress nodes, wherein the label switched packet includes an encoding of an indication of a subset of egress nodes, from the set of egress nodes, that are located outside of the sub-domain and that are served by a common border node of the sub-domain.

BRIEF DESCRIPTION OF THE DRAWINGS

The teachings herein can be readily understood by considering the following detailed description in conjunction with the accompanying drawings, in which:

FIG. 2 depicts an example embodiment of a method for resolution and programming of a BE-LSP;

FIG. 3A depicts an example embodiment of an IP Route Table in router R1 of the communication system of FIG. 1;

FIG. 3B depicts an example embodiment of an MPLS data plane, including an FTN Table and an ILM Table, in router R1 of the communication system of FIG. 1;

FIG. 4A depicts an example embodiment of an IP Route Table in router R5 of the communication system of FIG. 1;

FIG. 4B depicts an example embodiment of an MPLS data plane, including an FTN Table and an ILM Table, in router R5 of the communication system of FIG. 1;

FIG. 9 depicts an example embodiment of an OSPF Route Table in the control plane of router R1 of the multi-domain packet distribution network of FIG. 8;

FIG. 10A depicts an example embodiment of an IP Route Table in router R1 of the multi-domain packet distribution network of FIG. 8;

FIG. 10B depicts an example embodiment of an MPLS data plane, including an FTN Table and an ILM Table, in router R1 of the multi-domain packet distribution network of FIG. 8;

FIG. 11 depicts an example embodiment of an OSPF Route Table in the control plane of router R13 of the multi-domain packet distribution network of FIG. 8;

FIG. 12A depicts an example embodiment of an IP Route Table in router R13 of the multi-domain packet distribution network of FIG. 8;

FIG. 12B depicts an example embodiment of an MPLS data plane, including an FTN Table and an ILM Table, in router R13 of the multi-domain packet distribution network of FIG. 8;

FIG. 14A depicts an example embodiment of an IP Route Table in router R1 of the multi-domain packet distribution network of FIG. 13;

FIGS. 14B-1 and 14B-2 depict an example embodiment of an MPLS data plane, including an FTN Table, a BR Tunnel Table, and an ILM Table, in router R1 of the multi-domain packet distribution network of FIG. 13;

FIG. 15A depicts an example embodiment of an IP Route Table in router R13 of the multi-domain packet distribution network of FIG. 13;

FIGS. 15B-1 and 15B-2 depict an example embodiment of an MPLS data plane, including an FTN Table, a BR Tunnel Table, and an ILM Table, in router R13 of the multi-domain packet distribution network of FIG. 13;

FIG. 16 depicts an example embodiment of an EMLS packet format which may be used for EMLS-I packets and EMLS-E packets;

FIG. 17 depicts an example embodiment of an EMLS Descriptor label which may be used within the context of the EMLS packet of FIG. 16;

FIG. 19 depicts an example embodiment of a GRE encapsulated tunnel format configured to support tunneling of EMLS-E packets over an IP delivery network;

FIG. 20 depicts an example embodiment of a GRE encapsulated tunnel format configured to support tunneling of an EMLS-E packet over an IP delivery network;

FIG. 22 depicts an example embodiment of an MPLS-in-UDP encapsulation format configured to support tunneling of EMLS-E packets over an IP delivery network;

FIG. 23 depicts an example embodiment of an MPLS-in-UDP encapsulated tunnel format configured to support tunneling of an EMLS-E packet over an IP delivery network;

FIG. 25 depicts an example embodiment of an MPLS LSP tunnel format configured to support tunneling of an EMLS-E packet over an MPLS delivery network;

FIG. 26 depicts an example embodiment of the format of an EMLS-E packet tunneled over an MPLS LSP in the multi-domain packet distribution network of FIG. 13;

FIG. 28A depicts an example embodiment of an IP Route Table, in router R13 of the multi-domain packet distribution network of FIG. 13, for supporting IP tunneling of EMLS-E packets;

FIGS. 28B-1 and 28B-2 depict an example embodiment of an MPLS data plane, including an FTN Table, a BR Tunnel Table, and an ILM Table, in router R13 of the multi-domain packet distribution network of FIG. 13, for supporting IP tunneling of EMLS-E packets;

FIG. 29A depicts an example embodiment of an IP Route Table, in router R13 of the multi-domain packet distribution network of FIG. 13, for supporting MPLS-based tunneling of EMLS-E packets;

FIGS. 29B-1 and 29B-2 depict an example embodiment of an MPLS data plane, including an FTN Table, a BR Tunnel Table, and an ILM Table, in router R13 of the multi-domain packet distribution network of FIG. 13, for supporting MPLS-based tunneling of EMLS-E packets;

To facilitate understanding, identical reference numerals have been used herein, wherever possible, in order to designate identical elements that are common among the various figures.

DETAILED DESCRIPTION

Various example embodiments for supporting stateless multicast in communication networks are presented. Various example embodiments for supporting stateless multicast in communication networks may be configured to support stateless multicast in multi-domain packet distribution networks. Various example embodiments for supporting stateless multicast in communication networks may be configured to support stateless multicast in communication networks which may be based on various types of routing protocols (e.g., Open Shortest Path First (OSPF), Intermediate-System-to-Intermediate-System (IS-IS), Border Gateway Protocol (BGP), or the like, as well as various combinations thereof), various types of routing (e.g., Internet Protocol (IP) routing, Multiprotocol Label Switching (MPLS) routing, or the like, as well as various combinations thereof), or the like, as well as various combinations thereof Various example embodiments for supporting stateless multicast, in a multi-domain packet distribution network that has been divided into sub-domains, may be configured to support multicast of packets based on use of internal multicast packets for multicast communication of the multicast packets within sub-domains of the multi-domain packet distribution network and use of external multicast packets for unicast communication of the multicast packets across and between sub-domains of the multi-domain packet distribution network. It will be appreciated that these and various other example embodiments and advantages or potential advantages of supporting stateless multicast in multi-domain packet distribution networks may be further understood by way of reference to the various figures, which are discussed further below.

Figure 1:
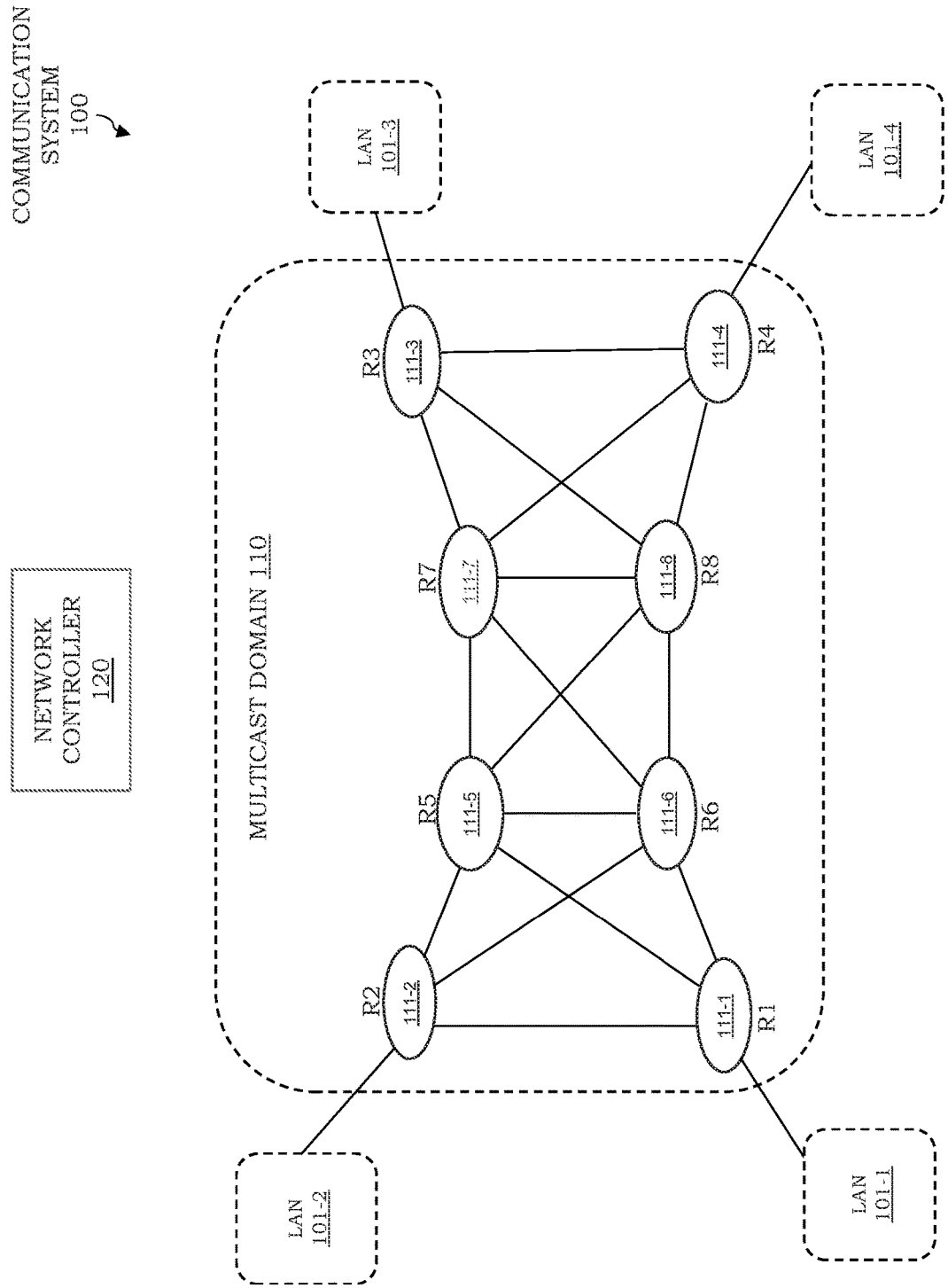
FIG. 1 depicts an example embodiment of a communication system configured to support stateless multicast in a multi-domain packet distribution network.

FIG. 1 depicts an example embodiment of a communication system configured to support stateless multicast in a multi-domain packet distribution network.

The communication system 100 includes a set of local area networks (LANs) 101-1-101-4 (collectively, LANs 101) interconnected via a multicast domain 110 which is controlled by a network controller 120. It will be appreciated that although, for simplicity, the LANs 101 are used as the originators and recipients of packets being multicast via the multicast domain 110, the multicast domain 110 may be configured to support multicast of packets for various other applications (e.g., Virtual Private Networks (VPNs), Virtual Private LAN Services (VPLSs), Border Gateway Protocol—Ethernet Virtual Private Network (BGP—EVPN) services, or the like, as well as various combinations thereof). The multicast domain 110 includes a set of routers 111-1-111-8 (collectively, routers 111) which, for ease of reference, also are referred to herein as R1-R8 (e.g., R1 is router 111-1, R2 is router 111-2, and so forth, or, more generally, Rx is router 111-x), respectively. The routers 111-1 to 111-4 are configured as access points to the multicast domain 110 for the LANs 101-1 to 101-4, respectively.

The multicast domain 110 is configured to support multicast communications. In general, multicast is a capability for sending packets to a group of interested receivers in a single transmission. In general, multicast uses network infrastructure efficiently by having the source send a packet only once, even if it needs to be delivered to a large number of receivers. The nodes in the network take care of replicating the packet to the multiple receivers, as necessary. For example, assume that the multicast domain 110 supports three multicast flows from router 111-1 (as the source S) as follows: (1) Flow 1: (S=111-1, G=G1) to egress routers 111-3, 111-4, (2) Flow 2: (S=111-1, G=G2) to egress routers 111-2, 111-3, and (3) Flow 3: (S=111-1, G=G3) to egress router: 111-2, 111-3, and 111-4. It will be appreciated that the multicast domain 110 may support various types of multicast (e.g., IP multicast, MPLS multicast, or the like). It will be appreciated that IP and/or MPLS multicast may be employed in various applications of streaming media, such as IP Television (IPTV), multi-point video conferencing, and the like. It will be appreciated that the multicast domain 110 may support stateful multicast, stateless multicast, or the like. It is noted that various aspects of various example embodiments for stateless multicast may be further understood by first considering aspects of stateful multicast.

As indicated above, multicast communication may be supported based on use of IP multicast. IP multicast is the IP-specific version of the general concept of multicast networking. It uses reserved multicast address blocks in IPv4 and IPv6 as the destination address (e.g., group address G) in the IP header. In Point-to-Multipoint (P2MP) IP multicast, a single IP packet is sent by a source S to the group address G which is received by all nodes that are members of G. Here, a flow can be described as (S, G), i.e. from a source S to the group G constitutes a flow. In Multipoint-to-Multipoint (MP2MP) IP multicast, a single IP packet is sent by any source to the group address G, which is received by all nodes that are members of G. Here, a multicast flow can be described as (*, G), i.e., from any source to the group G constitutes a flow.

As indicated above, where the multicast domain 110 supports stateful IP multicast, the multicast flows may be set up across the multicast domain 110 by an IP multicast control plane. A Multicast Distribution Tree (MDT) for a specific IP multicast flow may be set up by control protocols, such as Protocol Independent Multicast (PIM), PIM—Sparse Mode (PIM-SM), PIM—Dense Mode (PIM-DM), or the like. The control protocols set up the MDT by configuring the multicast flow in each router along the MDT. This form of IP multicast is stateful since every router along the MDT is required to maintain states for the MDT in the control plane and the data plane. The egress routers may rely on IGMP to learn interests of locally connected hosts/receivers in LANs for a specific G from a source S, and the egress routers may then initiate "(S, G) join" requests towards S by using PIM. The PIM join traverses the nodes along the shortest path to S, while installing (S, G) state in control and data plane of the traversed nodes. A router that has received (S, G) join from a second router, installs the second router as a downstream/branch in the (S, G) state. This results in an MDT for the (S, G), where the root is S and every leaf node is an egress router interested in G. A packet sent by S on the (S, G) will be forwarded along the MDT based on (S, G) state at each forwarding router. This may be further understood by considering establishment of Flow 1. For example, egress routers 111-3 and 111-4 received interest on (S=111-1, G=G1) through IGMP request from host(s) in their LANs 101-3 and 101-4, respectively, thereby triggering egress routers 111-3 and 111-4 to initiate PIM joins for (S=111-1, G=G1) toward the router 111-7, since the router 111-7 is the immediate next-hop in the shortest path toward the source router 111-1. The router 111-7 installs state for (S=111-1, G=G1) in both the control plane and data plane with egress routers 111-3 and 111-4 as the downstream routers. The router 111-7 further sends the PIM join to router 111-5 and the router 111-5 installs state with the router 111-7 indicated as the downstream router. The router 111-5 further sends the PIM join to the source router 111-1 and the source router 111-1 creates the state for (S=111-1, G=G1) with the router 111-5 as the downstream router. This makes the MDT for (S=111-1, G=G1) complete. When the source router 111-1 transmits an IP packet with source address 111-1 and group address G2, it gets forwarded and replicated by transit routers along the established path of the MDT, to get delivered to the egress router 111-3 and 111-4. It will be appreciated that the actual source of the multicast flow could be an entity in the LAN 101-1, in which case, when the source router 111-1 receives a packet on the flow, the source router 111-1 would encapsulate the packet with an IP header with the source address as source router 111-1 and the destination address as G2 and then transmit the packet on the MDT.

As indicated above, multicast communication may be supported based on use of MPLS multicast. MPLS multicast is the MPLS-specific version of multicast networking, where multicast forwarding is based on MPLS labels.

As indicated above, where the multicast domain 110 supports stateful MPLS multicast, the multicast flows may be set up across the multicast domain 110 by an MPLS multicast control plane. MPLS MDTs are set up by control protocols such as P2MP Resource Reservation Protocol (P2MP-RSVP-TE), Multicast Label Distribution Protocol (mLDP), or the like. In mLDP, a P2MP MDT is identified by (S, T), where S is the source/root of the MDT and T is some form of identifier of the MDT. For example, assume that an mLDP-based MDT is configured as (S=111-1, T=T1) in the source router 111-1 and the egress routers 111-3 and 111-4. The egress routers 111-3 and 111-4 receive interest on IP multicast flow (S=111-1, G=G1) through IGMP requests from host(s) in their LANs 101-3 and 101-4, respectively. In both the routers, the IP multicast flow is mapped to the MPLS P2MP MDT (S, T1). This triggers routers 111-3 and 111-4 to initiate mLDP joins for (S=111-1, T=T1) toward router 111-7, since router 111-7 is the immediate next-hop in the shortest path towards ingress router 111-1. In mLDP, the join is a label mapping message that includes a label assigned by the downstream router to the upstream router for the MDT. The upstream router would send the packets for the MDT to the downstream router with that label based on which downstream router would identify the MDT and forward the packet accordingly. On receipt of the join, the router 111-7 installs state for (S=111-1, T=T1) in both the control plane and data plane with routers 111-3 and 111-4 as downstream routers. The router 111-7 further sends the mLDP join to router 111-5 and router 111-5 installs state in a manner similar to that of router 111-7 with router 111-7 as the downstream router. The router 111-5 further sends the mLDP join to the ingress router 111-1 and the ingress router 111-1 creates the state for the MDT with router 111-5 as the downstream router. This makes the MDT for (S=111-1, T=T1) complete. The MPLS data plane includes a Forwarding Equivalence Class (FEC) to Next-Hop Label Forwarding Entry (NHLFE) (FTN) Table and an Incoming Label Map (ILM) Table. The FTN Table is indexed by a FEC, which is an (S, T) that identifies an MDT in the current context, and an FTN entry includes the mapping of the FEC to the NHLFE where the NHLFE includes next-hop information (e.g., label, next-hop address, and the like). In the case of unicast best effort label switched paths (BE-LSPs), a FEC is an IP Prefix. The LSP is "best effort" because the LSP follows the shortest path or best policy-based path to the IP Prefix (as determined by the IP routing table in a router) and, thus, all packets associated with the IP Prefix gets forwarded on the same path irrespective of quality-of-service (QoS) requirements of packets. The ingress router of an LSP or MDT looks up an LSP or MDT in the FTN Table by its FEC (e.g., IP-Prefix, (S, T)) and then uses the NHLFE to send a packet over the LSP or MDT. The ILM Table is indexed by a label, which is the incoming label for an LSP or MDT, and an ILM entry includes the mapping of an incoming label to the NHLFE and is used by a transit or egress router of an LSP or egress routers of an MDT to process and forward a received MPLS packet. When the ingress router 111-1 transmits an IP packet with source address 111-1 and group address G2, the packet gets forwarded on the MDT for (S=111-1, T=T1) and replicated by transit routers along the established path of the MDT to get delivered to the egress routers 111-3 and 111-4. It will be appreciated that the actual source of the multicast flow could be an entity in LAN 101-1.

In general, when the multicast domain 110 supports stateful multicast, various applications may be supported. For simplicity, the LANs 101 are used in the examples as the originators and recipients of packets on an MDT; however, it will be appreciated that an MDT could be used by any other application (e.g., VPN, VPLS, BGP-EVPN, or the like) for multicast in those applications. It will be appreciated that applications that use an MDT for multicasting packets may be referred to more generally herein as multicast flow overlays. For example, in FIG. 1, the routers 111-1, 111-3, and 111-4 could be the provider edge (PE) routers providing IP-based VPN service. The multicast flow overlay may be considered to include the protocols and procedures between the routers 111-1, 111-3 and 111-4 as described in Multicast VPN (MVPN) and BGP-MVPN standards. The MVPN signaling described in such standards enables an ingress PE to determine the set of egress PEs for a given multicast flow (or set of flows) and also enables egress PE routers to determine the virtual routing and forwarding table (VRF) to which a multicast packet received from the MDT is to be forwarded. In VPN, a PE router has a locally connected VPN site. The ingress PE router receives a packet from its local VPN site, looks up the packet in the VRF of the VPN to identify the egress PE router for the packet, and, if the packet needs to be multicast to a set of egress PE routers, sends the packet on the MDT that has the egress routers as leaves. The egress PE routers determine the VRF to which a multicast packet received from the MDT is to be forwarded. It will be appreciated that these as well as various other applications also may be supported using stateless multicast.

As indicated above, multicast communications in multicast domain 110 may be supported based on use of stateless MPLS multicast. In FIG. 1, when a multicast data packet enters the multicast domain 110, handling of the multicast data packet within the multicast domain 110 in a stateless manner may be performed as follows. The ingress router (e.g., 111-1) determines the set of egress routers to which the packet needs to be sent. The ingress router then encapsulates the packet in a MPLS Label Stack, wherein each label in the stack represents exactly one egress router in the domain. Thus, the egress routers for the multicast packet are encoded into the packet itself. The label stack is denoted as an "Explicit Multicast Label Stack" (EMLS). The egress routers may be encoded in the EMLS by the labels of the BE-LSPs to the egress routers, respectively, which already exist in the MPLS network. In MPLS, BE-LSPs are the LSPs that are identified by an egress router (i.e., the destination of the LSP, which may be identified using the loopback IP address of the egress router or other suitable address of the egress router), such that there generally is only one BE-LSP to the egress router from any other router in the network, i.e., often multipoint-to-point (MP2P) in nature. The EMLS packet is forwarded using the data plane states of the unicast BE-LSPs to the egress routers. Thus, both multicast packets and unicast packets may be sent to the egress routers using the common MPLS data plane states. In other words, stateless MPLS multicast may reuse the MPLS control plane and data plane of unicast BE-LSPs without incurring any additional state in the control or data planes. In general, the term "best effort" generally means that such an LSP usually follows the shortest path to the egress router or a policy based best path to the egress router. The unicast BE-LSPs may be set up by various control plane protocols such as Label Distribution Protocol (LDP), Segment Routing (SR), Border Gateway Protocol (BGP), or the like. For example, unicast BE-LSPs set-up by LDP and SR follow the shortest path to egress router, whereas unicast BE-LSPs set-up by BGP follow a policy based best path to egress router. Identification of BE-LSPs are generalized as an IP-Prefix at an egress router, so that a BE-LSP may be set-up to carry all traffic destined to an IP Route at the egress router. For example, a BE-LSP can be identified by an IP address of the egress router (e.g., a loopback IP address configured in the egress router). The loopback IP address is independently advertised by the routing protocols (e.g., OSPF, OSPFv3, IS-IS, BGP, and the like) across the domain, based on which each router computes Shortest Path First (SPF) to the loopback IP address and, accordingly, sets up the forwarding state of the loopback address, i.e., installs it as an entry into the IP Route Table. To set-up the unicast BE-LSP, an egress router assigns a label to its IP loopback address from its local label space (e.g., a platform-wide label space) and the label mapping is distributed throughout the network using the MPLS control plane. A router that receives the label mapping(s) first looks up the loopback IP address in IP Route Table (e.g., based on Longest Prefix Match (LPM)) to find the shortest path next-hop for the address and then sets up the forwarding states of the BE-LSP with the label advertised by the next hop against the loopback IP address. For example, a label assigned to a loopback IP address of a router can be advertised as a Label Mapping to a Prefix FEC as described in the LDP standards. If the MPLS network supports SR, then such label mapping can be also distributed using the SR control plane (e.g., IS-IS, OSPF, OSPFv3, BGP-LS, or the like). For example, SR control plane can advertise such label mappings as Prefix Segment Identifiers (SIDs). It will be appreciated that the framework of FIG. 2 may be followed by various BE-LSP types, such as LDP, SR, BGP, or the like. It is noted that use of stateless multicast in an MPLS network obviates the need to implement per MDT control plane (e.g., mLDP, P2MP-RSVP-TE and the likes) and data plane states as used in stateful MPLS multicast. It is noted that next-hop resolution of a unicast BE-LSP based on an IP Route Table and, accordingly, programming of its state into the MPLS data plane may be performed as presented in FIG. 2. It is noted that, although primarily described within the context of use of BE-LSPs for unicast paths, in at least some example embodiments traffic engineering (TE) LSPs may be used for unicast paths.

FIG. 2 depicts an example embodiment of a method for resolution and programming of a BE-LSP in a router. It will be appreciated that, although primarily presented as being performed serially, at least a portion of the functions of method 200 may be performed contemporaneously or in a different order than as presented with respect to FIG. 2. The input to the method 200 includes a BE-LSP identified with an IP-Prefix. At block 201, the method 200 begins. Block 202 performs LPM of the IP-Prefix in the IP Route Table, and the method 200 then proceeds to block 204. Block 204 checks if a matching route entry is found. If a matching route entry is not found, then the method 200 proceeds to block 299, where the method 200 ends, otherwise the method 200 proceeds to block 206. Block 206 checks if the route entry is local, which means that the processing router is the egress router in the MPLS domain for the IP-Prefix. If the route entry is local, then the method 200 proceeds to block 214, otherwise the method 200 proceeds to block 208. Block 208 looks up a label mapping for the IP-Prefix from the next-hop router of the matching route entry, and the method 200 then proceeds to block 210. Block 210 checks if a label mapping is found. If a label mapping is not found, then the method 200 proceeds to block 299 where the method 200 ends, otherwise the method 200 proceeds to block 212. Block 212 programs the IP-Prefix in FTN Table with the next-hop as the next-hop of the route entry and the next-hop label as the label in the label mapping. Now, the router can be ingress for the BE-LSP. The method 200 then proceeds to block 214. Block 214 checks if a label mapping for the IP-Prefix can be advertised to neighboring routers. If a label mapping for the IP-Prefix cannot be advertised to neighboring routers, then the method 200 proceeds to block 299 where the method 200 ends, otherwise the method 200 proceeds to block 216. Block 216 allocates a local label for the IP-Prefix, and the method 200 then proceeds to block 218. Block 218 again checks if the route entry is local. If the route entry is local, then the method 200 proceeds to block 222, otherwise the method proceeds to block 220. Block 220 programs the label in the ILM Table with the next-hop as the next-hop of the route entry and the next-hop label as the label in the label mapping. Now, the router can be a transit router for the LSP, and the method proceeds to block 299 where the method 200 ends. Block 222 programs the label in ILM Table with the next-hop as local. Now, the router can be egress router for the BE-LSP, and the method proceeds to block 299 where the method 200 ends. At block 299, the method 200 ends.

In an MPLS network enabled with LDP or SR, shortest path unicast BE-LSPs would naturally exist between an ingress router to each possible egress router in the MPLS domain. Thus, stateless multicast of EMLS packets does not incur any additional control plane or data plane overhead. Each router along the way parses the EMLS packet, partitions the egress routers based on the next-hop of their unicast BE-LSPs, and forwards an appropriate EMLS packet to each of the next-hops. The EMLS packet forwarded to each next-hop is modified so that the label stack in the copy for a given next-hop includes only the labels that ought to be switched to that next-hop. An egress router removes the EMLS and forwards the packet in the context of the multicast flow overlay. For example, in FIG. 1, IP-x is the loopback address of router Rx which is assigned a label Lx. The label mapping is advertised throughout the network using the MPLS control plane. So, a unicast BE-LSP exists from egress router 111-1 to each of the egress routers 111-2, 111-3, and 111-4. For simplicity, this example shows the same label Lx is used to identify egress router Rx across the network; however, it will be appreciated that each router may allocate a label from its own local label space to identify unicast LSP x or a global label space may be used to allocate the labels for the unicast BE-LSPs. It is noted that the use of control plane and data plane information by routers 111 in the multicast domain 110 of the communication system 100 of FIG. 1 for forwarding multicast packets may be further understood by considering the forwarding information depicted in FIGS. 3A-3B (for router R1 of FIG. 1) and FIGS. 4A-4B (for router R5 of FIG. 1).

As indicated above, the router R1 may use forwarding information in the control plane and data plane for supporting forwarding of multicast packets. FIG. 3A depicts the IP Route Table in router 111-1, which is created in both the control plane and the data plane for forwarding IP packets. FIG. 3B depicts the FTN Table and ILM Table in the dataplane of the router 111-1. The next-hop of a unicast BE-LSP is resolved based on the next-hop LPM entry in the IP Route Table (in control plane), and then the BE-LSP is installed in the FTN Table and/or the ILM Table. In the FTN Table in FIG. 3B, the FEC also includes "Type" and "Tunnel ID" apart from IP-Prefix. The first reason is that each of the routing mechanisms (e.g., LDP, SR BGP, or the like) may set up one unicast BE-LSP to an egress router (IP-Prefix), so the "Type" field qualifies the type of mechanism that originated the LSP. For simplicity in FIG. 3B, it is assumed that only a single mechanism is used and, as a result, there is one FTN entry per IP-Prefix. The second reason is that TE-LSPs may be set-up by TE-based protocols (e.g., RSVP-TE, SR-TE, or the like). A single mechanism may set-up multiple TE-LSPs to an egress router, each guaranteeing a certain QoS. In that case, each TE-LSP will have an entry in the FTN Table with the same IP-Prefix and Type, but with a different Tunnel ID. There is no unicast TE-LSP in the example, so none is depicted in FIG. 3B. As indicated above, this forwarding information may be used to support forwarding of a multicast packet as follows. When router 111-1 wants to multicast a packet for (S=111-1, G=G3), router 111-1 looks up the unicast labels to egress routers 111-2, 111-3, and 111-4 in the FTN Table using the IP addresses IP-2, IP-3, and IP-4, respectively, which results in identification of labels L2, L3, and L4 respectively. The next-hop for all these labels is router 111-5, which is the common shortest path to reach the corresponding egress routers. So, an EMLS packet is generated with label stack={L2, L3, L4} and the EMLS packet is sent to router 111-5.

As indicated above, the router R1 may use forwarding information in the control plane and data plane for supporting forwarding of multicast packets. FIG. 4A depicts the IP Route Table in router 111-5, which is created in both the control plane and the data plane for forwarding IP packets. FIG. 4B describes the FTN Table and ILM Table in the dataplane of the router 111-5. The next-hop of a unicast BE-LSPs is resolved based on the next-hop LPM entry in the IP Route Table (in control plane), and then the BE-LSP is installed in the FTN Table and/or the ILM Table. In the FTN Table in FIG. 4B, the FEC also includes "Type" and "Tunnel ID" apart from IP-Prefix. When the router 111-5 receives the EMLS packet, the router 111-5 needs to process the EMLS to make forwarding decisions. The processing that a router does on receiving an EMLS packet may be as follows. The receiving router performs an ILM Table lookup to determine the next-hop and label for each of the labels listed in the EMLS. If an ILM entry for a label indicates that this is the egress router for the packet, then the label is removed from the EMLS and a local copy of the packet is sent to the upper layer, otherwise, processing continues as follows. The labels in the EMLS packet are partitioned based on their next-hops. The packet is replicated so that there is only one copy of the EMLS packet for each of the next-hops which are the basis for the partitioning of the labels in the EMLS packet. The EMLS in each of the copies is modified so that the label stack in the copy for a given next-hop includes only the labels that ought to be switched to that next-hop. Then modified copies of the EMLS packets are sent to the next-hops. It is noted that, if there is only one label for a next-hop, then the receiving router, as an optimization, can send the packet as a standard unicast MPLS packet with that label as there is no gain by formatting as EMLS packet. So, when the router 111-5 receives the packet with EMLS={L2, L3, L4}, it will, by the algorithm above, replicate the packet into following two copies, based on the shortest path of the unicast LSPs: (1) Copy 1 with EMLS={L2} is sent to router 111-2 and (2) copy2 with EMLS={L3, L4} is sent to router 111-7. The other routers in the path repeat the same procedure (e.g., routers 111-2 and 111-7 follows similar procedures as described for router 111-5) and, eventually, the packet gets delivered to egress router 111-2, 111-3, and 111-4.

It will be appreciated that, when network topology changes, the unicast BE-LSPs to the egress routers will adapt to the new topology. The forwarding paths of EMLS packet for a flow adapts automatically as well, since the path the EMLS packet would take to a given egress router follows the unicast BE-LSP to that egress router. Additionally, a router along the BE-LSP also may provide precomputed back-up paths for fast rerouting (FRR) of packets on the LSP in the event of a failure on the next-hop of the LSP. It is noted that the EMLS packets automatically derive such benefits provided by the unicast BE-LSPs.

Figure 5:
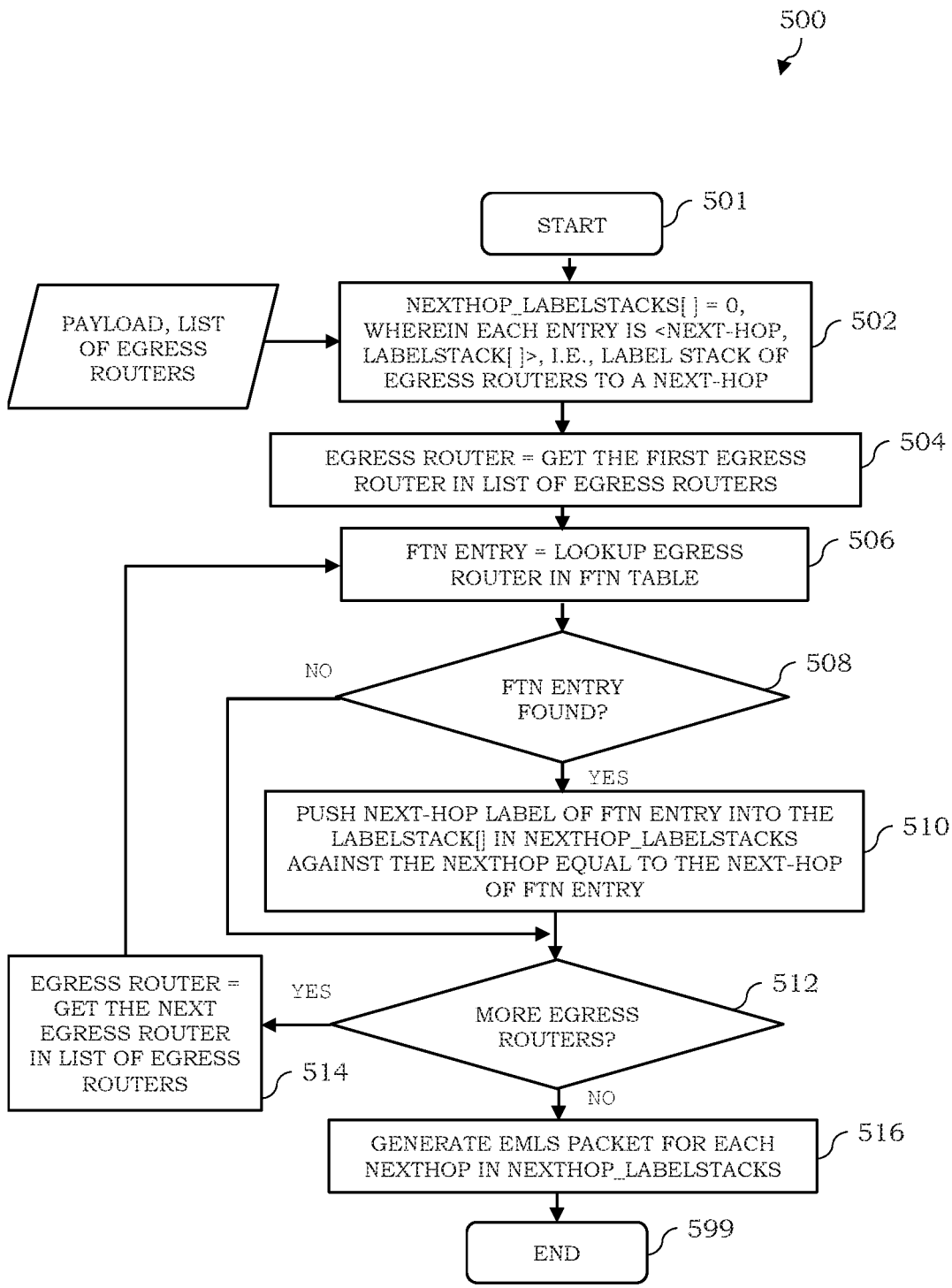
FIG. 5 depicts an example embodiment of a method for originating an EMLS packet at a node.

FIG. 5 depicts an example embodiment of a method for originating an EMLS packet at a node. It will be appreciated that, although primarily presented as being performed serially, at least a portion of the functions of method 500 may be performed contemporaneously or in a different order than as presented with respect to FIG. 5. The inputs to the method 500 include the payload (the packet that is to be multicast) and the list of egress routers participating in the multicast (each entry in the list is the loopback IP address at respective egress router). At block 501, the method 500 begins. Block 502 initializes an empty list of label stacks (NextHop_LabelStacks[]), wherein each label stack represents the subset of unicast BE-LSPs (egress routers) partitioned to a specific next-hop. The method 500 then proceeds to block 504. Block 504 retrieves the first egress router in the list of egress routers, and then the method 500 proceeds to block 506. Block 506 looks up the egress router (i.e., the IP address) in the FTN Table. It is noted that, in the FTN Table, there could be multiple shortest path BE-LSPs to an egress router. For example, the FTN Table may have one BE-LSP to the egress router set-up by each of LDP, BGP, and SR. In that case, the router may implement some preference policy to choose the appropriate BE-LSP (and its FTN Entry). The method 500 proceeds to block 508. Block 508 checks if a matching FTN entry found. If a matching FTN entry is not found, then the method 500 proceeds to block 512, otherwise the method 500 proceeds to block 510. Block 510 pushes the next-hop label of the FTN Entry into the Label Stack in NextHop_LabelStacks against the Next-Hop equal to the next-hop of the FTN Entry. The method 500 then proceeds to block 512. Block 512 checks if there are more egress routers to process in the list of egress routers. If there are more egress routers to process in the list of egress routers, then the method 500 proceeds to block 514, otherwise the method 500 proceeds to block 516. Block 514 retrieves the next egress router in the list of egress routers, and the method 500 then returns to block 506 to repeat subsequent blocks for the next egress router. Block 516, in which NextHop_LabelStacks now includes the label stacks of the BE-LSPs to the egress routers partitioned by their respective next-hops, generates and sends an EMLS packet with a copy of the Payload to each next-hop in NextHop LabelStacks, wherein the EMLS includes the label stack for the respective next-hop. From block 516, the method 500 proceeds to block 599. At block 599, the method 500 ends.

Figure 6:
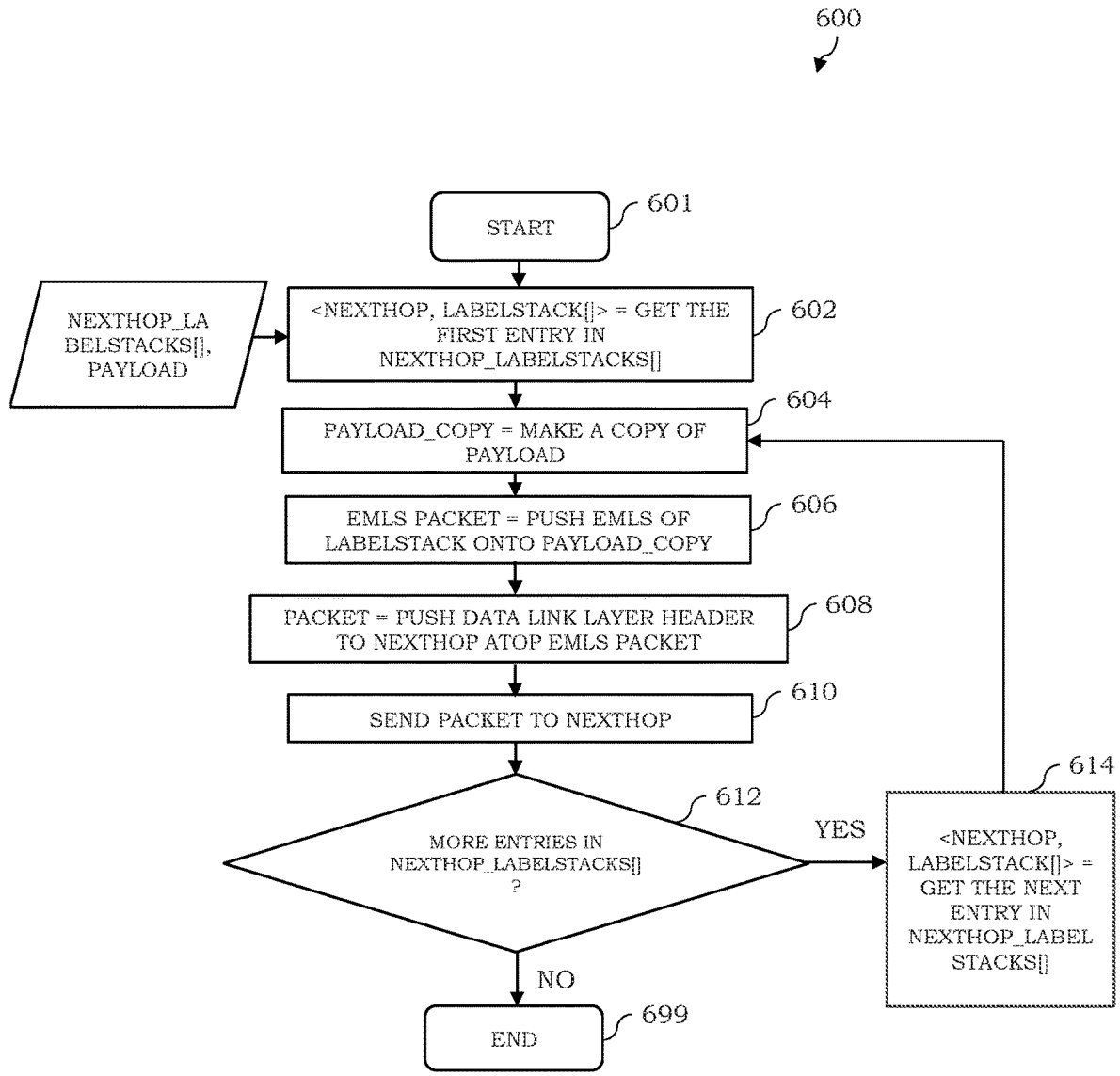
FIG. 6 depicts an example embodiment of a method for generation of EMLS packets to next hops.

FIG. 6 depicts an example embodiment of a method for generation of EMLS packets to next hops. It will be appreciated that method 600 of FIG. 6 may be used as block 516 of FIG. 5. It will be appreciated that, although primarily presented as being performed serially, at least a portion of the functions of method 600 may be performed contemporaneously or in a different order than as presented with respect to FIG. 6. The inputs to the method 600 include NextHop_LabelStacks[] and Payload. At block 601, the method 600 begins. Block 602 retrieves the first entry in the NextHop_LabelStacks, which is a label stack to a next-hop. The method 600 then proceeds to block 604. Block 604 replicates the Payload for the next-hop and then the method 600 proceeds to block 606. Block 606 pushes the EMLS including the label stack onto the replicated Payload, which results in the EMLS packet to the next-hop. The method 600 then proceeds to block 608. Block 608 pushes the data link layer header (e.g., Ethernet) to the next-hop atop the EMLS packet, and then the method 600 proceeds to block 610. Block 610 sends the packet to the next-hop, and then the method 600 proceeds to block 612. Block 612 checks if there are more entries in NextHop_LabelStacks. If there are no more entries in NextHop_LabelStacks, then the method 600 proceeds to block 699, where the method 600 ends. If there are more entries in NextHop_LabelStacks, then the method 600 proceeds to block 614. Block 614 retrieves the next entry in NextHop_LabelStacks and returns to block 604 to repeat the subsequent blocks for this entry. At block 699, the method 600 ends.

Figure 7:
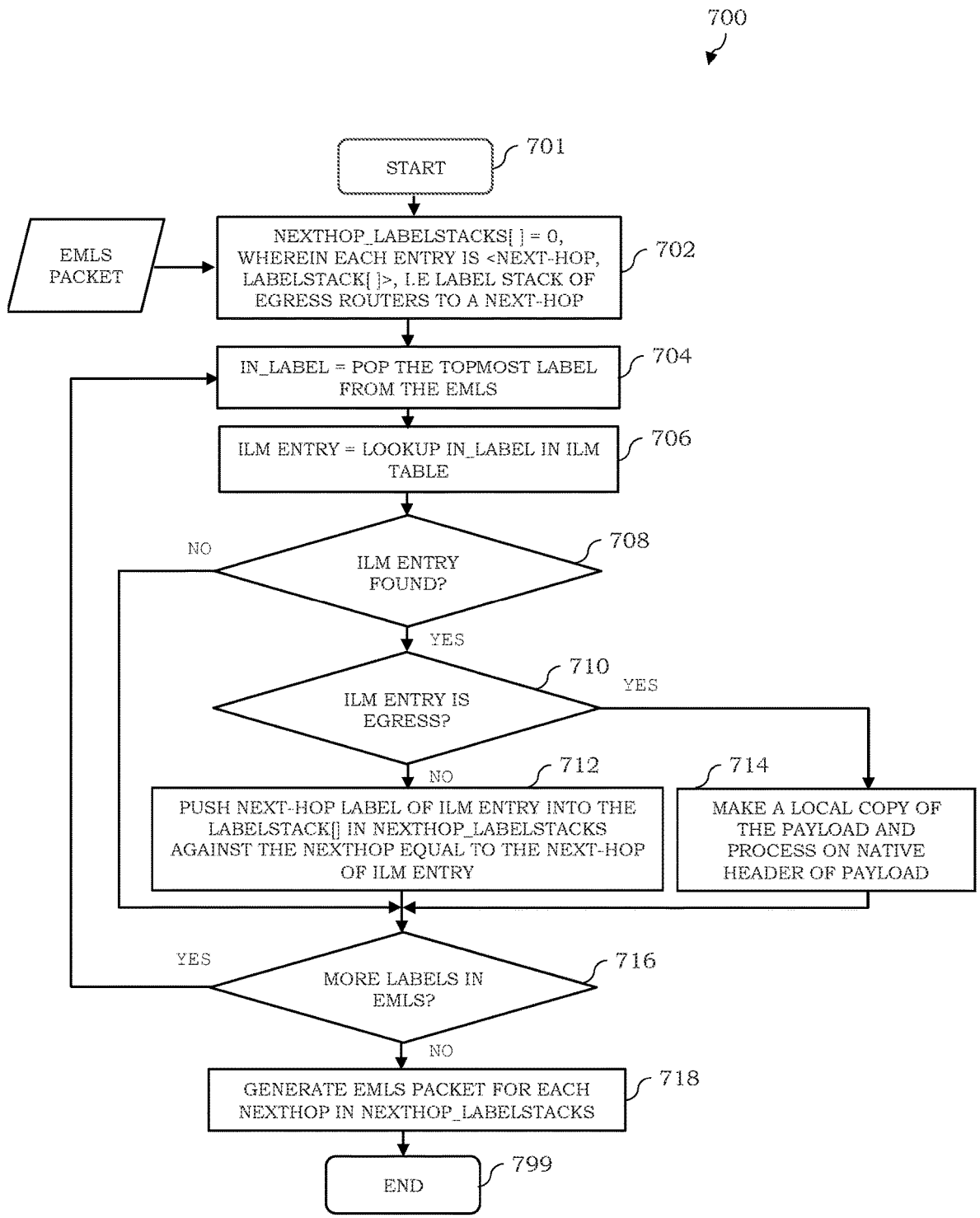
FIG. 7 depicts an example embodiment of a method for processing of an EMLS packet at a transit router or an egress router.

FIG. 7 depicts an example embodiment of a method for processing of an EMLS packet at a transit router or an egress router. It will be appreciated that, although primarily presented as being performed serially, at least a portion of the functions of method 700 may be performed contemporaneously or in a different order than as presented with respect to FIG. 7. The input to the method 700 includes an EMLS Packet. At block 701, the method 700 begins. Block 702 initializes an empty list of label stacks (NextHop_LabelStacks[]), wherein each label stack represents the subset of unicast BE-LSPs (egress routers) partitioned to a specific next-hop. The method 700 then proceeds to block 704. Block 704 pops the topmost label from EMLS, and then the method 700 proceeds to block 706. Block 706 looks up the label in the ILM Table, and then the method 700 proceeds to block 708. Block 708 checks if a valid ILM entry is found. If a valid ILM entry is not found, then the method 700 proceeds to block 716, otherwise the method 700 proceeds to block 710. Block 710 checks if the ILM Entry indicates it is the egress router for the label. If the ILM Entry indicates it is the egress router for the label, then the method 700 proceeds to block 714, otherwise the method 700 proceeds to block 712. Block 712 pushes the next-hop label of the ILM Entry into the Label Stack in NextHop_LabelStacks against the Next-Hop equal to the next-hop of the ILM Entry. It then proceeds to block 716. Block 714 makes a local copy of the payload of the EMLS packet and processes the payload further based on the native header of the payload. The method 700 then proceeds to block 716. Block 716 checks if there are more labels in the EMLS. If there are more labels in the EMLS, then the method 700 returns to block 704 to repeat subsequent blocks for the next label. In Block 718, the EMLS is now removed leaving only payload part in the packet, and the NextHop_LabelStacks now includes the label stacks partitioned by their respective next-hops. Block 718 generates and sends an EMLS packet with a copy of Payload to each next-hop in NextHop_LabelStacks, wherein the EMLS includes the label stack for the respective next-hop. It is noted that block 718 may be implemented by the method 600 of FIG. 6. At block 799, the method 700 ends.

It will be appreciated that, using method 700 of FIG. 7, each label in an EMLS needs to be looked up by a forwarding router in its ILM Table (see the iterations of blocks 704-716 in FIG. 7 for each label) such that the EMLS overhead and number of ILM Table lookups increase linearly with the number of egress routers.

Various example embodiments, as discussed further below, are configured to reduce, minimize, or even eliminate the linear dependency of ILM Table lookups on the number of egress routers, thereby achieving efficient forwarding of inter-domain stateless MPLS multicast packets such that inter-domain stateless MPLS multicast packets are able to be forwarded with O(1) lookups irrespective of the number of labels in EMLS.

Various example embodiments are configured to support efficient forwarding of stateless MPLS multicast packets traversing multiple network domains, i.e., when ingress and egress routers of MPLS multicast packets are in different network domains. It will be appreciated that, here, a network domain may be an IGP areas (e.g., areas in OSPF, levels in IS-IS, or the like), Autonomous Systems (ASes), or the like. Various example embodiments presented herein enable inter-domain stateless MPLS multicast packets to be forwarded with O(1) lookup, irrespective of the number of labels in EMLS. It will be appreciated that at least some such example embodiments may be further understood by considering a stateless MPLS multicast domain that spans across multiple network domains, as presented in FIG. 8.

Figure 8:
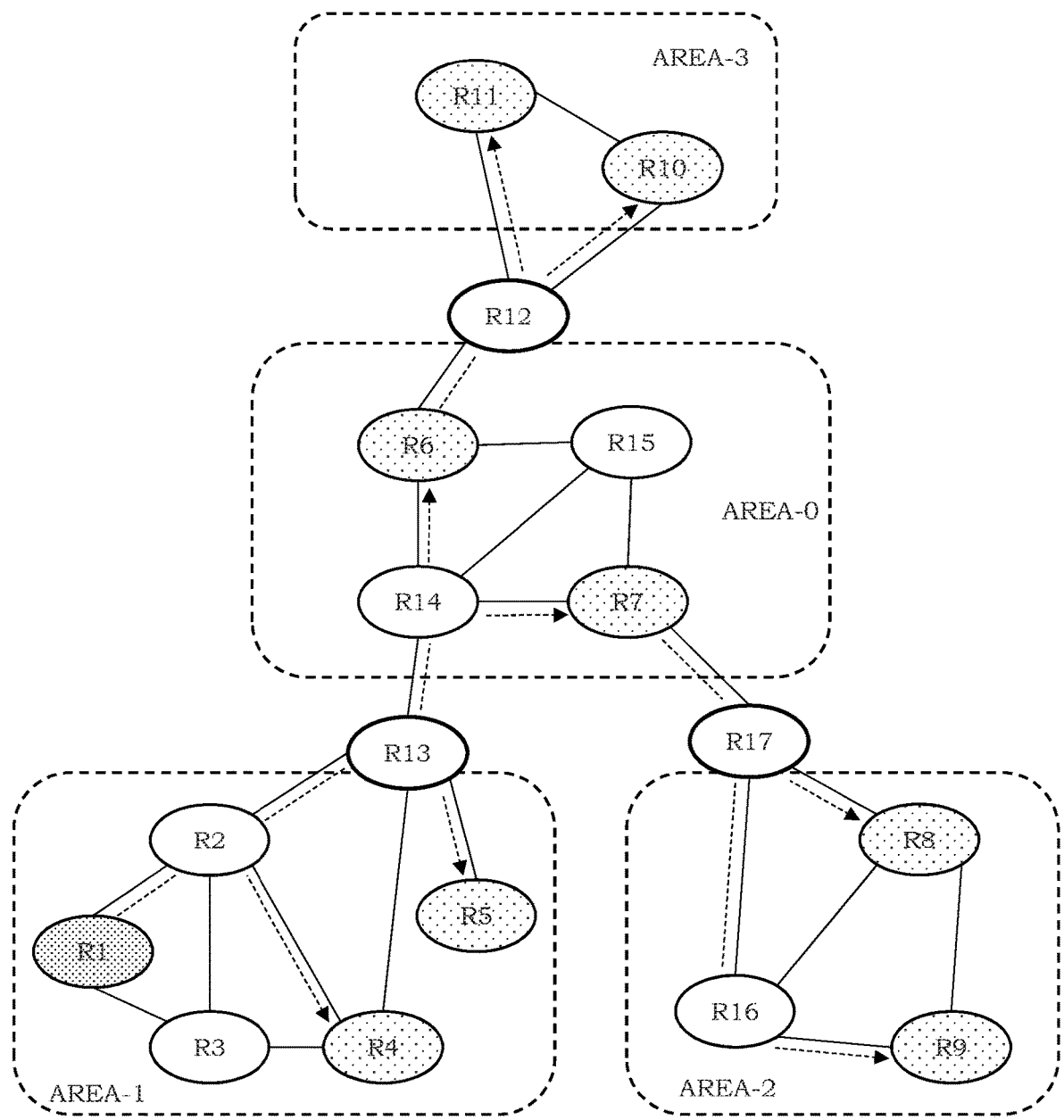
FIG. 8 depicts an example embodiment of a communication system including a multi-domain packet distribution network configured to support stateless multicast.

In FIG. 8, the multi-domain packet distribution network 800 includes seventeen routers (illustratively, routers R1-R17) that span across four OSPF areas—denoted from (illustratively, Area-0 to Area-3). In general, an OSPF area is a set of routers and their local networks that have been administratively grouped together. Area-0 is a special area and termed as the "backbone" area, which forms the core of an OSPF network. The other areas—Area-1, Area-2, and Area-3—are connected to Area-0 through area border routers (ABRs). More specifically, Area-1 is connected to Area-0 via ABR R13, Area-2 is connected to Area-0 via ABR R17, and Area-3 is connected to Area-0 via ABR R12.

In general, an ABR has at least one interface within a backbone and at least one interface in a different area. For example, in ABR R13, the interface R13->R14 is in Area 0, whereas interfaces R13->R2, R13->4, and R13->R5 are located in Area-1.

In general, the routers and local area networks within an area are usually assigned contiguous IP subnets, so that all IP subnets in an area can be summarized using the fewest possible IP prefixes (typically referred to as summary prefixes). For example, assuming that Area-2 has local networks connected to routers R8, R9, and R16 with IPv4 subnets 12.1.0.0/24, 12.1.1.0/24, and 12.1.2.0/24, respectively, then the three IP subnets can be summarized with a single summary IPv4 prefix 12.1.0.0/22. It is noted that, for simplicity, the IP subnets of local networks of routers in other areas are not summarized.

In general, the routers within an area maintain identical topology databases (i.e., Link State Databases (LSDBs)) about the area. Any topology change within an area is flooded by OSPF among its internal routers using Link State Advertisements (LSAs). However, the topology of an area is hidden from other areas by the ABR, which maintains one LSDB per adjacent area. An ABR would typically exchange only summary prefixes between two areas. For example, Area-2 would advertise only summary-prefix 12.1.0.0/22 to Area-0, instead of its three constituent IP subnets 12.1.0.0/24, 12.1.1.0/24, and 12.1.2.0/24. Thus, topology changes within an area are not reflected to other areas. This significantly minimizes the OSPF LSAs exchanged between areas, thereby providing scalability and optimized convergence time on topology changes.

In general, a loopback IP address in router Rx may be denoted as IP-x. For example, IP-9 is the loopback IP address in router R9. For simplicity, assume that IP-x is an IPv4 address (although it will be appreciated that the various example embodiments presented herein are seamlessly applicable to IPv6 as well). The loopback address IP-x of router Rx is assigned a label Lx. The label mapping is advertised throughout the network using the MPLS control plane. For simplicity, this example shows the same label Lx is used to identify egress router Rx (=loopback IP-x) across the network, but in practice each router would allocate a label from its own local label space to identify a unicast BE-LSP to Rx. So, a unicast BE-LSP to Rx exists from each of the other routers in the domain, along the shortest IP routed path from the respective router to Rx.

In general, in an OSPF LSA and LSDB, an IP subnet is associated with the IP address of its advertising router. For example, in Area-2, the IP subnets 12.1.0.0/24, 12.1.1.0/24, and 12.1.2.0/24 are associated with advertising routers IP-8, IP-9, and IP-16, respectively, in its LSDB; however, the summary prefix 12.1.0.0/22 is advertised to Area-0 with the adverting router as the ABR, which is IP-17. Essentially, while doing path computation (e.g., Shortest Path First (SPF)) by any router in Area-0, it considers 12.1.0.0/22 as the local network of IP-17. So, the shortest path to 12.1.0.0/22 is the shortest path to IP-17. Further, Area-0 advertises the summary-prefix 12.1.0.0/22 to Area-1 and Area-3 with advertising routers as IP-13 and IP-12 (i.e., ABRs to respective areas), respectively. So, any routers in Area-1 would see 12.1.0.0/22 as the local network of IP-13. Similarly, within Area-2, the advertising routers for IP-8/32, IP-9/32, and IP-16/32 are IP-8, IP-9, and IP-16, respectively, but those loopback addresses are advertised to Area-0 with advertising router as IP-17.

In FIG. 8, assume that metric in OSPF for all links is identical. Let's say, after an SPF computation, the IP Route Table in OSPF in router R1 is as depicted in FIG. 9. It is noted that the IP Route Table of FIG. 9 is located in the control plane and is not used for forwarding IP packets in data plane. It will be appreciate that only relevant columns of the IP Route Table are shown in FIG. 9, and that the IP Route Table shown in FIG. 9 may include other protocol specific information about a route entry.

In FIG. 8, each of the routers in the multi-domain packet distribution network 800 maintains control plane tables and data plane tables which may be used to support stateless MPLS multicast flows in the multi-domain packet distribution network 800. It is noted that examples of such control plane tables and data plane tables are presented with respect to FIGS. 9 and 10A-10B for router R1 of the multi-domain packet distribution network 800 and with respect to FIGS. 11 and 12A-12B for router R13 of the multi-domain packet distribution network 800. More specifically, for router R1, FIG. 9 depicts an example of an OSPF Route Table in the control plane of router R1, FIG. 10A depicts an example of an IP Route Table in router R1, and FIG. 10B depicts an example of an MPLS data plane (including an FTN Table and an ILM Table) in router R1. Similarly, for example, for router R13, FIG. 11 depicts an example of an OSPF Route Table in the control plane of router R13, FIG. 12A depicts an example of an IP Route Table in router R13, and FIG. 12B depicts an example of an MPLS data plane (including an FTN Table and an ILM Table) in router R13. Similarly, although not illustrated in the figures for purposes of brevity, each of the remaining routers (namely, R2-R12 and R14-R17) maintains similar control plane and data plane tables.

The operation of the multi-domain packet distribution network 800 of FIG. 8 in supporting a stateless MPLS multicast flow, based on various control and data plane tables maintained by the routers in the multi-domain packet distribution network 800 (e.g., as presented with respect to FIG. 9 and FIGS. 10A-10B for R1 and with respect to FIG. 11 and FIGS. 12A-12B for R13), may be further understood by way of the following example. For example, consider a stateless MPLS multicast flow for which R1 is the ingress router and R4-R11 are the egress routers. The ingress router is located in Area-1 and the egress routers are distributed across the Areas as follows: (1) Area-1=R4-R5, (2) Area-0=R6-R7, (3) Area-2=R8-R9, and (4) Area-3=R10-R11. R1 originates the stateless MPLS multicast packet with EMLS={L4, L5, L6, L7, L8, L9, L10, L11}, by encoding the unicast BE-LSPs to respective egress routers R4-R11. The packet is forwarded along the shortest path to the respective egress routers. R1, based on the FTN Table in FIG. 10B, originates the EMLS packet={L4, L5, L6, L7, L8, L9, L10, L11} and sends it over the common next-hop R1->R2. R2, on receipt of the packet, looks up each label in EMLS in its ILM Table and, based on the resultant next-hops, replicates the packet into following two copies: (1) Copy-1: EMLS={L-5, L-6, L-7, L-8, L-9, L-10, L-11} on R2->R13 and (2) Copy-2: EMLS={L4} on R2->R4. R13, on receipt of Copy-1, looks up each label in its ILM Table and, based on the resultant next-hops, replicates the packet into following two copies: (1) Copy-3: EMLS={L6, L7, L8, L9, L10, L11} to R13->R14 and (2) Copy-4: EMLS={L5} to R13->R5. R14, on receipt of Copy-3, looks up each label in EMLS in its ILM table and replicates copies along the outlined paths. Eventually, each of the egress routers R4-R11 receives a copy of the packet. It will be appreciated that, using this process, a receiver of the EMLS packet needs to lookup each label into its ILM route table in order to make a forwarding decision, i.e., O(N) lookup where N=umber of labels in EMLS. As indicated above and discussed further below, various example embodiments presented herein are configured to support stateless multicast routing such that a receiver of the EMLS packets needs to look up only those labels in EMLS that are located within its own area (i.e., intra-area) while any labels in EMLS that belong to external areas (i.e., inter-area) can be forwarded using a single lookup irrespective of the number of labels N in EMLS (i.e., O(1) lookup). It will be appreciated that, applying such example embodiments to the example discussed above, R2 would only need to lookup intra-area labels={L4, L5} in the EMLS packet and the inter-area labels={L6, L7, L8, L9, L10, L11} would be forwarded from R2 with a single lookup based on unicast, R14 would only need to lookup intra-area labels={L6, L7} and the inter-area labels={L8, L9, L10, L11} would be forwarded from R14 with a single lookup based on unicast, and so forth for each of the sub-domains including egress routers of the stateless MPLS multicast flow. It will be appreciated that this approach improves the forwarding performance of inter-area stateless MPLS multicast packets.

Various example embodiments for supporting stateless multicast in communication networks may be configured to support stateless multicast in multi-domain packet distribution networks.

Various example embodiments for supporting stateless multicast in communication networks may be configured to support stateless multicast in communication networks which may be based on various types of routing protocols (e.g., Open Shortest Path First (OSPF), Intermediate-System-to-Intermediate-System (IS-IS), Border Gateway Protocol (BGP), or the like, as well as various combinations thereof), various types of routing (e.g., IP routing, MPLS routing, or the like, as well as various combinations thereof), or the like, as well as various combinations thereof.

Various example embodiments for supporting stateless multicast in communication networks may be configured to support stateless multicast in communication networks which may be based on various types of routing protocols (e.g., OSPF, IS-IS, BGP, or the like, as well as various combinations thereof) and, thus, in communication networks including various types of network domains, border routers, packet types, and so forth, at least some of which may vary depending on the underlying routing technology of the communication network. For example, various example embodiments for supporting stateless multicast in communication networks may be configured to support stateless multicast in various types of network domains (e.g., network domains such as an OSPF area, an IS-IS level, an AS in BGP, or the like). For example, various example embodiments for supporting stateless multicast in communication networks may be configured to support stateless multicast based on unicast tunneling to various types of BRs (e.g., an area border router (ABR) in OSPF or IS-IS, an autonomous-system border router (ASBR) in BGP, or the like). For example, various example embodiments for supporting stateless multicast in communication networks may be configured to support stateless multicast for various types of packets, although various embodiments presented herein are primarily directed to supporting multicast of stateless MPLS packets referred to herein as EMLS packets). It will be appreciated that various example embodiments presented herein may be applied to various communication networks which may utilize various protocols that segregate a routing domain into sub-domains.

Various example embodiments for supporting stateless multicast in communication networks may be configured to support stateless multicast in multi-domain packet distribution networks which may be based on various types of routing (e.g., IP routing, MPLS routing, or the like, as well as various combinations thereof). In IP routing, the forwarding path to IP addresses located in external domains traverses a border router (BR) to the external domains (e.g., the BR is the advertising router for those IP addresses and, thus, is the common node in the shortest paths to those IP addresses). In MPLS routing, if a set of labels in an EMLS packet is routed via a common BR then, rather than performing a linear lookup of such labels at each forwarding router along the path to the BR, the set of labels in the EMLS packet can be transparently forwarded using an unicast paradigm (that involves an O(1) lookup along the forwarded path) until reaching the BR) and, further, such unicast forwarding may continue from BR to BR until the EMLS packet reaches the local network domain of the labels. An EMLS packet may be split by an ingress router or a BR into the following types of EMLS packets: an EMLS Internal (EMLS-I) packet and an EMLS External (EMLS-E) packet.

As indicated above, an EMLS packet may be split by an ingress router or a BR into an EMLS-I packet that is forwarded within the local network domain of the ingress router or BR. The EMLS-I packet includes the labels of the egress routers located in local network domain. The EMLS-I packet may be forwarded within the local network domain, until reaching the egress routers located in the local network domain, using any suitable multicast forwarding capabilities which may be employed within the local network domain (e.g., using stateless MPLS multicast that performs linear lookup of each label in the EMLS-I packet in the ILM Table of a receiving router and performs replication of the EMLS-I packet within the local network domain as needed).

As indicated above, an EMLS packet may be split by an ingress router or a BR into an EMLS-E packet that is forwarded toward a BR that is common to a set of egress routers located in one or more external network domains that are reachable through the common BR. The EMLS-E router includes the labels of the egress routers located in any external network domains that are reachable through a common BR. The BR is the advertising router for loopback addresses of such egress routers and, thus, is the common node in the shortest paths to all those egress routers. As indicated hereinabove, if the labels in an EMLS-E packet are routed via a common BR then there is no need to perform linear lookup of the labels at each forwarding router along the path to the BR; rather, the EMLS packet can be tunneled to the BR as a unicast packet. So, the EMLS-E packet may be encapsulated within a unicast tunnel to the BR and intermediate routers may perform unicast forwarding of the packet based on tunnel encapsulation, thereby eliminating the linear lookup of labels in the EMLS-E packet by each forwarding router along the path to the BR. The BR, upon receiving the packet, removes the unicast tunnel encapsulation to find the EMLS packet underneath and makes further forwarding decision of the EMLS packet (e.g., creating an EMLS-I packet for the local network domain of the BR where the local network domain of the BR includes one or more egress routers of the multicast flow and/or creating one or more EMLS-E packets for further unicast forwarding of the EMLS packet to one or more other BRs associated with one or more remote network domains including egress routers of the multicast flow).

It will be appreciated that, based on use of EMLS-I packets within local network domains and use of EMLS-E packets across and between network domains, only the EMLS-I packets are forwarded using O(N) lookups (wherein N is the number of labels in a given EMLS-I packet) and the EMLS-E packets are forwarded using O(1) lookup irrespective of the number of labels in the EMLS-E packets.

Figure 13:
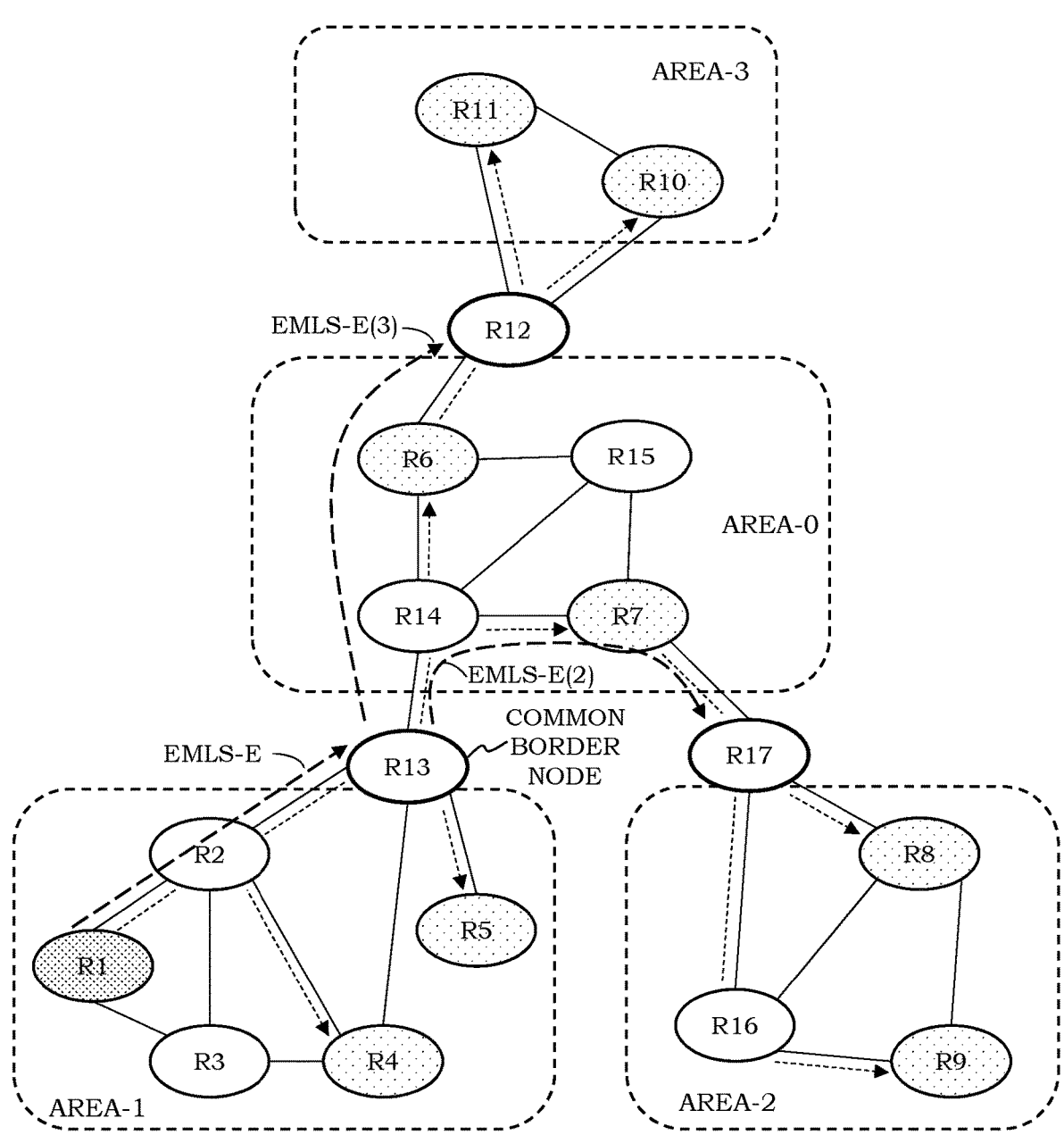
FIG. 13 depicts an example embodiment of a communication system configured to support stateless multicast in a multi-domain packet distribution network.

It will be appreciated that such embodiments may be further understood by way of reference to the example multi-domain packet distribution network of FIG. 13.

FIG. 13 depicts an example embodiment of a communication system configured to support stateless multicast in a multi-domain packet distribution network.

It will be appreciated that the multi-domain packet distribution system 1300 of FIG. 13 is similar to the communication system 800 of FIG. 8.

In FIG. 13, which includes a multi-domain packet distribution system 1300 that is similar to the multi-domain packet distribution system 800 of FIG. 8, the path followed by the EMLS-I packet is marked and the path followed by the EMLS-E packet is marked. R1 originates the EMLS packet to the set of egress routers {IP-4, IP-5, IP-6, IP-7, IP-8, IP-9, IP-10, IP-11}. The EMLS packet, since some of the egress routers are located within the local network domain {IP-4, IP-5} and some of the egress routers are located outside of the local network domain {IP-6, IP-7, IP-8, IP-9, IP-10, IP-11} is split into an EMLS-I packet to be routed within the local network domain of R1 and an EMLS-E packet to be routed outside of the local network domain of R1. This splitting of the EMLS packet into EMLS-I and EMLS-E packets may be performed by R1 based on lookup of each loopback IP address in the set of egress routers in the FTN Table in R1. As discussed herein, the splitting of the EMLS packet in this manner is performed based on additional attributes which may be maintained within the IP control/data plane (e.g., in the IP Route Table) and the MPLS data plane (e.g., in the FTN Table, ILM Table, and BR Tunnel Table) of the routers within the multi-domain packet distribution network. These additional attributes are illustrated for an ingress router (using R1 as an example) in FIG. 14A and FIGS. 14B-1 and 14B-2 and for a BR (using R13 as an example) in FIG. 15A and FIGS. 15B-1 and 15B-2.

As depicted in FIGS. 14A and 15A, the IP Route Table entries include the following additional attributes: {Scope, BR}. The "Scope" field indicates whether the entry belongs to the local network domain (denoted as INT) or whether the entry was learned from an external network domain (denoted as EXT). The "BR" field is the IP address of the advertising router for the IP Prefix, which is available in the database of the associated routing protocol in the control plane (e.g., OSPF, IS-IS, BGP, or the like).

As depicted in FIGS. 14B-1 and 14B-2 and FIGS. 15B-1 and 15B-2, the FTN and ILM Table entries includes the following additional attributes {Scope, BR, BR_Label}. The "Scope" and "BR" fields are inherited from the corresponding fields in the best matching IP Route Table entry of the corresponding unicast BE-LSP. The "BR_Label" field is applicable only if the Scope is EXT and indicates the label for the unicast BE-LSP allocated by the BR and which is programmed in the ILM Table of BR to forward MPLS packets for the LSP. When an EMLS-E packet is tunneled to a BR, then the labels in the EMLS will be encoded with BR_Labels for the respective LSPs, instead of the Next-hop Label in the entry, because Next-hop label is only meaningful to the immediate neighbor. It will be appreciated that the manner in which the BR Label is determined is specific to the mechanism used to setup the unicast BE-LSP across the network.

For example, if a global label space is used to allocate labels for unicast BE-LSPs, irrespective of the mechanism used to set-up the LSPs, then the BR_Label is same as the Next-Hop Label.

For example, if a local label space at each router is used to allocate labels for LSPs, then the BR_Label may be determined as follows. If the unicast BE-LSP is set-up by SR, then each router knows the labels allocated for an LSP by every other router in the domain, since the SR control plane (e.g., OSPF, OSPFv3, IS-IS, BGP-LS, or the like) floods the label mappings from each router across the domain as label mappings are included in link state advertisements (LSA) of the protocols. If the unicast BE-LSP is set-up by LDP, then typically a router learns the label mapping for an LSP from its immediate neighbors only so, in order to learn the label assigned by a BR, a potential ingress router or another BR will have a targeted LDP (T-LDP) neighboring (session) with the BR.

It will be appreciated that, if a BR_Label is not available for an FTN or ILM entry with EXT scope, then the corresponding LSP cannot be included in EMLS-E packet. In that case, the LSP should be included in an EMLS-I packet.

Herein, for simplicity, a unicast BE-LSP is identified with the same label across the domain, irrespective of the mechanism (e.g., LDP, SR, BGP, or the like) used to set-up the LSP. So, the BR_Label would be same as the Next-hop Label.

The BR Tunnel Table is used to lookup the tunneling methods to be used to send packets to a BR. The BR Tunnel Table is indexed by the "IP address" of a BR. An entry's "Tunnel Preference" field indicates a list of preferable tunneling methods in preference order. The "Resolved Tunnel" field means the identification of the tunnel chosen in the order of preference (i.e., the first tunnel in that order that is available/active). In FIGS. 14B-1 and 14B-2, all ILM and FTN table entries with EXT scope are routed via BR IP-13, so the BR Tunnel Table has an entry for IP-13.

It will be appreciated that various example embodiments may be further understood by way of reference to an example that is based on the network of FIG. 13.

In this example based on FIG. 13, first consider the processing performed at router R1 (based on the tables of FIG. 14A and FIGS. 14B-1 and 14B-2). The FTN Table lookup procedure to originate an EMLS to a list of IP addresses (i.e., loopback addresses of egress routers) now also accounts for the {Scope, BR, BR_Label} attributes of the matching IP Prefixes. The next-hop labels of all IP addresses of Type INT are grouped into a single EMLS-I packet. BR labels of all IP addresses of Type EXT and routed via common BR are grouped into a single EMLS-E packet. Following this principle, in the network of FIG. 13, R1 would generate the following EMLS packets for the egress routers {IP-4, IP-5, IP-6, IP-7, IP-8, IP-9, IP-10, IP-11}: (1) EMLS-I(1)={L4, L5}, since the IP addresses {IP-4, IP-5} are INT in the FTN Table and (2) EMLS-E(1)={L6, L7, L8, L9, L10, L11} since the IP addresses {IP-6, IP-7, IP-8, IP-9, IP-10, IP-11} are EXT and routed via common BR IP-13 (and the encoded labels are BR labels). The EMLS-I(1) packet is forwarded to the common next-hop R1->R2 and this packet reaches egress routers R4 and R5. The EMLS-E(1) packet is encapsulated in a unicast tunnel to BR IP-13. The type of unicast tunnel to IP-13 is retrieved by looking up the matching entry for IP-13 in the BR Tunnel Table, and then from the entry's Resolved Tunnel field. So, this packet is forwarded as unicast packet with O(1) lookup until reaching R13. When R13 receives the packet, it is the end of the tunnel, so it strips the tunnel encapsulation and processes the EMLS-E (1) packet based on its ILM Table which now includes the {Scope, BR, BR_Label} attributes.

In continuation of this example based on FIG. 13, next consider the processing performed at router R13 (based on the tables of FIG. 15A and FIGS. 15B-1 and 15B-2). Based on an ILM Table lookup at R13, the EMLS-E (1)={L6, L7, L8, L9, L10, L11} packet is segregated into following copies: (1) EMLS-I (2)={L6, L7}, since the listed labels are INT, (2) EMLS-E (2)={L8, L9}, since listed labels are EXT and are routed via common BR IP-17, and (3) EMLS-E (3)={L10, L11}, since the listed labels are EXT and are routed via common BR IP-12.

In continuation of this example, the EMLS-I (2) packet is forwarded to the common next-hop R13->R14 using multicast forwarding. This packet eventually reaches egress routers R6 and R7.

In continuation of this example, the EMLS-E (2) packet is encapsulated in a unicast tunnel to BR IP-17. The type of unicast tunnel to IP-17 is retrieved by looking up the matching entry for IP-17 in the BR Tunnel Table, and then from the Resolved Tunnel field of the entry. So, this packet is forwarded as a unicast packet with O(1) lookup until reaching R-17. When R17 receives the packet, it is the end of the tunnel, so R17 strips the tunnel encapsulation and processes the EMLS-E (2) packet based on its ILM Table. R17 sends the EMLS packet as an EMLS-I packet, which finally reaches egress routers R8 and R9.

In continuation of this example, EMLS-E (3) packet is encapsulated in a unicast tunnel to BR IP-12. The type of unicast tunnel to IP-12 is retrieved by looking up the matching entry for IP-12 in BR Tunnel Table, and then from the Resolved Tunnel field of the entry. So, this packet is forwarded as a unicast packet with O(1) lookup until reaching R12. When R12 receives the packet, it is the end of the tunnel, so R12 strips the tunnel encapsulation and processes the EMLS-E (3) packet based on its ILM Table. R12 sends the EMLS packet as an EMLS-I packet, which finally reaches egress routers R10 and R11.

In a hierarchical architecture, an ingress router sends an EMLS packet to a set of gateway routers. Each gateway router is programmed with a tree label that maps to the labels of unicast BE-LSPs to the subset of egress routers served by the gateway. The ingress router includes a tuple <Gateway Label, Tree Label>in the EMLS for each gateway router that receives the packet. This tuple is referred to as a "Tree Label Stack" (TLS). The gateway label is the label of the unicast BE-LSP from the ingress router to the gateway router. The EMLS packet is forwarded to the gateway router based on the gateway label in the TLS. The gateway router, upon receiving the packet, translates the tree label to an EMLS including the egress routers and then forwards the EMLS packet. This hierarchical organization allows the ingress router to multicast a packet to a large set of egress routers with a smaller EMLS. So the overhead of EMLS is O(G), where G is the number of gateway routers instead of O(N) wherein N is the total number of egress routers.

Various example embodiments for supporting stateless multicast in communication networks may be configured to support stateless multicast in multi-domain packet distribution networks. Various example embodiments are configured to support intra-domain stateless MPLS multicast packets (referred to herein as EMLS-I packets) within sub-domains of multi-domain packet distribution networks and inter-domain stateless MPLS multicast packets (referred to herein as EMLS-E) across and between sub-domains of multi-domain packet distribution networks. Various example embodiments are configured such that, in a multi-area OSPF, a non-backbone area would generate, at most, one copy of an EMLS-E packet and a backbone area would generate one EMLS-E packet per neighboring non-backbone area that includes a subset of the egress routers. Various example embodiments are configured to support an MPLS dataplane of a router that is configured to originate EMLS-I packets and EMLS-E packets and that is configured to split a received EMLS packet into EMLS-I packets and EMLS-E packets. Various example embodiments are configured to support an MPLS control plane of a router such that the MPLS control plane of a router is able to resolve the next-hop of a unicast BE-LSP and accordingly program the LSP into the MPLS dataplane with additional attributes. Various example embodiments for unicast tunneling of EMLS-E packets may enable O(1) lookups along the forwarding path of the tunnel used for unicast tunneling of the EMLS-E packets. It will be appreciated that the concept is generic such that it may be seamlessly applicable to both non-hierarchical architectures and hierarchical architectures. Various example embodiments for supporting stateless multicast in communication networks may be configured to support stateless multicast in multi-domain packet distribution networks in various other ways.

As described herein, various tunneling methods may be used for tunneling of EMLS-E packets to designated BRs. The tunneling of an EMLS-E packet may be further understood by considering the encoding of an EMLS packet as presented with respect to FIGS. 16-19.

FIG. 16 depicts an example embodiment of an EMLS packet format which may be used for EMLS-I packets and EMLS-E packets. The EMLS packet 1600 includes an Explicit Multicast Label Stack Indicator (EMLSI), an EMLS Descriptor below the EMLSI, and a stack of EMLS labels below the EMLS Descriptor.

The EMLSI is configured to enable a receiving router to distinguish between EMLS and non-EMLS labels (e.g., where an EMLS is embedded within an MPLS label stack that includes one or more other non-EMLS labels). The EMLSI precedes an EMLS where preceding means closer to the top of the label stack and thus, farther from the bottom of stack (BoS) indication. If the EMLSI is standardized, a value for EMLSI may be reserved at the IANA registry on special-purpose labels. The EXP and TTL fields in the EMLSI are set to 0 as those fields have no significance. The S bit is set to 0 since subsequent labels in the EMLS follows the EMLSI.

The EMLS Descriptor which follows the EMLSI is another special label that describes the size of the EMLS. However, this label does not carry a special fixed value. This label includes a value which encodes the number of subsequent labels in the EMLS stack. EMLS Descriptor is used because the EMLS may be followed by non-EMLS labels. An example embodiment of an EMLS Descriptor is presented with respect to FIG. 17.

FIG. 17 depicts an example embodiment of an EMLS Descriptor label which may be used within the context of the EMLS packet of FIG. 16. The EMLS Descriptor label 1700 includes a Number of Labels (Num Labels) field, an EXP field, an S-bit field, and a TTL field. The Number of Labels field is a 20-bit field that encodes a value of which indicates the number of subsequent labels that belong to the EMLS. If the value is 'N' then the subsequent N labels (following the EMLS Descriptor) belong to the EMLS. An implementation will configure the maximum value of N to the EMLS-_MAX. The EXP field is unused and set to zero. The S bit is set to 0 since subsequent labels in the EMLS follows the EMLSI. The TTL field is unused and set to zero.

The EMLS Labels is a stack of labels, where each label identifies an egress router (e.g., the label of the unicast LSP to an egress router) or is part of a TLS that identifies the tuple <Gateway Label, Tree Label>. An example of an EMLS embedded within a MPLS stack with "other" labels is presented with respect to FIG. 18.

Figure 18:
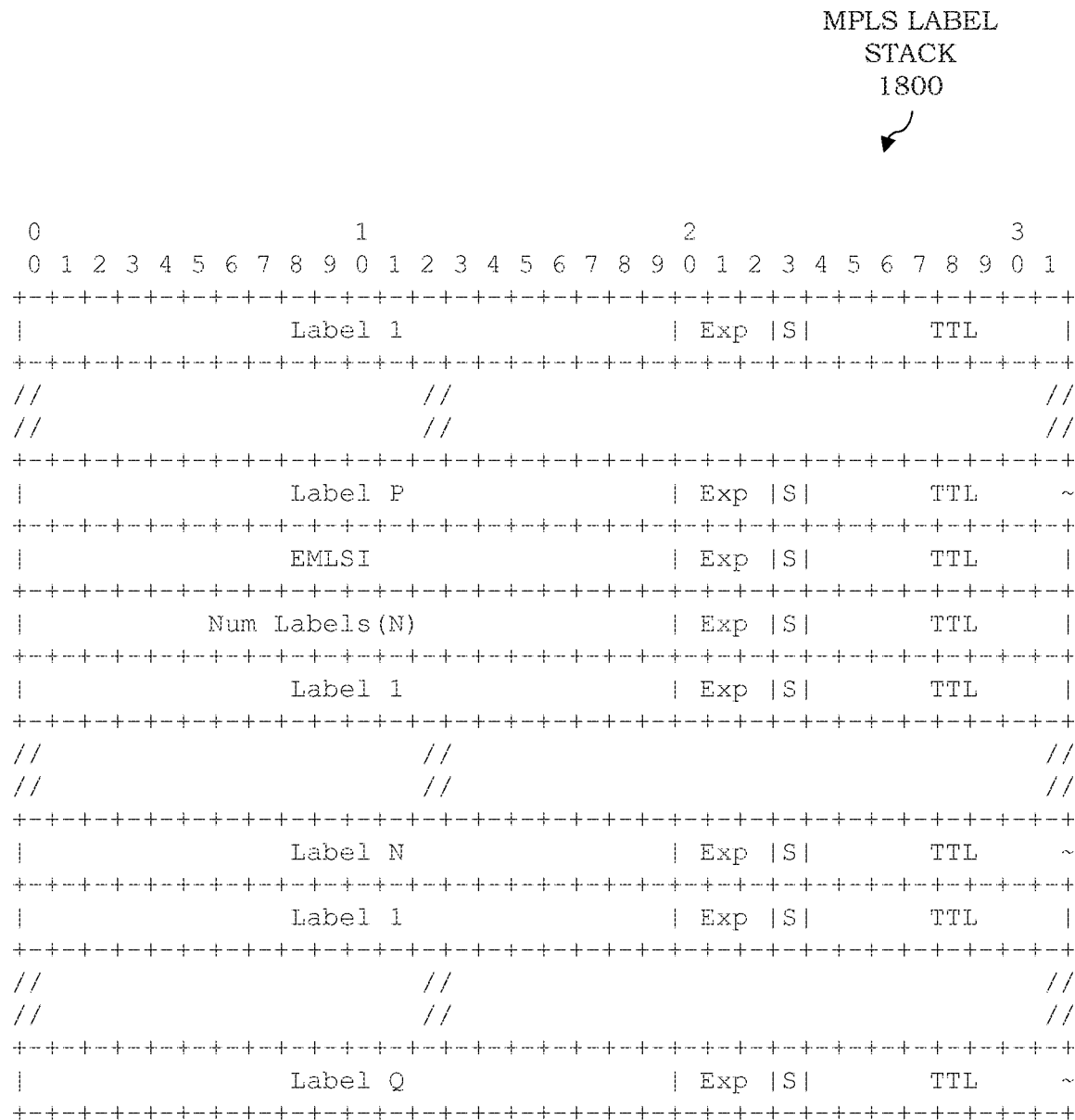
FIG. 18 depicts an example embodiment of an EMLS that is embedded within an MPLS stack.

FIG. 18 depicts an example embodiment of an EMLS that is embedded within an MPLS label stack. The MPLS label stack 1800 includes a stack of P MPLS labels, followed by an EMLS (including an EMLSI, an EMLS Descriptor label, and a stack of N EMLS Labels), followed by a stack of Q MPLS labels.

As described herein, various tunneling methods may be used for tunneling of EMLS-E packets over an IP delivery network. For example, as discussed further below, some tunneling methods that may be used for tunneling of EMLS-E packets may include GRE, MPLS-in-UDP, MPLS LSP, an IGP shortcut, and so forth.

As described herein, Generic Routing Encapsulation (GRE) may be used for tunneling of EMLS-E packets over an IP delivery network. GRE is standardized in RFC 2784. GRE can encapsulate a wide variety of network or link layer protocol packet types to be tunneled over an IP network. GRE packets are encapsulated within an IP Header. In the IP Header, the Source Address field is set to an IP address at the source router of the tunnel and the Destination Address is set to an IP address at the destination router of the tunnel. If the IP header is IPv4 then its "Protocol" field is set to 47 (=GRE Protocol) and if the IP header is IPv6 then its "Next Header" field is set to 47, to indicate that the GRE header follows the IP Header. GRE protocol number 47 is assigned by the IANA registry. The positioning of the GRE header is depicted in FIG. 19.

FIG. 19 depicts an example embodiment of a GRE encapsulated tunnel format configured to support tunneling of EMLS-E packets over an IP delivery network. The "Protocol Type" field in the GRE Header indicates the type of protocol packet that is being tunneled. This field encodes various EtherType values assigned by an IEEE Registration Authority. Some well-known EtherType values are MPLS unicast=0x8847, IPv4=0x800, IPv6=0x86DD, ARP=0x806, and so forth. The general format for tunneling an EMLS-E packet over GRE is depicted in FIG. 20.

FIG. 20 depicts an example embodiment of a GRE encapsulated tunnel format configured to support tunneling of an EMLS-E packet over an IP delivery network. Since the EMLS-E packet is an MPLS packet, the Protocol Type in the GRE header is set to 0x8847, which is the Ethertype value for MPLS. The Destination Address field in the IP header of the EMLS-E packet is an IP address of the BR. This enables the EMLS to be processed by the BR after removal of the GRE header. This GRE encapsulated tunnel format configured to support tunneling of an EMLS-E packet over an IP delivery network may be further understood by way of the example of FIG. 21.

Figure 21:
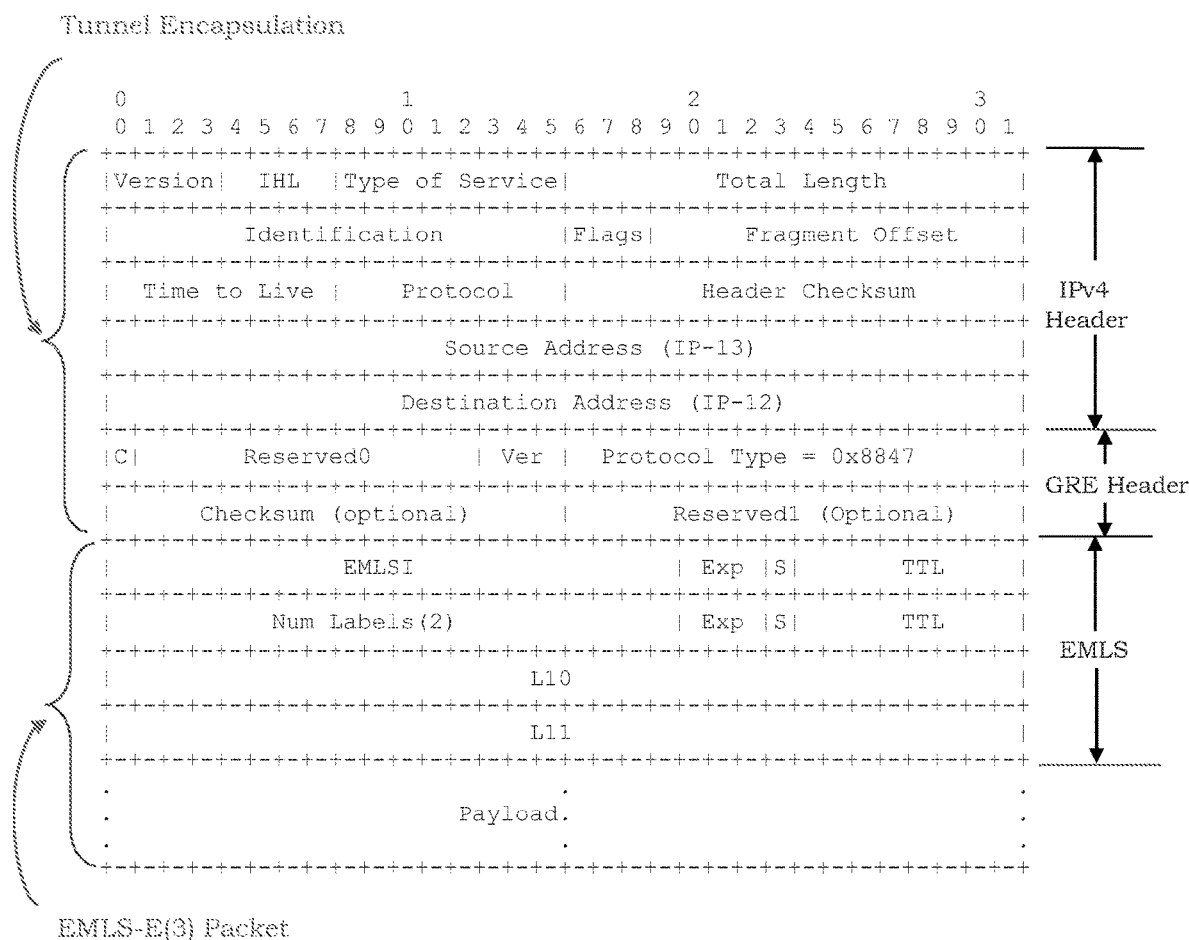
FIG. 21 depicts an example embodiment of the format of an EMLS-E packet tunneled over a GRE tunnel in the multi-domain packet distribution network of FIG. 13.

FIG. 21 depicts an example embodiment of the format of an EMLS-E packet tunneled over a GRE tunnel in the multi-domain packet distribution network of FIG. 13. More specifically, FIG. 21 depicts the format of the EMLS-E (3) packet tunneled from R13 to R12 over a GRE tunnel. The EMLS-E (3) packet of FIG. 21 is using the format described in FIG. 16. In the IPv4 Header, Source Address and Destination Address are set to IP-13 and IP-12 respectively.

As described herein, MPLS-in-UDP may be used for tunneling of EMLS-E packets over an IP delivery network. Certain network deployments perform load balancing of IP packets over Equal Cost Multi-Path (ECMP) based on a Layer-4 header such as TCP or UDP. In some cases, MPLS-in-UDP encapsulation may be used to support efficient load balancing of tunneled EMLS-E packets. The MPLS-in-UDP encapsulation format is depicted in FIG. 22.

FIG. 22 depicts an example embodiment of an MPLS-in-UDP encapsulation format configured to support tunneling of EMLS-E packets over an IP delivery network. The "Dest Port" in the UDP Header is set to a port number which indicates an MPLS packet as the payload of UDP. The "Source Port" in the UDP Header includes a 16-bit entropy value that is generated by the encapsulator to uniquely identify a flow. It will be appreciated that what constitutes a flow may be locally determined by the encapsulator and that any suitable algorithm may be used by the encapsulator to generate an entropy value. The MPLS-in-UDP packet is encapsulated in an IP Header for transporting the packet across IP network.

FIG. 23 depicts an example embodiment of an MPLS-in-UDP encapsulated tunnel format configured to support tunneling of an EMLS-E packet over an IP delivery network. This MPLS-in-UDP encapsulated tunnel format configured to support tunneling of an EMLS-E packet over an IP delivery network may be further understood by way of the example of FIG. 24.

Figure 24:
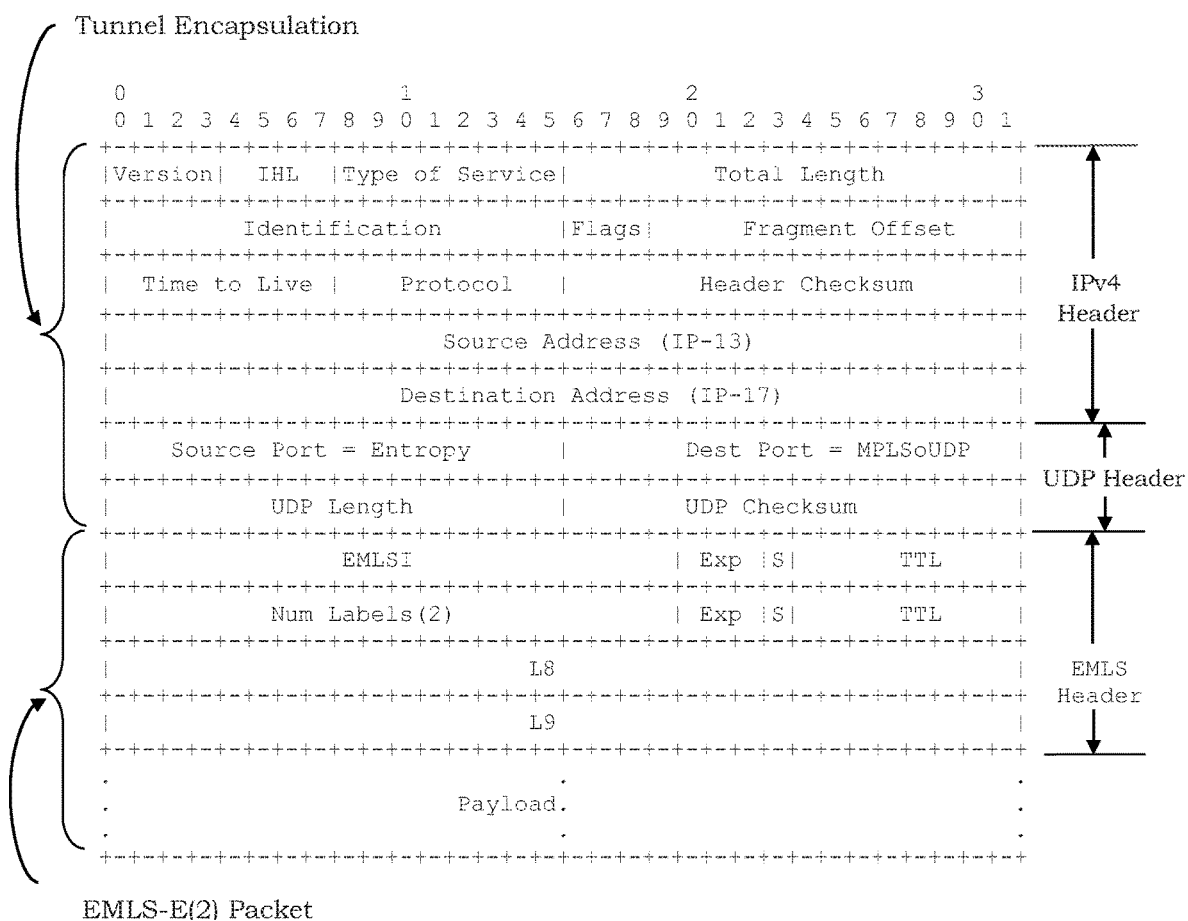
FIG. 24 depicts an example embodiment of the format of an EMLS-E packet tunneled over a MPLS-in-UDP tunnel in the multi-domain packet distribution network of FIG. 13.

FIG. 24 depicts an example embodiment of the format of an EMLS-E packet tunneled over a MPLS-in-UDP tunnel in the multi-domain packet distribution network of FIG. 13. More specifically, FIG. 24 depicts the format of an EMLS-E (2) packet tunneled from R13 to R17 over an MPLS-in-UDP tunnel. The EMLS-E (2) packet of FIG. 24 is using the format described in FIG. 16. In the IPv4 Header, Source Address and Destination Address are set to IP-13 and IP-17, respectively.

As described herein, an MPLS LSP may be used for tunneling of EMLS-E packets over an IP delivery network. The MPLS LSP encapsulation format is depicted in FIG. 25.

FIG. 25 depicts an example embodiment of an MPLS LSP tunnel format configured to support tunneling of an EMLS-E packet over an MPLS delivery network. An MPLS LSP can include a label stack having 1 to N labels. The source router of the tunnel can apply various techniques to choose an appropriate MPLS LSP for transporting EMLS-E packets. For example, the router may use MPLS LSPs, set-up by LDP, BGP, RSVP-TE, and so forth, which terminate at the destination router (i.e., the BR). For example, the router may also use Segment Routing (SR) or Segment Routing—Traffic Engineered (SR-TE) LSPs which are stateless/source-routed MPLS LSPs. In case of LDP, BGP, or SR, there is always one BE-LSP to any destination router, because the LSP is identified by the IP address of the destination router, so selection of the BE-LSP for those types to a BR is straightforward. Since RSVP-TE and SR-TE LSPs are TE-LSPs, there could be multiple TE-LSPs to a destination router, each following different explicit paths which may have different QoS. In RSVP-TE, an LSP is identified with {source IP address, destination IP address, tunnelID}, wherein tunnelID is unique to the source router. So TE-LSPs between two tunneling points are distinguished by tunnelID. Since SR-TE is stateless, the source router may assign a locally significant tunnelID to each SR-TE LSP to a destination. In both RSVP-TE and SR-TE, an implementation may use a local policy to choose the appropriate LSP to the BR (e.g., a policy of always choosing the LSP with the lowest tunnelID, a policy of performing a hash on the label stack in EMLS-E packet to choose a specific tunnelID, or the like). This MPLS LSP encapsulated tunnel format configured to support tunneling of an EMLS-E packet over an MPLS delivery network may be further understood by way of the example of FIG. 26.

FIG. 26 depicts an example embodiment of the format of an EMLS-E packet tunneled over an MPLS LSP in the multi-domain packet distribution network of FIG. 13. More specifically, FIG. 26 depicts the format of an EMLS-E (3) packet tunneled from R13 to R12 over the LDP based BE-LSP. The EMLS-E (3) packet of FIG. 26 is using the format described in FIG. 16. For example, in the topology in FIG. 13, assume that there is an LDP based BE-LSP IP-12/32 from R13 to R12 via the shortest path R13->R14->R6->R12, and that the label assigned by hop R14->R13 for IP-12/32 is LA.

As described herein, an IGP shortcut may be used for tunneling of EMLS-E packets over an IP/MPLS delivery network (e.g., the IGP shortcut is an MPLS tunnel used as a next-hop by an IP router, such that the incoming packet is an IP packet which is looked up in the IP Route Table and then forwarded as an MPLS packet). For example, a TE-LSP installed as the NextHop of the IP Route entry to the BR (i.e., an IGP shortcut) may be used as the unicast tunnel to the BR. Typically, the TE-LSP used as an IGP Shortcut is a RSVP-TE LSP or Segment Routing—Traffic Engineered (SR-TE) LSP. In general, IGP typically performs two independent computations: (1) a traditional SPF computation which results in the entries like the exemplary IP Route Tables described in FIG. 9 and FIGS. 10A and 10B, respectively and (2) a second computation performed considering MPLS-TE LSPs as logical interfaces (e.g., a cost/metric is assigned to the logical interface). Here, the egress routers of each of the MPLS-TE LSPs is considered and then the list of destinations whose shortest path traverses the egress router (established during the first computation) are considered. These destinations are given the egress router of the MPLS-TE LSP as a next-hop. If the cost of the MPLS-TE LSP is less than the cost of the shortest path to the egress router then the MPLS-TE LSP is considered as the better next-hop. The destinations are installed into the IP Route Table in the data plane with the MPLS-TE LSP as the next-hop (such next-hop is termed as an IGP Shortcut). If the IP Route Table entry for the BR is installed with IGP shortcut, then all packets to the BR are tunneled over the IGP shortcut; however, for tunneling EMLS-E packets over IGP shortcut, the additional criteria is that the IGP Shortcut must terminate at the BR and not at any intermediate router. The encapsulation of an EMLS-E packet on an IGP Shortcut is the same as presented with respect to FIG. 26.

Various example embodiments are configured to support various enhancements to the MPLS control plane and data plane for generation of EMLS-I packets and EMLS-E packets.

Figure 27A:
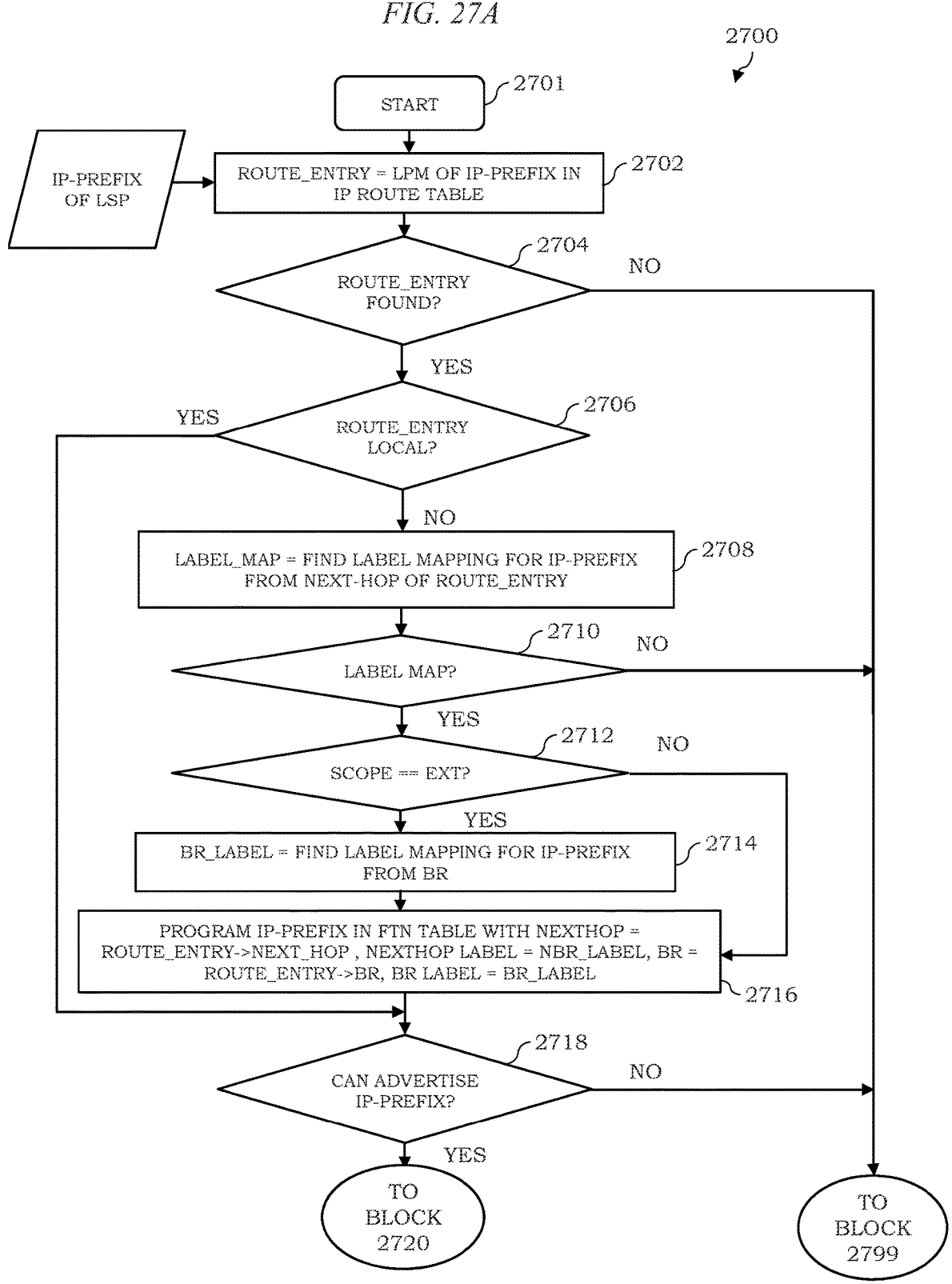
FIGS. 27A-27B depict an example embodiment of a method for next-hop resolution of a unicast BE-LSP and programming of the unicast BE-LSP into the data plane.
Figure 27B:
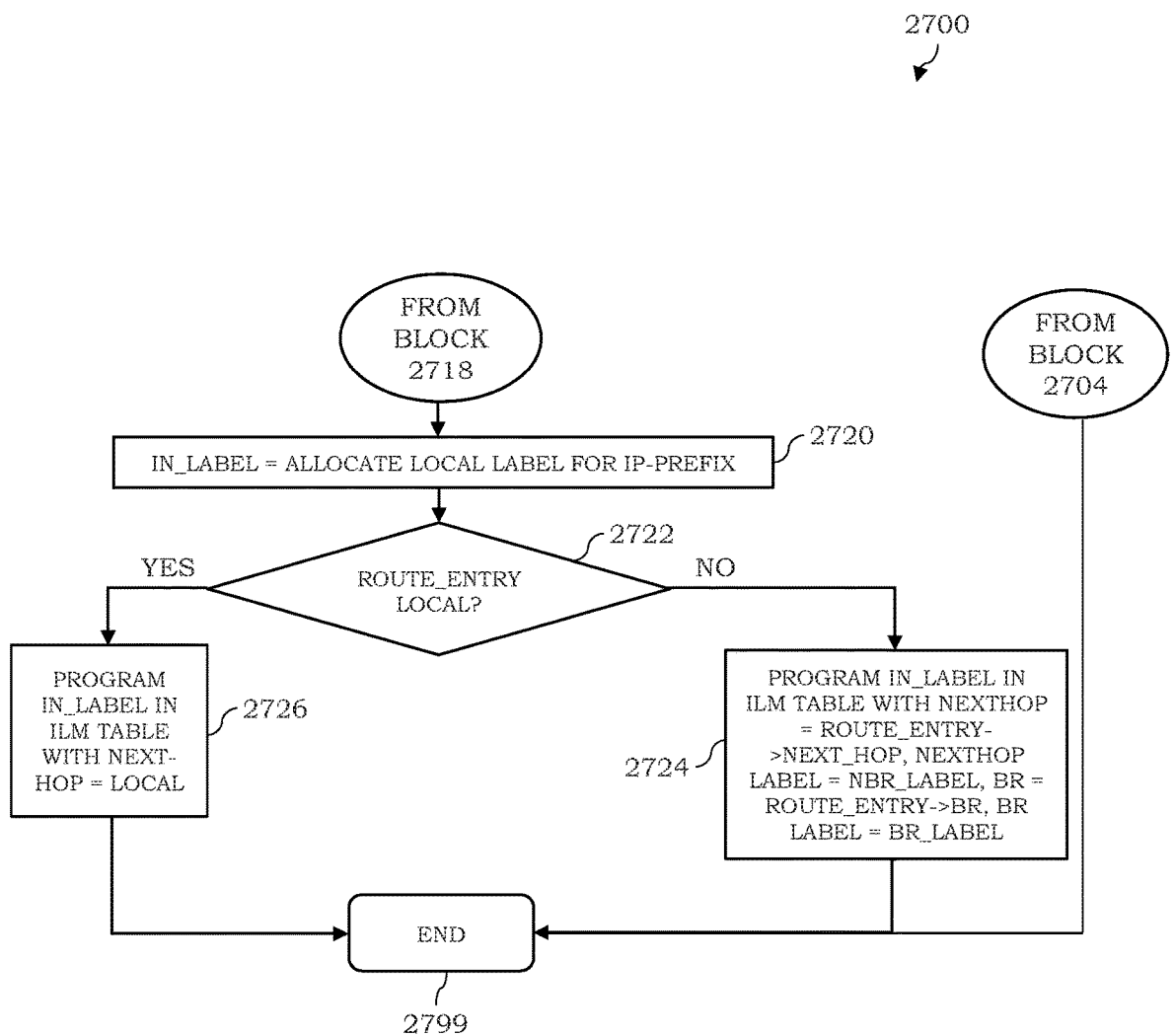

FIGS. 27A-27B depict an example embodiment of a method for next-hop resolution of a unicast BE-LSP and programming of the unicast BE-LSP into the data plane. It will be appreciated that, although primarily presented as being performed serially, at least a portion of the functions of method 2700 may be performed contemporaneously or in a different order than as presented with respect to FIGS. 27A-27B. The input to the method 2700 is a BE-LSP identified with an IP-Prefix. At block 2701, the method 2700 begins. Block 2702 performs LPM of the IP-Prefix in the IP Route Table, and then the method 2700 proceeds to block 2704. Block 2704 checks if a matching route entry is found. If a matching route entry is not found, then the method 2700 proceeds to block 2799 where the method 2700 ends, otherwise the method 2700 proceeds to block 2706. Block 2706 checks if the route entry is local, which means that the router performing the processing is the egress router in the MPLS domain for the IP-Prefix. If the route entry is local, then the method 2700 proceeds to block 2718, otherwise the method 2700 proceeds to block 2708. Block 2708 looks up label mapping for the IP-Prefix from the next-hop router of the matching route entry, and the method 2700 then proceeds to block 2710. Block 2710 checks if a label mapping is found. If a label mapping is not found, then the method 2700 proceeds to block 2799 where the method 2700 ends, otherwise the method 2700 proceeds to block 2712. Block 2712 checks if the Scope of the route entry is EXT. If the Scope of the route entry is not EXT, then the method 2700 proceeds to block 2716, otherwise the method 2700 proceeds to block 2714. Block 2714 retrieves the label mapping of the IP-Prefix from the BR. It will be appreciated that the manner in which the label mapping from the BR is determined is specific to the mechanism used to setup the unicast BE-LSP across the network (e.g., based on whether a global label space or a local label space is used to allocate labels for unicast LSPs, as discussed hereinabove). The method 2700 then proceeds to block 2716. Block 2716 programs the IP-Prefix in the FTN Table with the next-hop as the next-hop of the route entry, the next-hop label as the label in the label mapping from next-hop, BR with the BR from the route entry, and BR_Label as determined from block 2714. Now, the router can be ingress for the BE-LSP. The method 2700 then proceeds to block 2718. Block 2718 checks if a label mapping for the IP-Prefix can be advertised to neighboring routers. If a label mapping for the IP-Prefix cannot be advertised to neighboring routers, then the method 2700 proceeds to block 2799 where the method 2700 ends, otherwise the method 2700 proceeds to block 2720. Block 2720 allocates a local label for the IP-Prefix, and the method 2700 then proceeds to block 2722. Block 2722 again checks if the route entry is local. If the route entry is local, then the method 2700 proceeds to block 2726, otherwise the method 2700 proceeds to block 2724. Block 2724 programs the label in the ILM Table with the next-hop as the next-hop of the route entry, the next-hop label as the label in the label mapping from next-hop, the BR with the BR from the route entry, and the BR_Label as determined from block 2714. Now the router can be a transit router for the BE-LSP, the method 2700 proceeds to block 2799 where the method 2700 ends. Block 2726 programs the label in ILM Table with the next-hop as local. Now, the router can be an egress router for the BE-LSP, and the method 2700 proceeds to block 2799 where the method 2700 ends. At block 2799, the method 2700 ends.

Various example embodiments are configured to support IP tunneling of EMLS-E packets. Various example embodiments for supporting IP tunneling of EMLS-E packets may be further understood by way of reference to the example multi-domain packet distribution network of FIG. 13.

FIG. 28A depicts an example embodiment of an IP Route Table, in router R13 of the multi-domain packet distribution network of FIG. 13, for supporting IP tunneling of EMLS-E packet. FIG. 28A describes the IP Route Table in R13 that is used to resolve the shortest path next-hop of unicast BE-LSPs.

FIGS. 28B-1 and 28B-2 depict an example embodiment of an MPLS data plane, including an FTN Table, a BR Tunnel Table, and an ILM Table, in router R13 of the multi-domain packet distribution network of FIG. 13, for supporting IP tunneling of EMLS-E packets. It will be appreciated that FIGS. 28B-1 and 28B-2 are an embodiment of FIGS. 15B-1 and 15B-2 which is sufficient for IP-based tunneling of EMLS-E packets.

In FIGS. 28B-1 and 28B-2, each entry in the FTN Table and the ILM Table maintains additional state denoted with the tuple {Scope, BR, BR_Label}, where the "Scope" indicates whether an entry is INT (i.e., internal to the network domain) or EXT (i.e., external to the network domain), the "BR" indicates the IP address of the BR to reach the destination of the corresponding LSP, and the "BR_Label" indicates the label allocated and advertised by the BR for the corresponding LSP. It will be appreciated that, for generating an EMLS-E packet, the "BR" and the "BR_Label" are applicable only when Scope is EXT.

In FIGS. 28B-1 and 28B-2, the BR Tunnel Table includes the preference of tunneling methods and the resolved tunnel against an IP address of a BR, which is marked as EXT by entries in the FTN Table and/or in the ILM Table. The BR Tunnel Table is looked up for tunneling an EMLS-E packet to its BR. In the BR Tunnel Table of FIGS. 28B-1 and 28B-2, there are two BR entries—IP-12 and IP-17, where the tunneling method for entry IP-12 is GRE and the tunneling method for IP-17 is MPLS-in-UDP.

It will be appreciated that the following example discussed within the context of FIG. 28A and FIGS. 28B-1 and 28B-2 for supporting IP-based tunneling of EMLS-E packets is a continuation of the example provided herein with respect to FIG. 13, FIG. 14A, FIGS. 14B-1 and 14B-2, FIG. 15A, and FIGS. 15B-1 and 15B-2.

In continuation of the example for MPLS-based tunneling of EMLS-E packets, when R13 receives the EMLS packet with EMLS-E (1)={L6, L7, L8, L9, L10, L11} then R13, based on the ILM Table lookup in FIG. 28B-2, segregates the EMLS packet into the following copies: (1) EMLS-I (2)={L6, L7}, since the listed labels are INT in the ILM Table, (2) EMLS-E (2)={L8, L9} since the listed labels are EXT in the ILM Table and routed via common BR IP-17, and (3) EMLS-E (3)={L10, L11} since listed labels are EXT and routed via common BR IP-12. For tunneling the EMLS-E (2) packet, R13 looks up IP-17 in the BR Tunnel Table, which matches the entry IP-17 (which is programmed with Resolved Tunnel=MPLS-in-UDP), so the packet is tunneled with the format described in FIG. 24. For tunneling the EMLS-E (3) packet, R13 looks up IP-12 in the BR Tunnel Table, which matches the entry IP-12. The entry is programmed with Resolved Tunnel=GRE, so the packet is tunneled with the format described in FIG. 21.

Various example embodiments are configured to support MPLS-based tunneling of EMLS-E packets. Various example embodiments for supporting MPLS-based tunneling of EMLS-E packets may be further understood by way of reference to the example multi-domain packet distribution network of FIG. 13.

FIG. 29A depicts an example embodiment of an IP Route Table, in router R13 of the multi-domain packet distribution network of FIG. 13, for supporting MPLS-based tunneling of EMLS-E packets. FIG. 29A describes the IP Route Table in R13 that is used to resolve the shortest path next-hop of unicast BE-LSPs. FIG. 29A is the IP Route Table in R13 from FIG. 22A, but with addition of an IGP shortcut, which is the IP Prefix IP-17/32.

FIGS. 29B-1 and 29B-2 depict an example embodiment of an MPLS data plane, including an FTN Table, a BR Tunnel Table, and an ILM Table, in router R13 of the multi-domain packet distribution network of FIG. 13, for supporting MPLS-based tunneling of EMLS-E packets. In FIGS. 29B-1 and 29B-2, the Tunnel Preference in a BR Tunnel Table entry is programmed with a choice of an MPLS LSP that can be used for tunneling an EMLS-TE packet to the BR. Then, to tunnel an EMLS-TE packet to a BR, the LSP of the given choice is looked up in the FTN Table based on which tunnel encapsulation (i.e., label stack) is pushed. It will be appreciated that there could be multiple MPLS LSPs to a BR (e.g., each of the control plane methods such as LDP, SR, and so forth, can set-up one shortest path BE-LSP to the BR). BGP can set-up one BE-LSP to BR based on its policy-based routing. RSVP-TE and SR-TE can have multiple TE-LSPs to the BR, each supporting certain QoS constraint. As such, the Tunnel Preference field in a BR Tunnel Table entry may have a list of multiple tunnel choices, which may be ordered by preference. The EMLS-E packet can be tunneled over the first choice for which the LSP is available in the FTN Table, which is indicated by the Resolved Tunnel field in the BR Tunnel Table. It is noted that it is also possible that a MPLS LSP can be further tunneled over another MPLS LSP (tunnel-in-tunnel), such as LDPoverRSVP, BGPoverLDPoverRSVP, or the like. It will be appreciated that tunneling of EMLS-E packets over MPLS LSPs to a BR is illustrated in FIGS. 29B-1 and 29B-2, which include the FTN Table and BR Tunnel Table of R13 from FIGS. 28B-1 and 28B-2, but with addition of various choices of MPLS LSPs to BRs that could be used for tunneling the EMLS-E packets. In FIGS. 29B-1 and 29B-2, the FTN Table includes entries for LSPs to IP-12/32 for LDP, IP-17/32 for BGP, and IP-12/32 for SR, and, additionally, there are 10 RSVP-TE signaled TE-LSPs to IP-17 with tunnelIDs 1-10, respectively (where, out of the 10 TE-LSPs, the LSP with tunnelID 101 is chosen as the IGP shortcut for IP Route Table entry IP-17/32).

It will be appreciated that the following example discussed within the context of FIG. 29A and FIGS. 29B-1 and 29B-2 for supporting MPLS-based tunneling of EMLS-E packets is a continuation of the example provided herein with respect to FIG. 13, FIG. 14A, FIGS. 14B-1 and 14B-2, FIG. 15A, and FIGS. 15B-1 and 15B-2.

In continuation of the example for MPLS-based tunneling of EMLS-E packets, when R13 receives the EMLS packet with EMLS-E (1)={L6, L7, L8, L9, L10, L11}, it is segregated to EMLS-I (2), EMLS-E (2), and EMLS-E (3) packets as previously described.

In continuation of the example for MPLS-based tunneling of EMLS-E packets, for tunneling the EMLS-E (3) packet, R13 looks up IP-12 in the BR Tunnel Table, which is programmed with first preference for LDP tunnel and second preference for SR tunnel. So, R13 looks up LDP LSP IP-12/32 in the FTN Table and an entry is found, so an LDP LSP has been programmed as the Resolved Tunnel. The FTN Table entry for LDP LSP IP-12/32 is programmed with label L12A to next-hop R13->R14. So, the EMLS-E (3) packet is encapsulated in label L12A in the format of FIG. 26 and is forwarded to immediate next-hop R13->R14.

In continuation of the example for MPLS-based tunneling of EMLS-E packets, for tunneling the EMLS-E (2) packet, R13 looks up IP-17 in the BR Tunnel Table. The entry is programmed with the first preference as BGP, the second preference as LDP, the third preference as RSVP-TE LSP with Tunnel ID 102, and the fourth preference as IGP Shortcut. So, R13 looks up for the BGP LSP IP-17/32 in the FTN Table and finds one, so BGP LSP has been programmed as the Resolved Tunnel in BR Tunnel Table. The FTN Table entry for BGP LSP IP-12/32 is programmed with label L17 to next-hop R13->R14. So, the EMLS-E packet is encapsulated in label L17 in the format of FIG. 26 and is forwarded to immediate next-hop R13->R14.

In continuation of the example for MPLS-based tunneling of EMLS-E packets, assume that entries for the first, second, and third preferences of IP-17 in the BR Tunnel Table do not exist in the FTN Table. Then, R13 needs to consider use of an IGP shortcut to IP-17. So, R13 looks up the IP Route Table for IP-17 and finds the matching route entry IP-17/32. The entry is also programmed as an IGP shortcut with RSVP-TE LSP with Tunnel ID 101. Then, R13 also needs to verify that the RSVP-TE LSP ends at IP-17 as well (note that an IGP shortcut could be to an intermediate router as well). So, R13 looks up the FTN Table for the RSVP-TE LSP to IP-17/32 with Tunnel ID 101 and a matching entry is found and, thus, has been programmed as the Resolved Tunnel for IP-17 in the BR Tunnel Table. The FTN Table entry is programmed with label L17A to next-hop R13->R14. So, the EMLS-E packet is encapsulated in label L17A in the format of FIG. 26 and is forwarded to immediate next-hop R13->R14.

Figure 30A:
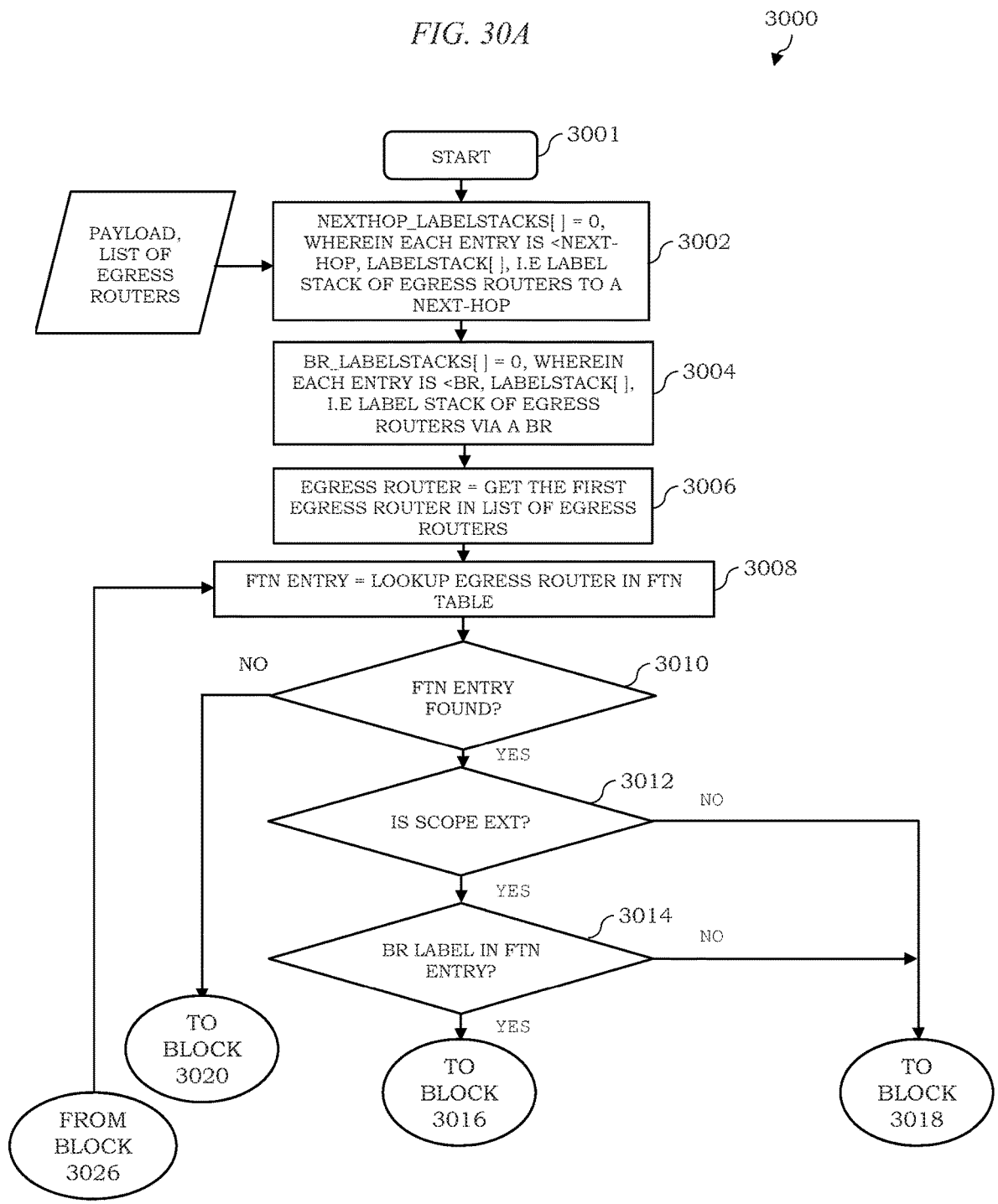
FIGS. 30A-30B depict an example embodiment of a method for origination of an EMLS packet by an ingress router.
Figure 30B:
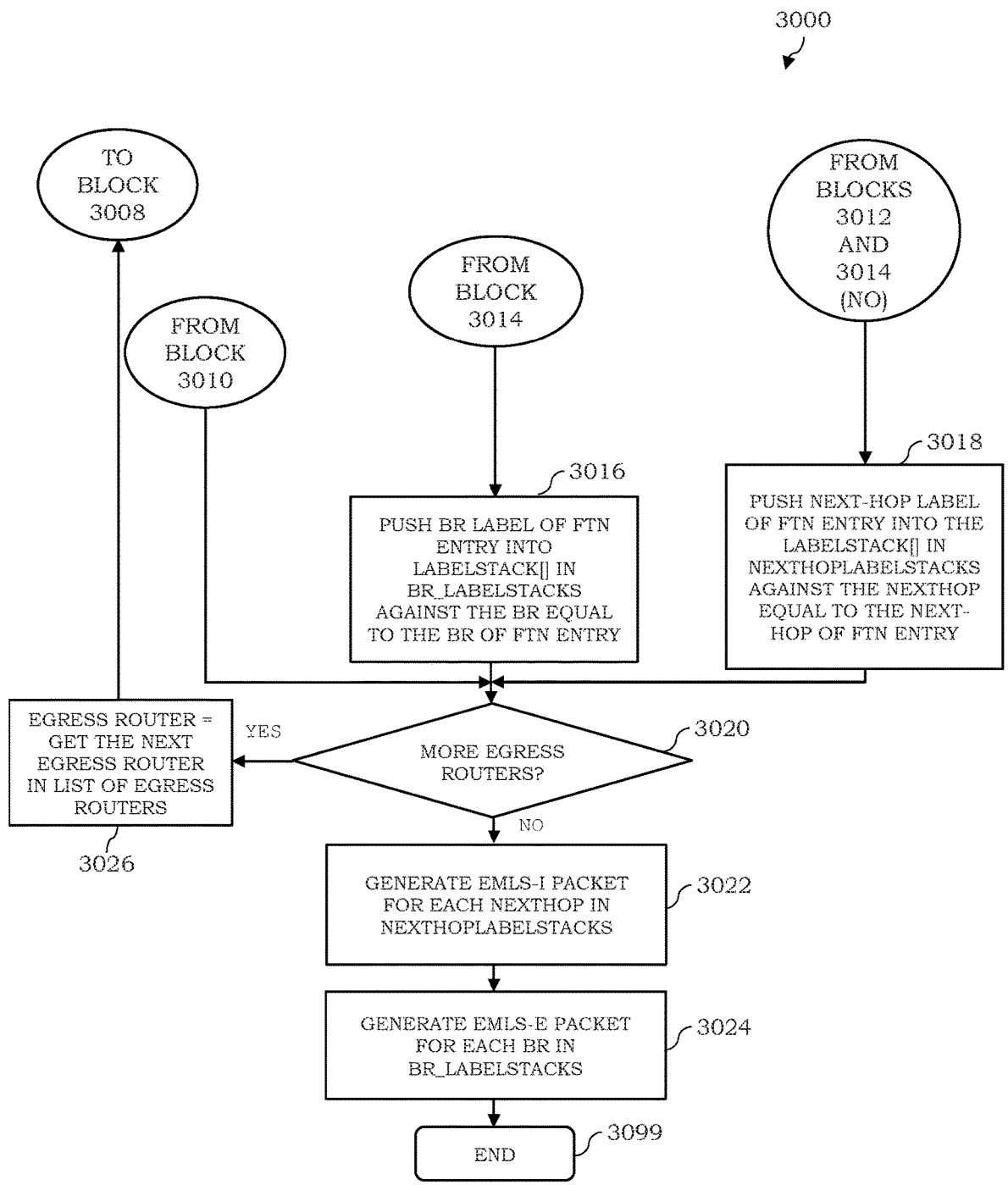

FIGS. 30A-30B depict an example embodiment of a method for origination of an EMLS packet by an ingress router. It will be appreciated that the method 3000 of FIGS. 30A-30B may be used to originate an EMLS-I packet or an EMLS-E packet. It will be appreciated that, although primarily presented as being performed serially, at least a portion of the functions of method 3000 may be performed contemporaneously or in a different order than as presented with respect to FIGS. 30A-30B. The inputs to the method 3000 include a Payload (the packet that is to be multicasted) and the list of egress routers for the multicast (e.g., each entry in the list may be the loopback IP address at the respective egress router). At block 3001, the method 3000 begins. Block 3002 initializes an empty list of label stacks (NextHop_LabelStacks[]), wherein each label stack represents the subset of unicast BE-LSPs (egress routers) partitioned to a specific next-hop, and the method 3000 then proceeds to block 3004. Block 3004 initializes an empty list of label stacks (BR_LabelStacks[]), wherein each label stack represents the subset of unicast BE-LSPs (egress routers) partitioned to a specific BR, and the method 3000 then proceeds to block 3006. Block 3006 retrieves the first egress router in the list of egress routers, and the method 3000 then proceeds to block 3008. Block 3008 looks up the egress router (e.g., the IP address) in the FTN Table. It is noted that, in the FTN Table, there could be multiple shortest path BE-LSPs to an egress router. For example, the FTN Table may have one BE-LSP to the egress router set-up by each of LDP, BGP, and SR. In that case, the router may implement some preference policy to choose the appropriate BE-LSP (and its FTN Entry). The method 3000 then proceeds to block 3010. Block 3010 checks if a matching FTN entry found. If a matching FTN entry is not found, then this egress router is skipped (and, thus, does not get included in EMLS) and then method 3000 then proceeds to block 3020, otherwise the method 3000 proceeds to block 3012. Block 3012 checks if the Scope of the FTN Entry is EXT (i.e., the BE-LSP is an inter-domain LSP). If the Scope of the FTN Entry is EXT, then the method 3000 proceeds to block 3014, otherwise the method 3000 proceeds to block 3018. Block 3014 further checks if the BR_Label is resolved in the FTN Entry. If the BR_Label is not resolved in the FTN Entry, then the method 3000 proceeds to block 3018, otherwise the method 3000 proceeds to block 3016. Block 3016 pushes the BR_Label of the FTN Entry into the Label Stack in BR_LabelStacks against the BR equal to the BR of the FTN Entry, and the method 3000 then proceeds to block 3020. Block 3018 pushes the next-hop label of the FTN Entry into the Label Stack in NextHop_LabelStacks against the Next-Hop equal to the next-hop of the FTN Entry, and the method 3000 then proceeds to block 3020. Block 3020 checks if there are more egress routers to process in the list of egress routers. If there are more egress routers to process in the list of egress routers, then the method 3000 proceeds to block 3026, otherwise the method 3000 proceeds to block 3022. Block 3026 retrieves the next egress router in the list of egress routers, and the method 3000 then returns to block 3008 to repeat subsequent blocks for the next egress router. In Block 3022, NextHop_LabelStacks now includes the label stacks of the intra-domain BE-LSPs to the egress routers, partitioned by their respective next-hops. Block 3022 generates and sends an EMLS-I packet with a copy of the Payload to each next-hop in NextHop_LabelStacks, wherein the EMLS comprises of the label stack for the respective next-hop, and then the method 3000 proceeds to block 3024. In Block 3024, BR_LabelStacks now includes the label stacks of the inter-domain BE-LSPs to the egress routers, partitioned by their respective BRs. Block 3024 generates and sends an EMLS-E packet with a copy of the Payload to each BR in BR_LabelStacks, wherein the EMLS comprises of the label stack for the respective BR, and then the method 3000 proceeds to block 3099. It will be appreciated that the block 3022 may be implemented using FIG. 6. At block 3099, the method 3000 ends.

Figure 31:
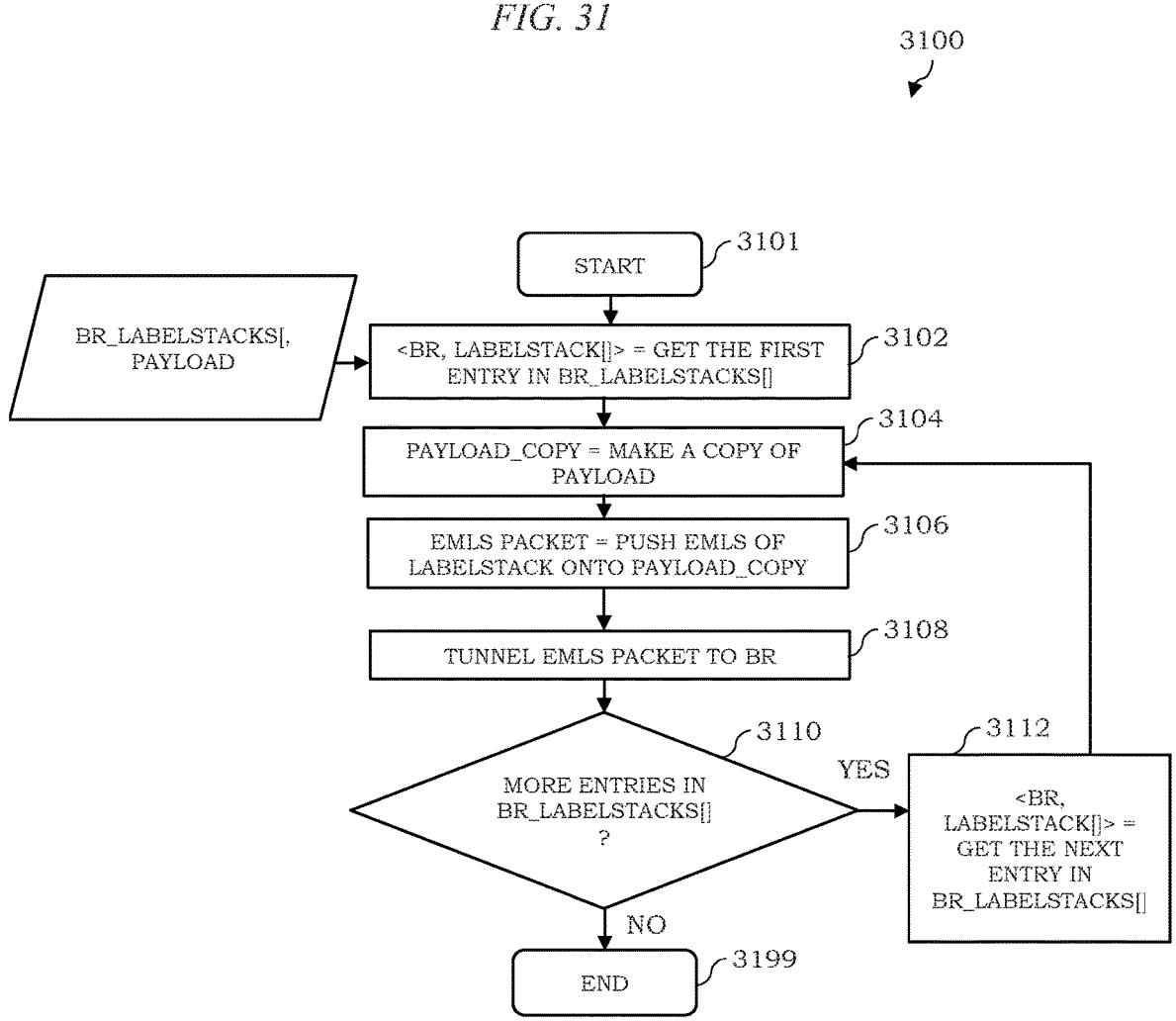
FIG. 31 depicts an example embodiment of a method for generating an EMLS-E packet to be tunneled to a BR.

FIG. 31 depicts an example embodiment of a method for generating an EMLS-E packet to be tunneled to a BR. It will be appreciated that the method 3100 of FIG. 31 may be used as block 3024 of FIGS. 30A-30B. It will be appreciated that, although primarily presented as being performed serially, at least a portion of the functions of method 3100 may be performed contemporaneously or in a different order than as presented with respect to FIG. 31. The inputs to the method 3100 include BR_LabelStacks[] and the Payload to be tunneled. At block 3101, the method 3100 begins. Block 3102 retrieves the first entry in the BR_LabelStacks, which is a label stack of inter-domain BE-LSPs to a BR, and the method 3100 then proceeds to block 3104. Block 3104 replicates the Payload for the BR and then the method 3100 proceeds to block 3106. Block 3106 pushes the EMLS including the label stack onto the replicated Payload, which results in the EMLS packet to be sent to the BR, and the method 3100 then proceeds to block 3108. Block 3108 tunnels the EMLS packet to the BR via designated tunneling method, and the method 3100 then proceeds to block 3110. Block 3110 checks if there are more entries in BR_LabelStacks. If there are no more entries in BR_LabelStacks, then the method 3100 proceeds to block 3199 where the method 3100 ends, otherwise the method 3100 proceeds to block 3112. Block 3112 retrieves the next entry in BR_LabelStacks and returns to block 3104 to repeat the subsequent blocks for this entry. At block 3199, the method 3100 ends.

Figure 32:
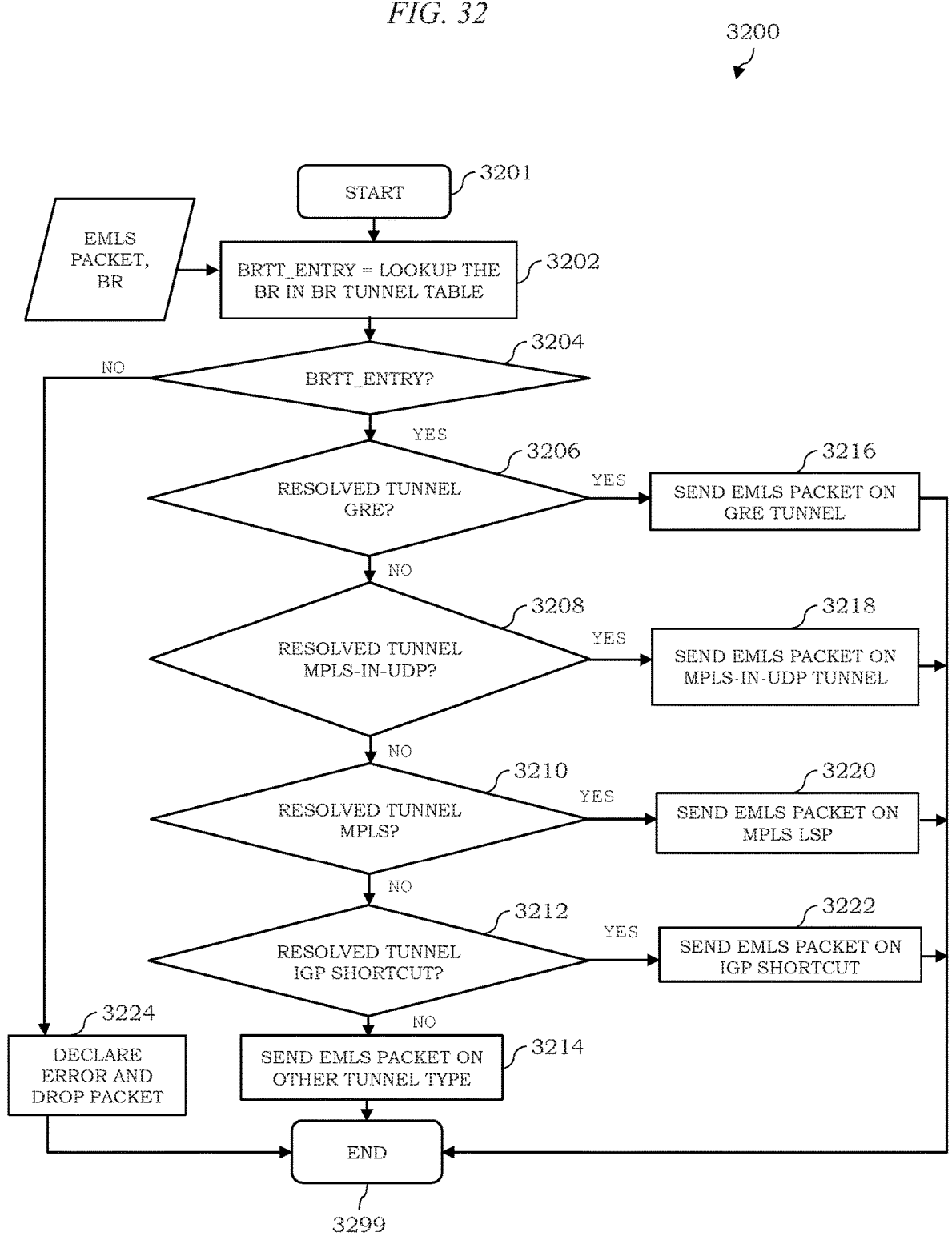
FIG. 32 depicts an example embodiment of a method for tunneling an EMLS-E packet to a BR.

FIG. 32 depicts an example embodiment of a method for tunneling an EMLS-E packet to a BR. It will be appreciated that the method 3200 of FIG. 32 may be used as block 3108 of FIG. 31. It will be appreciated that, although primarily presented as being performed serially, at least a portion of the functions of method 3200 may be performed contemporaneously or in a different order than as presented with respect to FIG. 32. The inputs to the method 3200 include the received EMLS-E packet and the destination BR of the tunnel. At block 3201, the method 3200 begins. Block 3202 looks up the BR in BR Tunnel Table (BRTT), and the method 3200 then proceeds to block 3204. Block 3204 checks if a matching entry is found in the BRTT. If a matching entry is not found in the BRTT, then the method 3200 proceeds to block 3224, otherwise the method 3200 proceeds to block 3206. Block 3206 checks if the Resolved Tunnel is GRE. If the Resolved Tunnel is GRE, then the method 3200 proceeds to block 3216 (at which point the EMLS packet is sent over a GRE tunnel, such as by using the method of FIG. 33) and then proceeds to block 3299, otherwise the method 3200 proceeds to block 3208. Block 3208 checks if the Resolved Tunnel is MPLS-in-UDP. If the Resolved Tunnel is MPLS-in-UDP, then the method 3200 proceeds to block 3218 (at which point the EMLS packet is sent over an MPLS-in-UDP tunnel, such as by using the method of FIG. 34) and then proceeds to block 3299, otherwise the method 3200 proceeds to block 3210. Block 3210 checks if the Resolved Tunnel is an MPLS LSP. If the Resolved Tunnel is an MPLS LSP, then the method 3200 proceeds to block 3220 (at which point the EMLS packet is sent over an MPLS LSP tunnel, such as by using the method of FIG. 35) and then proceeds to block 3299, otherwise the method 3200 proceeds to block 3212. Block 3212 checks if the Resolved Tunnel is an IGP Shortcut. If the Resolved Tunnel is an IGP Shortcut, then the method 3200 proceeds to block 3222 (at which point the EMLS packet is sent over an IGP Shortcut tunnel, such as by using the method of FIG. 36) and then proceeds to block 3299, otherwise the method 3200 proceeds to block 3214. Block 3214 send the EMLS packet over other types of tunneling methods which have been omitted for purposes of clarity (it will be appreciated that, although specific tunneling methods are illustrated herein, various other tunneling methods may be used for tunneling the EMLS-E packets to BRs). Block 3224 declares an error and drops the EMLS-E packet, and then the method 3200 proceeds to block 3299. At block 3299, the method 3200 ends.

Figure 33:
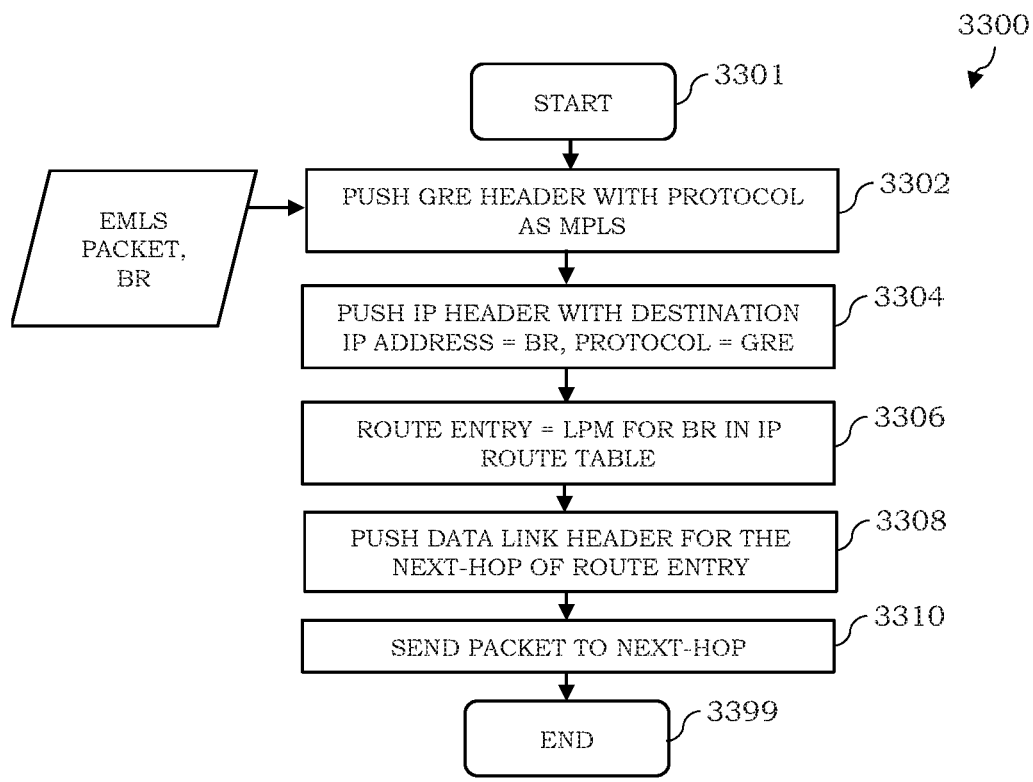
FIG. 33 depicts an example embodiment of a method for GRE Tunneling of an EMLS-E packet to a BR.

FIG. 33 depicts an example embodiment of a method for GRE Tunneling of an EMLS-E packet to a BR. It will be appreciated that the method 3300 of FIG. 33 may be used as block 3216 of FIG. 32. It will be appreciated that, although primarily presented as being performed serially, at least a portion of the functions of method 3300 may be performed contemporaneously or in a different order than as presented with respect to FIG. 33. The inputs to the method 3300 include the received EMLS-E packet and the BR. At block 3301, the method 3300 begins. Block 3302 pushes a GRE header onto the EMLS packet, wherein the Protocol field in the GRE Header is encoded with 0x8847 (Ethertype for MPLS). The method 3300 then proceeds to block 3304. Block 3304 pushes an IP header onto the packet. In the IP Header, the Destination IP Address is set to the BR, the Source IP Address is set to one local IP address in the router tunneling the EMLS-E packet, and the Protocol field in the case of IPv4 or the Next Header field in the case of IPv6 is set to GRE to indicate the next header as GRE. The method 3300 then proceeds to block 3306. Block 3306 performs LPM for the BR in IP Route Table, in order to determine the next-hop for the tunneled packet, and the method 3300 then proceeds to block 3308. Block 3308 pushes the data link header (e.g., Ethernet) for the next-hop of the matching route entry, and the method 3300 then proceeds to block 3310. Block 3310 sends the packet to next-hop, and the method 3300 then proceeds to block 3399. At block 3399, the method 3300 ends.

Figure 34:
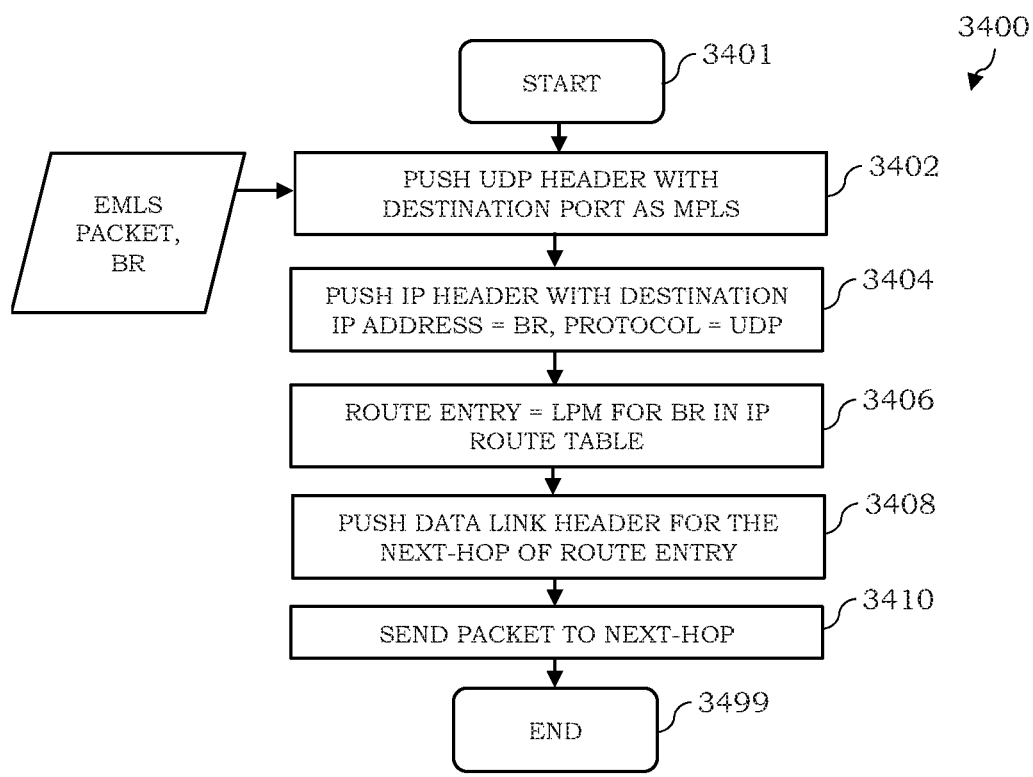
FIG. 34 depicts an example embodiment of a method for MPLS-in-UDP Tunneling of an EMLS-E packet to a BR.

FIG. 34 depicts an example embodiment of a method for MPLS-in-UDP Tunneling of an EMLS-E packet to a BR. It will be appreciated that the method 3400 of FIG. 34 may be used as block 3218 of FIG. 32. It will be appreciated that, although primarily presented as being performed serially, at least a portion of the functions of method 3400 may be performed contemporaneously or in a different order than as presented with respect to FIG. 34. The inputs to the method 3400 include the received EMLS-E packet and the BR. At block 3401, the method 3400 begins. Block 3402 pushes a UDP header onto the EMLS packet, wherein the Destination Port field in the UDP Header is encoded with the assigned port for MPLS and wherein the Source Port field in UDP Header is set to any random value or an appropriate value as per the implementation. The method 3400 then proceeds to block 3404. Block 3404 pushes an IP header onto the packet. In the IP Header, the Destination IP Address is set to the BR, the Source IP Address is set to one local IP address in the router tunneling the EMLS-E packet, and the Protocol field in the case of IPv4 or the Next Header field in the case of IPv6 is set to UDP to indicate the next header as UDP. The method 3400 then proceeds to block 3406. Block 3406 performs LPM for the BR in the IP Route Table in order to determine the next-hop for the tunneled packet, and the method 3400 then proceeds to block 3408. Block 3408 pushes the data link header (e.g., Ethernet) for the next-hop of the matching route entry, and the method 3400 then proceeds to block 3410. Block 3410 sends the packet to the next-hop, and the method 3400 then proceeds to block 3499. At block 3499, the method 3400 ends.

Figure 35:
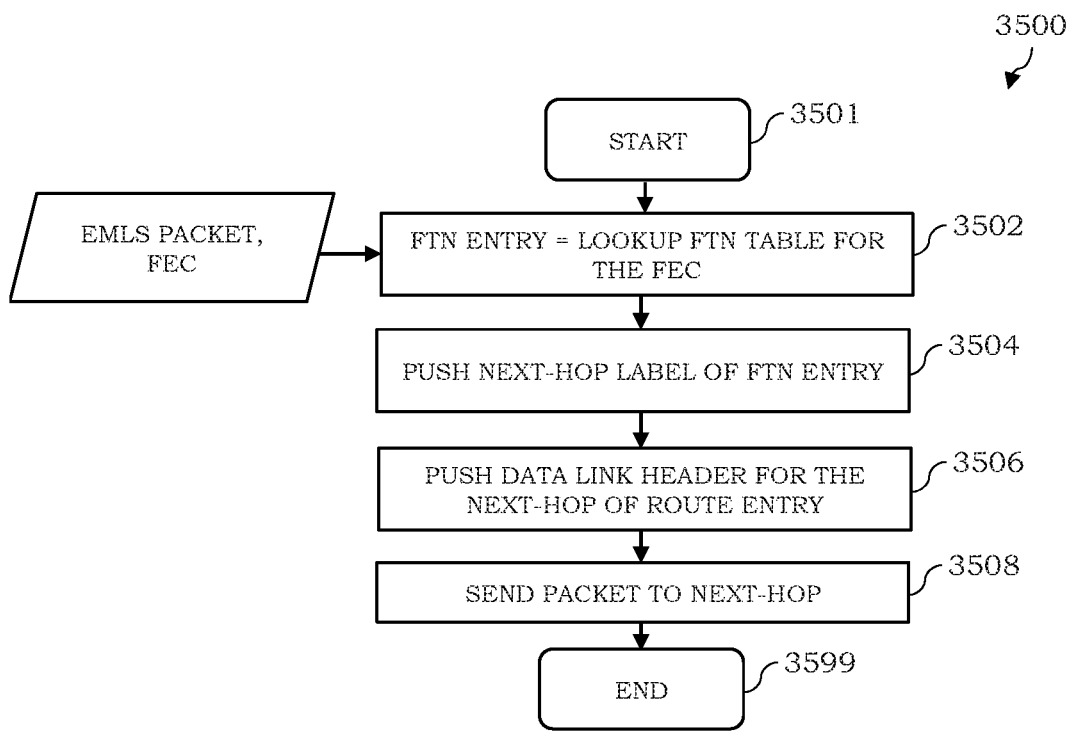
FIG. 35 depicts an example embodiment of a method for MPLS LSP Tunneling of an EMLS-E packet to a BR.

FIG. 35 depicts an example embodiment of a method for MPLS LSP Tunneling of an EMLS-E packet to a BR. It will be appreciated that the method 3500 of FIG. 35 may be used as block 3220 of FIG. 32. It will be appreciated that, although primarily presented as being performed serially, at least a portion of the functions of method 3500 may be performed contemporaneously or in a different order than as presented with respect to FIG. 35. The inputs to the method 3500 include the received EMLS-E packet, the BR, and the FEC that indicates the MPLS LSP. At block 3501, the method 3500 begins. Block 3502 looks up the FTN Table for the FEC, and the method 3500 then proceeds to block 3504. Block 3504 pushes the next-hop label associated with the FTN Entry. It is noted that an LSP could be tunnel-in-tunnel mode, wherein the LSP can be further tunneled over one or more LSPs. In that case, multiple FTN Entries are chained together (e.g., the next-hop of this FTN Entry points to FTN entry of next level LSP, and so forth). So, this block could push a label stack for the nested LSPs. The method 3500 then proceeds to block 3506. Block 3506 pushes the data link header (e.g., Ethernet) for the next-hop of the FTN entry, and the method 3500 then proceeds to block 3508. Block 3508 sends the packet to next-hop, and the method 3500 then proceeds to block 3599. At block 3599, the method 3500 ends.

Figure 36:
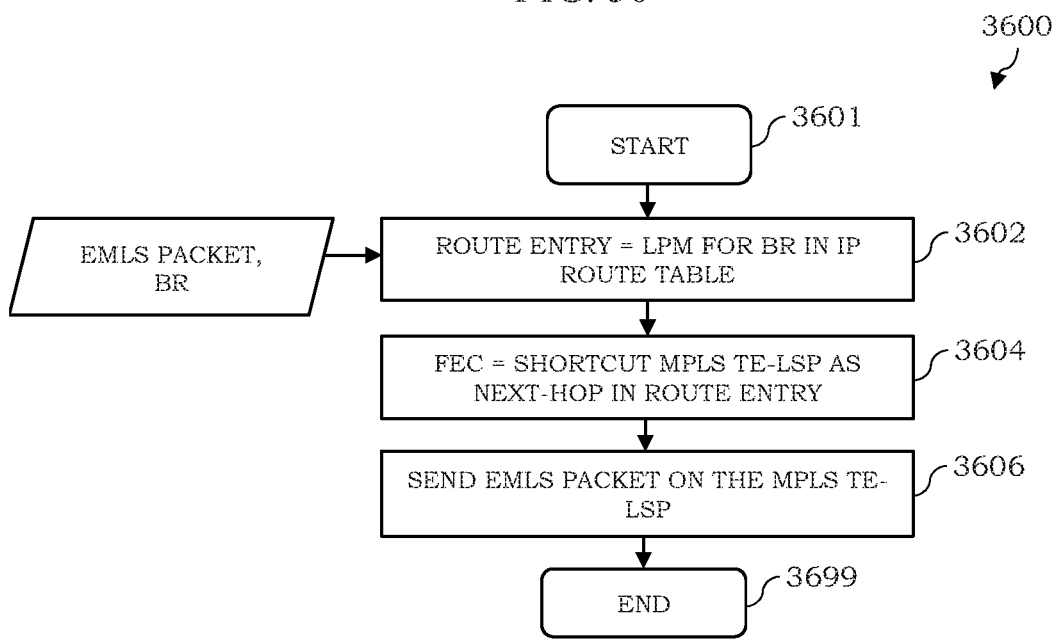
FIG. 36 depicts an example embodiment of a method for IGP Shortcut Tunneling of an EMLS-E packet to a BR.

FIG. 36 depicts an example embodiment of a method for IGP Shortcut Tunneling of an EMLS-E packet to a BR. It will be appreciated that the method 3600 of FIG. 36 may be used as block 3222 of FIG. 32. It will be appreciated that, although primarily presented as being performed serially, at least a portion of the functions of method 3600 may be performed contemporaneously or in a different order than as presented with respect to FIG. 36. The inputs to the method 3600 include the received EMLS-E packet and the BR. At block 3601, the method 3600 begins. Block 3602 performs LPM for the BR in the IP Route Table, in order to determine the next-hop for the tunneled packet, and the method 3600 then proceeds to block 3604. Block 3604 retrieves the TE-LSP being used as a shortcut by this route entry. The FEC of the TE-LSP is found as the next-hop in the route entry. The method 3600 then proceeds to block 3606. Block 3606 sends the EMLS-E packet over the TE-LSP. It will be appreciated that this block may be implemented by the method 3500 of FIG. 35. At block 3699, the method 3600 ends.

Figure 37A:
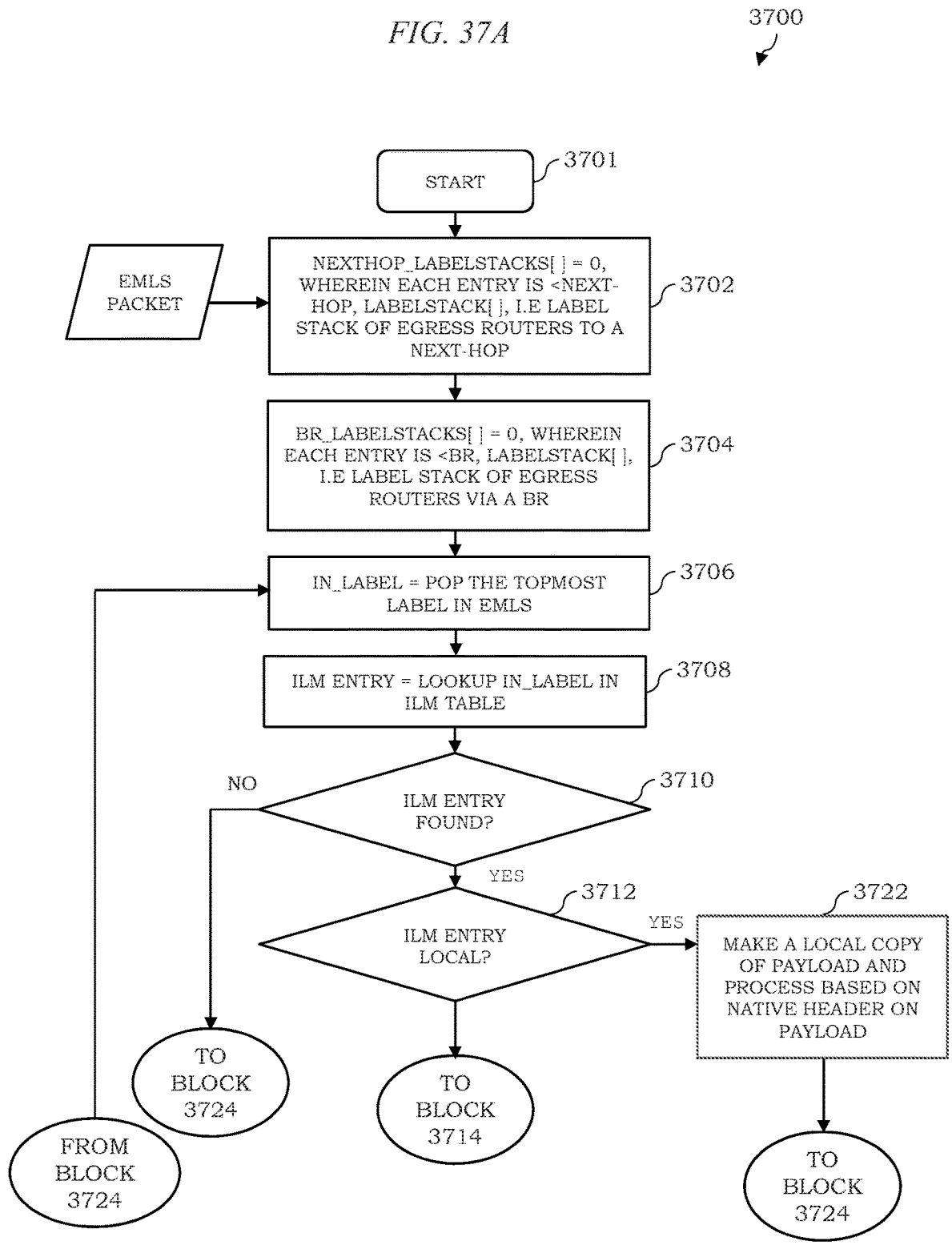
FIGS. 37A-37B depict an example embodiment of a method for processing an EMLS packet received at a node.
Figure 37B:
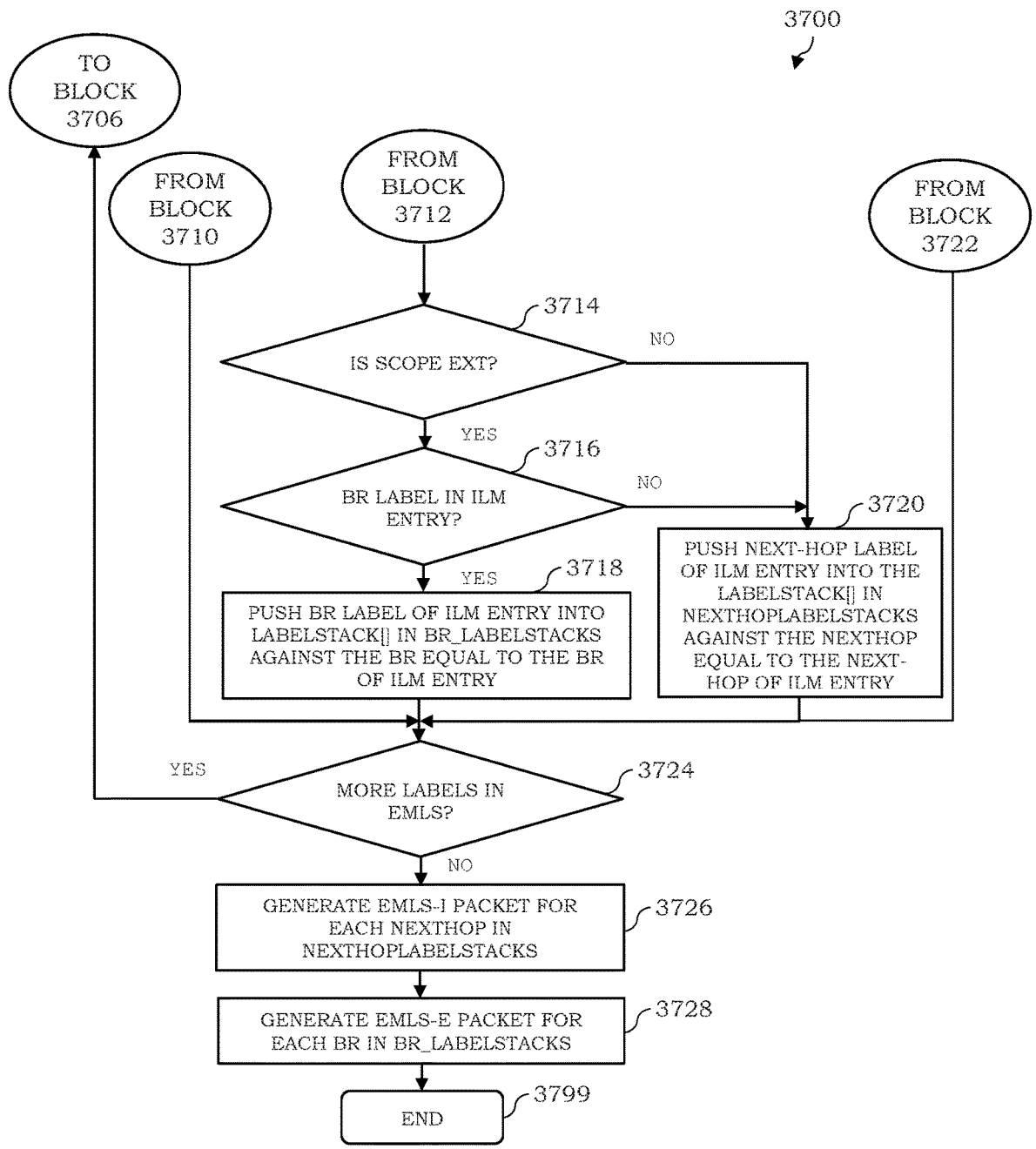

FIGS. 37A-37B depict an example embodiment of a method for processing an EMLS packet received at a node. It will be appreciated that method 3700 may be agnostic as to whether the EMLS packet is an EMLS-I packet or an EMLS-E packet. It will be appreciated that, although primarily presented as being performed serially, at least a portion of the functions of method 3700 may be performed contemporaneously or in a different order than as presented with respect to FIGS. 37A-37B. The inputs to the method 3700 include the received EMLS packet. At block 3701, the method 3700 begins. Block 3702 initializes an empty list of label stacks (NextHop_LabelStacks[]), wherein each label stack represents the subset of unicast BE-LSPs (egress routers) partitioned to a specific next-hop. The method 3700 then proceeds to block 3704. Block 3704 initializes an empty list of label stacks (BR_LabelStacks[]), wherein each label stack represents the subset of unicast BE-LSPs (egress routers) partitioned to a specific BR. The method 3700 then proceeds to block 3706. Block 3706 pops the topmost label in EMLS, and the method 3700 then proceeds to block 3708. Block 3708 looks up the popped label in the ILM Table, and the method 3700 then proceeds to block 3710. Block 3710 checks if a matching ILM entry found. If a matching ILM entry is not found, then the method 3700 skips further processing on this label and jumps to block 3724, otherwise the method 3700 proceeds to block 3712. Block 3712 checks if the ILM entry is local, which means that the processing router is the egress router for the BE-LSP. If the processing router is the egress router, then the method 3700 proceeds to block 3722, otherwise the method 3700 proceeds to block 3714. Block 3722 makes a local copy of the payload of the EMLS packet and processes the payload of the EMLS packet further based on the native header(s) in the payload of the EMLS packet, and the method 3700 then proceeds to block 3724. Block 3714 checks if the Scope of the ILM Entry is EXT, i.e., the BE-LSP is an inter-domain LSP. If the Scope of the ILM Entry is EXT, then the method 3700 proceeds to block 3716, otherwise the method proceeds to block 3720. Block 3716 further checks if the BR_Label is resolved in the ILM Entry. If the BR_Label is not resolved in the ILM Entry, then the method 3700 proceeds to block 3720, otherwise the method 3700 proceeds to block 3718. Block 3718 pushes the BR_Label of the ILM Entry into the Label Stack in BR_LabelStacks against the BR equal to the BR of the ILM Entry, and the method 3700 then proceeds to block 3724. Block 3720 pushes the next-hop label of the ILM Entry into the Label Stack in NextHop_LabelStacks against the Next-Hop equal to the next-hop of the ILM Entry, and the method 3700 then proceeds to block 3724. Block 3724 checks if there are more labels in the EMLS. If there are more labels in the EMLS, then the method 3700 returns to block 3706 to repeat subsequent blocks for the next label. In Block 3726, NextHop_LabelStacks now includes s the label stacks of the intra-domain BE-LSPs to the egress routers, partitioned by their respective next-hops. Block 3726 generates and sends an EMLS-I packet with a copy of the Payload to each next-hop in NextHop_LabelStacks, wherein the EMLS includes the label stack for the respective next-hop. It will be appreciated that block 3726 may be implemented by method 2500 of FIG. 25. From block 3726, the method 3700 then proceeds to block 3728. In Block 3728, BR_LabelStacks now includes the label stacks of the inter-domain BE-LSPs to the egress routers, partitioned by their respective BRs. Block 3728 generates and sends an EMLS-E packet with a copy of the Payload to each BR in BR_LabelStacks, wherein the EMLS includes the label stack for the respective BR. It will be appreciated that block 3728 may be implemented by method 3100 of FIG. 31. From block 3728, the method 3700 proceeds to block 3799. At block 3799, the method 3700 ends.

It will be appreciated that, since the enhancements in the MPLS dataplane are generic, various example embodiments presented herein may be applicable for tunneling packets other than EMLS-E packets, for tunneling packets for other types of applications, or the like, as well as various combinations thereof.

Figure 38:
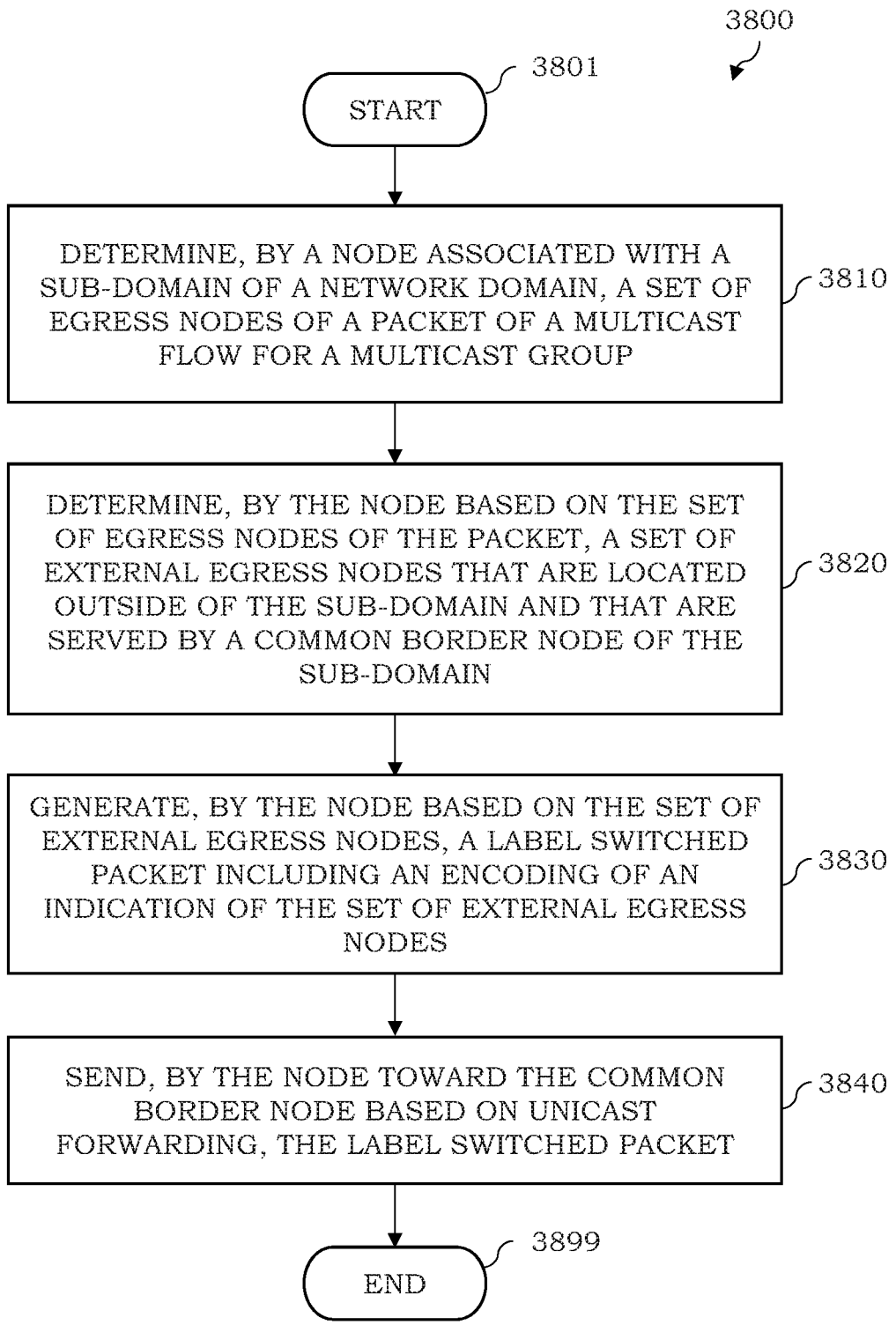
FIG. 38 depicts an example embodiment of a method for use by a communication device to support stateless multicast for a multicast group.

FIG. 38 depicts an example embodiment of a method for use by a communication device to support stateless multicast for a multicast group. It will be appreciated that, although primarily presented as being performed serially, at least a portion of the functions of method 3800 may be performed contemporaneously or in a different order than as presented with respect to FIG. 38. At block 3801, the method 3800 begins. At block 3810, determine, by a node associated with a sub-domain of a network domain, a set of egress nodes of a packet of a multicast flow for a multicast group. At block 3820, determine, by the node from the set of egress nodes of the packet, a set of external egress nodes that are located outside of the sub-domain and that are served by a common border node of the sub-domain. At block 3830, generate, by the node based on the set of external egress nodes, a label switched packet including an encoding of an indication of the set of external egress nodes. At block 3840, send, by the node toward the common border node based on unicast forwarding, the label switched packet. At block 3899, the method 3800 ends. It will be appreciated that various functions presented herein with respect to FIGS. 1-37 may be incorporated within the context of method 3800 of FIG. 38.

Figure 39:
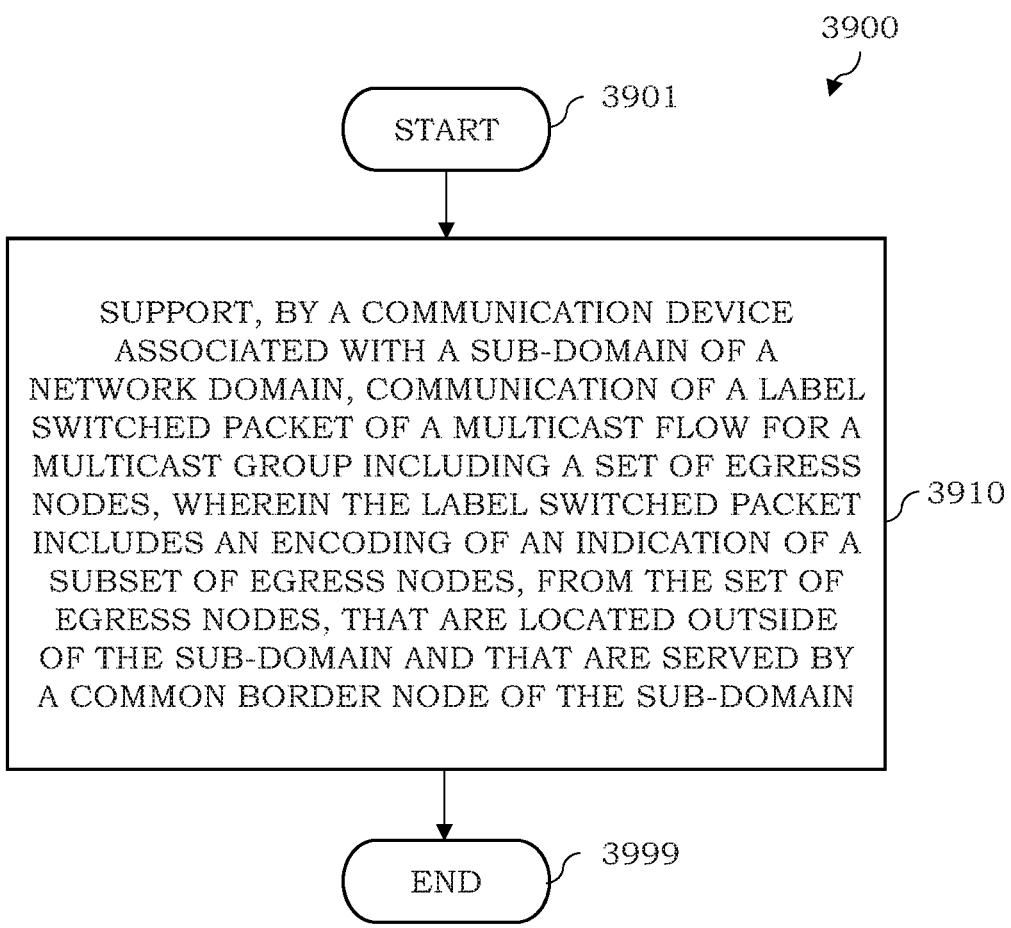
FIG. 39 depicts an example embodiment of a method for use by a communication device to support stateless multicast for a multicast group.

FIG. 39 depicts an example embodiment of a method for use by a communication device to support stateless multicast for a multicast group. It will be appreciated that, although primarily presented as being performed serially, at least a portion of the functions of method 3900 may be performed contemporaneously or in a different order than as presented with respect to FIG. 39. At block 3901, the method 3900 begins. At block 3910, support, by a communication device associated with a sub-domain of a network domain, communication of a label switched packet of a multicast flow for a multicast group including a set of egress nodes, wherein the label switched packet includes an encoding of an indication of a subset of egress nodes, from the set of egress nodes, that are located outside of the sub-domain and that are served by a common border node of the sub-domain. At block 3999, the method 3900 ends. It will be appreciated that various functions presented herein with respect to FIGS. 1-37 may be incorporated within the context of method 3900 of FIG. 39.

Various example embodiments for supporting stateless multicast in multi-domain packet distribution networks may provide various advantages or potential advantages. For example, various example embodiments for supporting stateless multicast in multi-domain packet distribution networks may be configured to support stateless multicast for various types of multicast applications, including broadcast-like multicast applications (e.g., providing IPTV channels to a large number of subscribers), narrowcast multicast applications (e.g., video conferencing, communications among a group of servers in a datacenter or a webscale network, multicast in BGP based MPLS VPNs in service provider network, and so forth), or the like, as well as various combinations thereof. For example, various example embodiments for supporting stateless multicast in multi-domain packet distribution networks may obviate the need for use of stateful multicast technologies that typically require both control plane and data plane states specific to MDTs to be maintained in routers in order to support multicast of packets specific to the MDTs, respectively. For example, various example embodiments for supporting stateless multicast in multi-domain packet distribution networks may obviate the need for use of certain stateless multicast technologies which may not be ideal (e.g., deployment of Bit Index Explicit Replication (BIER) for handling of certain narrowcast multicast applications may be overkill). For example, various example embodiments for supporting stateless multicast in multi-domain packet distribution networks may enable forwarding of inter-domain stateless MPLS multicast packets with O(1) lookup irrespective of the number of labels (egress routers) in EMLS, thereby preventing the number of ILM Table lookups from increasing linearly with the number of labels in EMLS (which would result in O(N) lookups where N labels are present in the EMLS or O(G) lookups in a hierarchical network). Various example embodiments supporting stateless multicast in multi-domain packet distribution networks may provide various other advantages or potential advantages.

Figure 40:
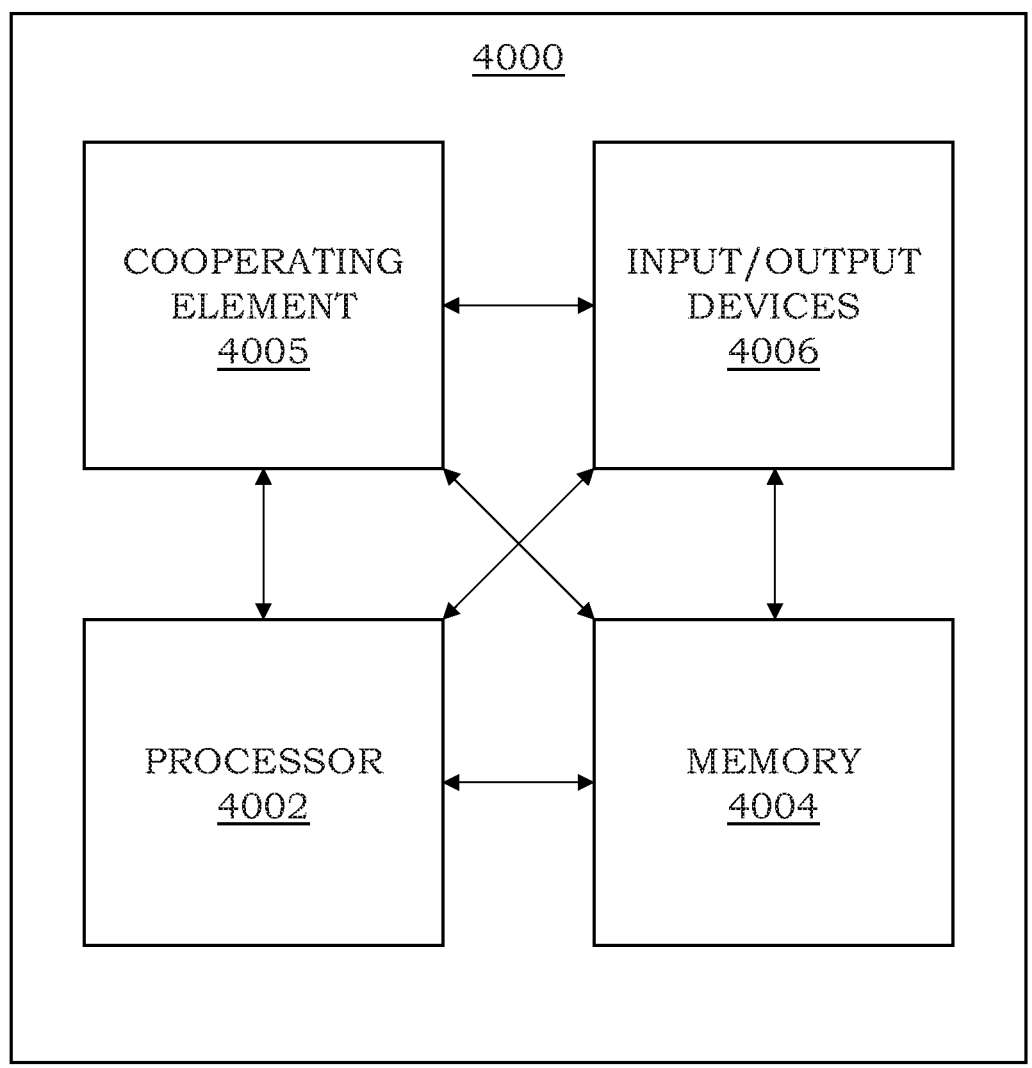
FIG. 40 depicts an example embodiment of a computer suitable for use in performing various functions presented herein.

FIG. 40 depicts an example embodiment of a computer suitable for use in performing various functions presented herein.

The computer 4000 includes a processor 4002 (e.g., a central processing unit (CPU), a processor, a processor having a set of processor cores, a processor core of a processor, or the like) and a memory 4004 (e.g., a random access memory, a read only memory, or the like). The processor 4002 and the memory 4004 may be communicatively connected. In at least some example embodiments, the computer 4000 may include at least one processor and at least one memory including a set of instructions which, when executed by the at least one processor, cause the computer 4000 to perform various functions presented herein.

The computer 4000 also may include a cooperating element 4005. The cooperating element 4005 may be a hardware device. The cooperating element 4005 may be a process that can be loaded into the memory 4004 and executed by the processor 4002 to implement various functions presented herein (in which case, for example, the cooperating element 4005 (including associated data structures) can be stored on a non-transitory computer-readable storage medium, such as a storage device or other suitable type of storage element (e.g., a magnetic drive, an optical drive, or the like)).

The computer 4000 also may include one or more input/output devices 4006. The input/output devices 4006 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 4000 may represent a general architecture and functionality suitable for implementing functional elements described herein, portions of functional elements described herein, or the like, as well as various combinations thereof. For example, computer 4000 may provide a general architecture and functionality that is suitable for implementing one or more elements presented herein, such as network devices (e.g., routers or the like), network controllers, or the like, as well as various combinations thereof.

It will be appreciated that at least some of the functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits, and/or any other hardware equivalents).

It will be appreciated that at least some of the functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
   at least one processor; and
   at least one memory storing instructions that, when executed by the at least one processor, cause the apparatus to:
   determine, by a node of a sub-domain of a network domain for a packet of a multicast flow, a set of egress nodes to which the packet is to be delivered;
   determine, by the node from the set of egress nodes to which the packet is to be delivered, a set of external egress nodes that are located outside of the sub-domain and that are served by a common border node of the sub-domain, wherein the common border node of the sub-domain is a common egress point from the sub-domain for the external egress nodes and is a common node in respective shortest paths from the node to the external egress nodes;
   generate, by the node based on the set of external egress nodes, a label switched packet including an encoding of an indication of the set of external egress nodes; and
   send, by the node toward the common border node of the sub-domain based on unicast forwarding, the label switched packet.

2. The apparatus of claim 1, wherein the multicast flow is associated with a multicast group including a set of egress nodes for the multicast flow, wherein the node of the sub-domain is an ingress node of the sub-domain for the multicast flow, wherein the set of egress nodes to which the packet is to be delivered includes the set of egress nodes for the multicast flow.

3. The apparatus of claim 2, wherein the packet is generated by the ingress node of the network domain based on a packet of a multicast source for the multicast flow.

4. The apparatus of claim 1, wherein the multicast flow is associated with a multicast group including a set of egress nodes for the multicast flow, wherein the node of the sub-domain is a second border node of the sub-domain, wherein the set of egress nodes to which the packet is to be delivered includes a subset of the egress nodes for the multicast flow.

5. The apparatus of claim 4, wherein the packet is received by the second border node of the sub-domain via a unicast tunnel.

6. The apparatus of claim 1, wherein the set of external egress nodes is determined based on routing information maintained by the node.

7. The apparatus of claim 6, wherein the routing information includes, for each network node in a set of network nodes of the network domain, an indication as to whether the respective network node is internal to the sub-domain of the node or external to the sub-domain of the node.

8. The apparatus of claim 7, wherein the routing information includes, for each of the network nodes of the network domain that is external to the sub-domain of the node, an indication as to a border node with which the respective network node is associated and an address of the border node with which the respective network node is associated.

9. The apparatus of claim 6, wherein the routing information includes Internet Protocol (IP) based routing information.

10. The apparatus of claim 1, wherein the encoding of the indication of the set of external egress nodes includes a set of node identifiers identifying the respective external egress nodes.

11. The apparatus of claim 1, wherein, to send the packet, the instructions, when executed by the at least one processor, cause the apparatus to:
 forward, by the node toward the common border node via a unicast tunnel from the node to the common border node, the label switched packet.

12. The apparatus of claim 11, wherein the instructions, when executed by the at least one processor, cause the apparatus to:
 determine, by the node based on a list of preferred tunnel types associated with the common border node, a tunnel type of the unicast tunnel from the node to the common border node.

13. The apparatus of claim 11, wherein the unicast tunnel includes a Generic Routing Encapsulation (GRE) tunnel, a Multiprotocol Label Switching (MPLS) in User Datagram Protocol (MPLS-in-UDP) tunnel, an MPLS Label Switched Path (LSP), or an Interior Gateway Protocol (IGP) shortcut.

14. The apparatus of claim 1, wherein the instructions, when executed by the at least one processor, cause the apparatus to:
 determine, by the node from the set of egress nodes to which the packet is to be delivered, a set of internal egress nodes that are located inside of the sub-domain;
 generate, by the node based on the set of internal egress nodes, a second label switched packet including an encoding of an indication of the set of internal egress nodes; and
 send, by the node within the sub-domain based on multicast forwarding, the second label switched packet.

15. The apparatus of claim 14, wherein the encoding of the indication of the set of internal egress nodes includes a set of node identifiers identifying the respective internal egress nodes.

16. The apparatus of claim 1, wherein the instructions, when executed by the at least one processor, cause the apparatus to:
 maintain, by the node, a route table including a prefix field configured to indicate a route prefix, a next-hop field configured to indicate a next hop for the route prefix, a scope field configured to indicate whether a scope of the route prefix is internal to the sub-domain or external to the sub-domain, and a border node field configured to indicate a border node for the route prefix.

17. The apparatus of claim 1, wherein the instructions, when executed by the at least one processor, cause the apparatus to:
 maintain, by the node, a mapping table including a prefix field configured to indicate a route prefix, a next-hop field configured to indicate a next hop for the route prefix, a next-hop label field configured to indicate a label of the next hop for the route prefix, a scope field configured to indicate whether a scope of the route prefix is internal to the sub-domain or external to the sub-domain, a border node field configured to indicate a border node for the route prefix, and a border node label field configured to indicate a label of the border node for the route prefix.

18. The apparatus of claim 1, wherein the instructions, when executed by the at least one processor, cause the apparatus to:
 maintain, by the node, a border node tunnel table including an address field configured to indicate an address of a border node, a tunnel preference field configured to indicate a list of tunnel type preferences for tunneling from the node to the border node, and a resolved tunnel field configured to indicate a list of resolved unicast tunnels from the node to the border node.

19. The apparatus of claim 1, wherein the instructions, when executed by the at least one processor, cause the apparatus to:
 maintain, by the node, a mapping table including an incoming label field configured to indicate an incoming label received by the node, a next-hop field configured to indicate a next hop for the incoming label, a next-hop label field configured to indicate a label of the next hop for the incoming label, a scope field configured to indicate whether a scope of the incoming label is internal to the sub-domain or external to the sub-domain, a border node field configured to indicate a border node for the incoming label, and a border node label field configured to indicate a label of the border node for the incoming label.

20. The apparatus of claim 1, wherein the sub-domain includes a Shortest Path First (OSPF) area, an OSPF version 3 (OSPFv3) area, an Intermediate-System-to-Intermediate-System (IS-IS) level, or a Border Gateway Protocol (BGP) autonomous system (AS).

21. A method, comprising:
 determining, by a node of a sub-domain of a network domain for a packet of a multicast flow, a set of egress nodes to which the packet is to be delivered;
 determining, by the node from the set of egress nodes to which the packet is to be delivered, a set of external egress nodes that are located outside of the sub-domain and that are served by a common border node of the sub-domain, wherein the common border node of the sub-domain is a common egress point from the sub-domain for the external egress nodes and is a common node in respective shortest paths from the node to the external egress nodes;
 generating, by the node based on the set of external egress nodes, a label switched packet including an encoding of an indication of the set of external egress nodes; and
 sending, by the node toward the common border node of the sub-domain based on unicast forwarding, the label switched packet.

22. An apparatus, comprising:
at least one processor; and
at least one memory storing instructions that, when executed by the at least one processor, cause the apparatus to:
 receive, by a first border node associated with a first sub-domain and based on unicast forwarding, a first label switched packet including an encoding of an indication of a set of external egress nodes for which the first label switched packet is intended, wherein the external egress nodes belong to a multicast group and are disposed outside of the first sub-domain;
 generate, by the first border node based on the first label switched packet, a second label switched packet, wherein the second label switched packet includes an encoding of an indication of a first subset of external egress nodes, from the set of external egress nodes, located within a second sub-domain;

forward, by the first border node toward a node of the second sub-domain based on multicast forwarding, the second label switched packet;

generate, by the first border node based on the label switched packet, a third label switched packet, wherein the third label switched packet includes an encoding of an indication of a second subset of external egress nodes, from the set of external egress nodes, located within a third sub-domain; and forward, by the first border node toward a second border node associated with the second sub-domain and the third sub-domain and based on unicast forwarding, the third label switched packet.

\* \* \* \* \*